Aug. 5, 1969    J. R. THOMAS    3,459,393
VARIABLE POWER ABSORBING HYDRAULIC APPARATUS
Filed May 13, 1965    11 Sheets-Sheet 1

INVENTOR.
JOHN R. THOMAS
BY Duane C. Bowen

*INVENTOR.*
JOHN R. THOMAS
BY
Duane C. Bowen

Aug. 5, 1969  J. R. THOMAS  3,459,393
VARIABLE POWER ABSORBING HYDRAULIC APPARATUS
Filed May 13, 1965  11 Sheets-Sheet 3

INVENTOR.
JOHN R. THOMAS
BY
Duane C. Bowen

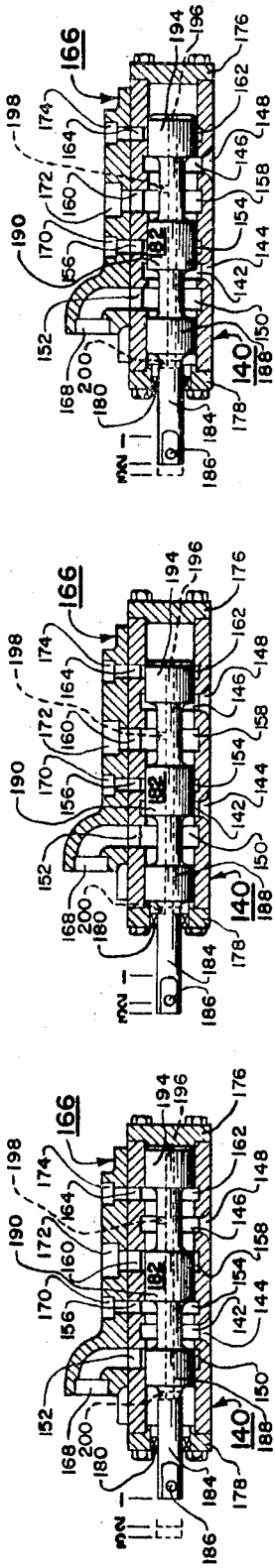
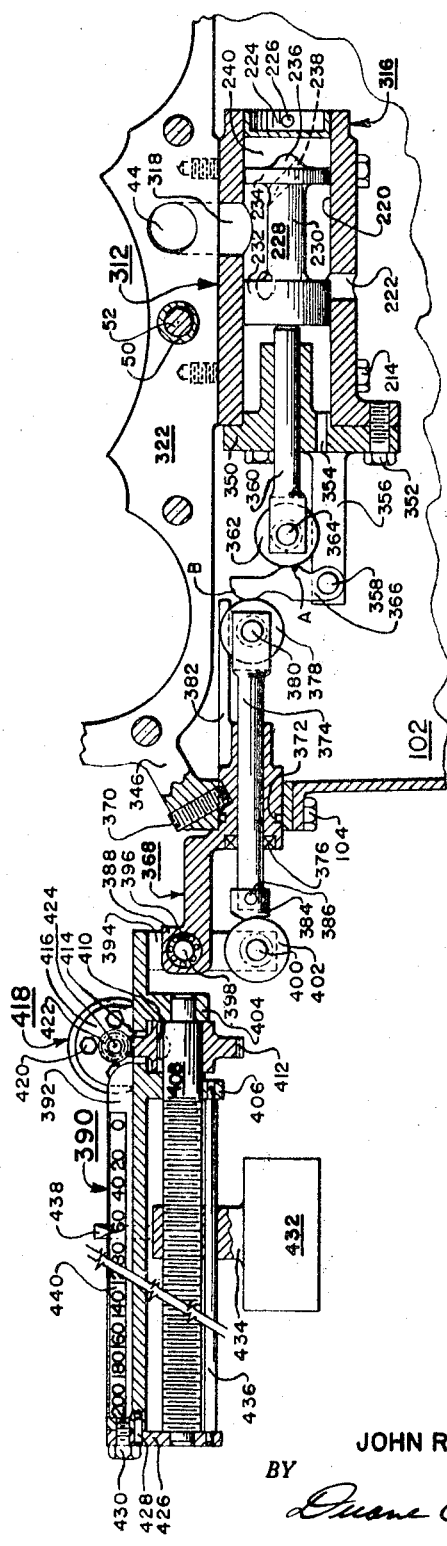

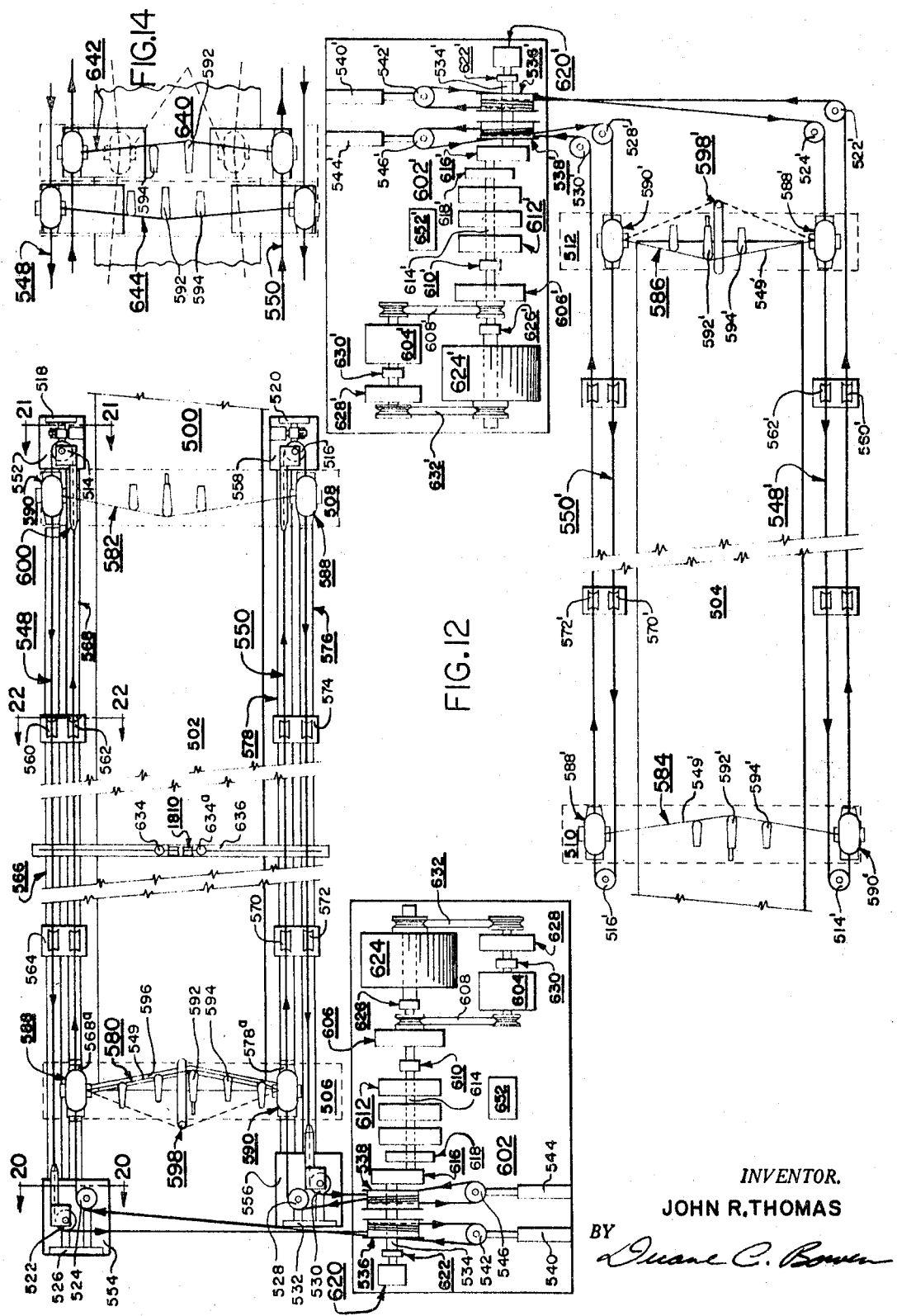

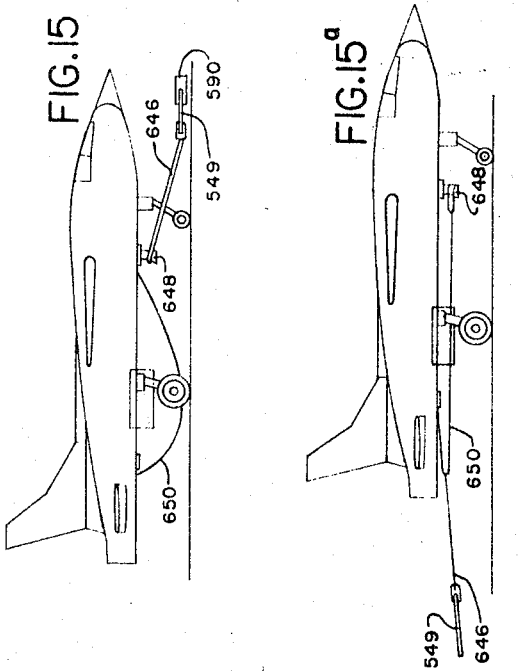
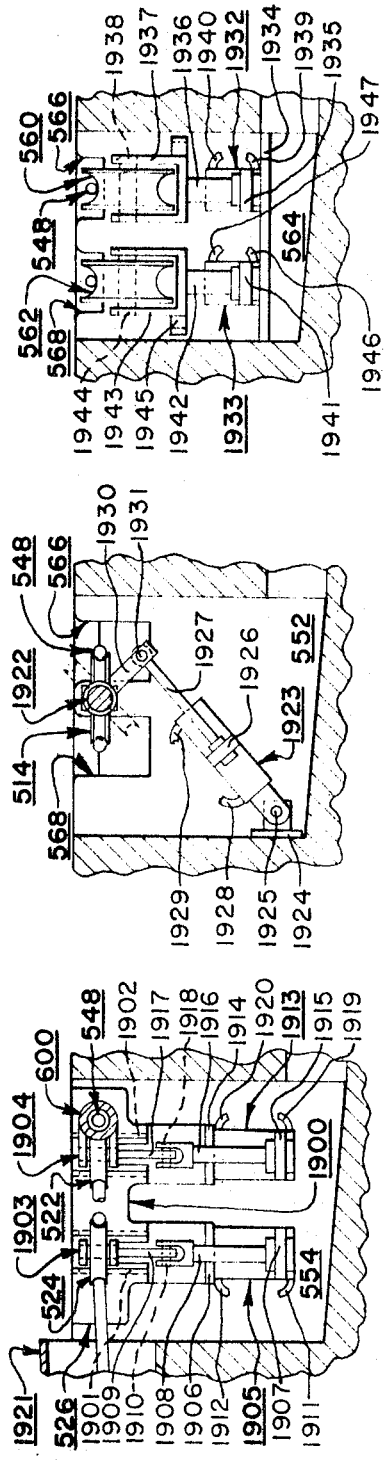
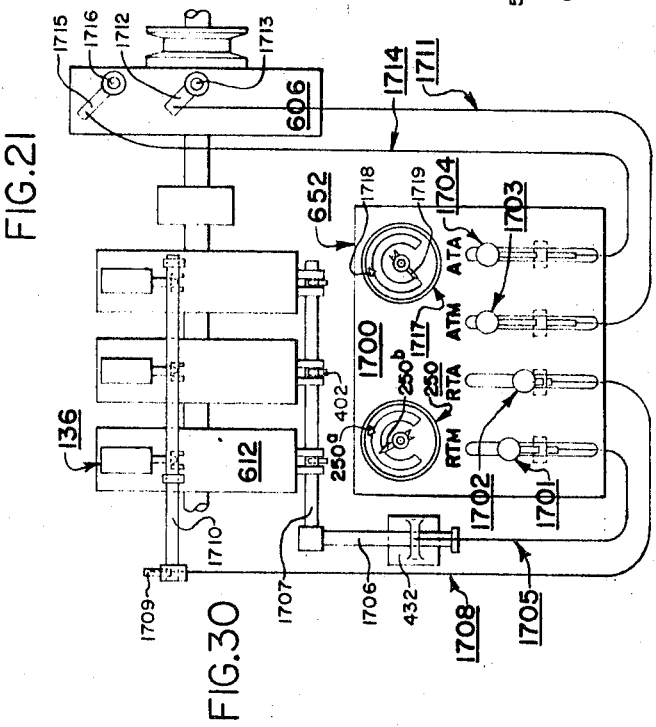

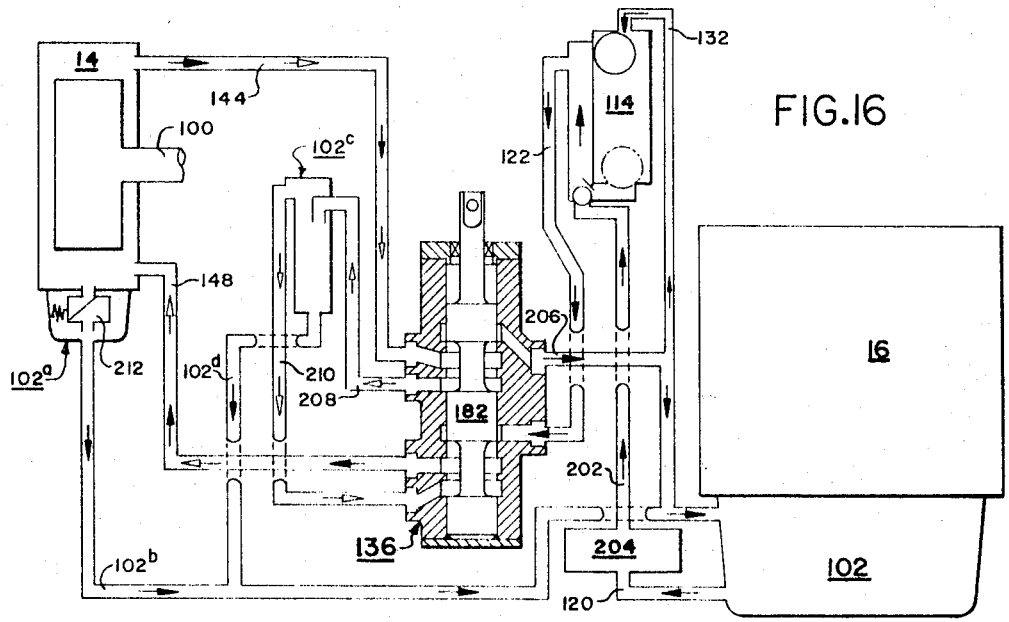
FIG.16
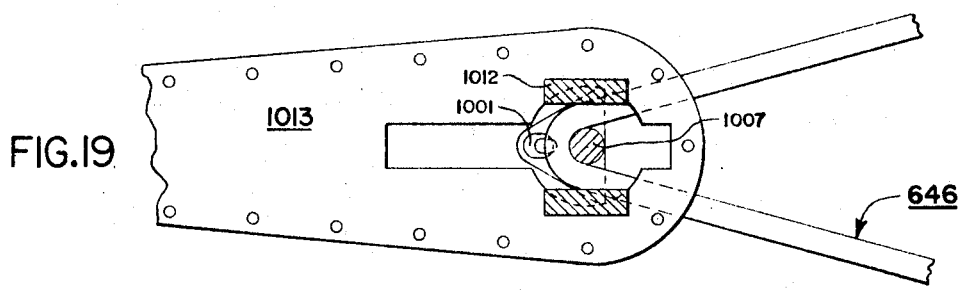
FIG.19
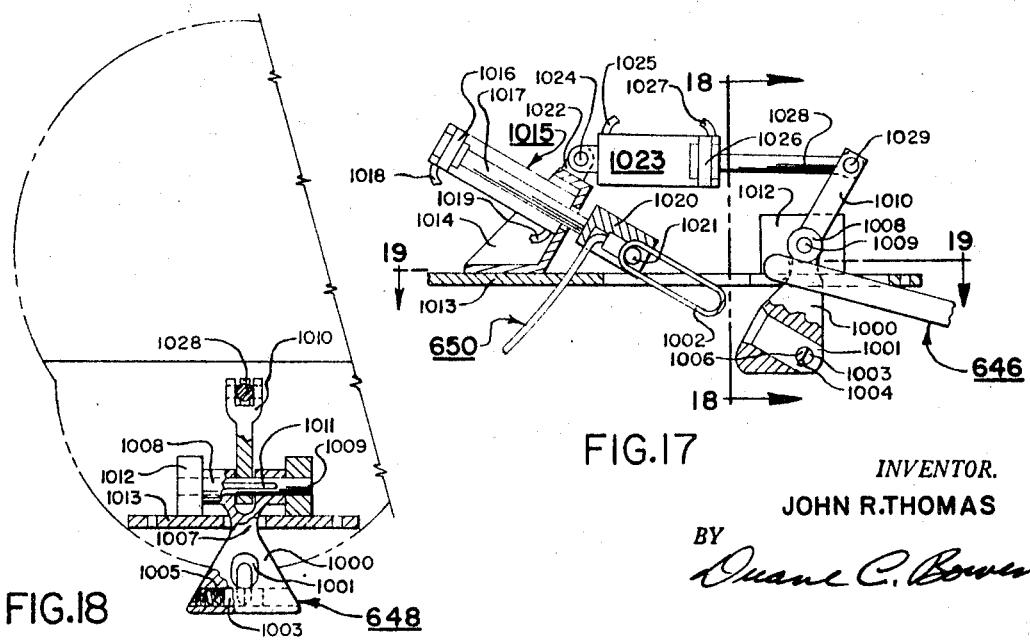
FIG.17
FIG.18
INVENTOR.
JOHN R. THOMAS
BY Duane C. Bowen Aug. 5, 1969  J. R. THOMAS  3,459,393
VARIABLE POWER ABSORBING HYDRAULIC APPARATUS
Filed May 13, 1965   11 Sheets-Sheet 8
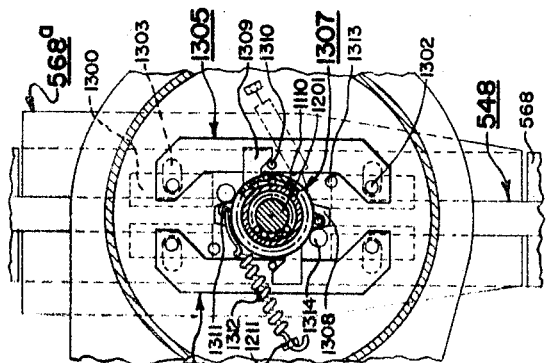
FIG.27
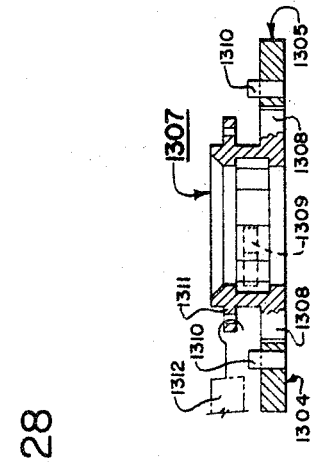
FIG.29
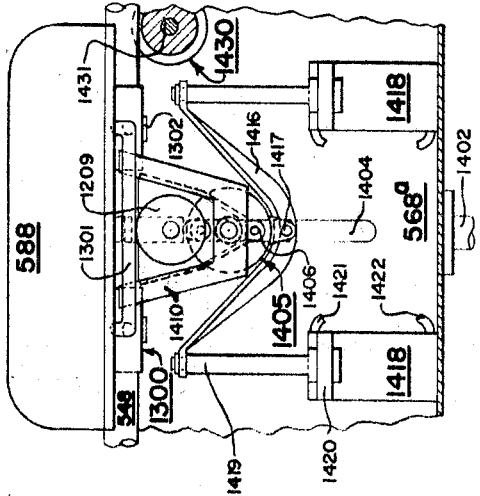
FIG.24
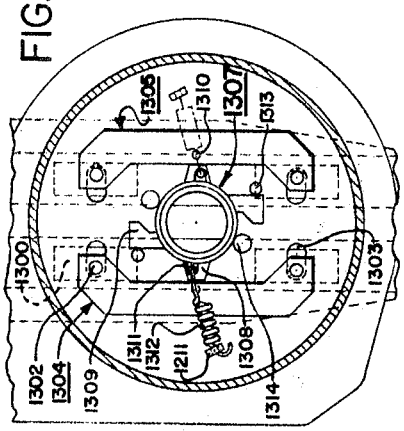
FIG.28
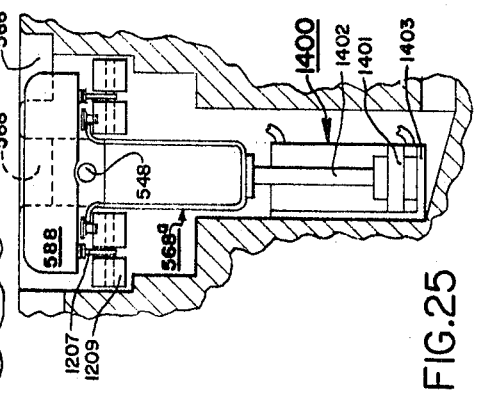
FIG.25
FIG.23
INVENTOR.
JOHN R. THOMAS
BY
Duane C. Bowen Aug. 5, 1969   J. R. THOMAS   3,459,393
VARIABLE POWER ABSORBING HYDRAULIC APPARATUS
Filed May 13, 1965   11 Sheets-Sheet 9
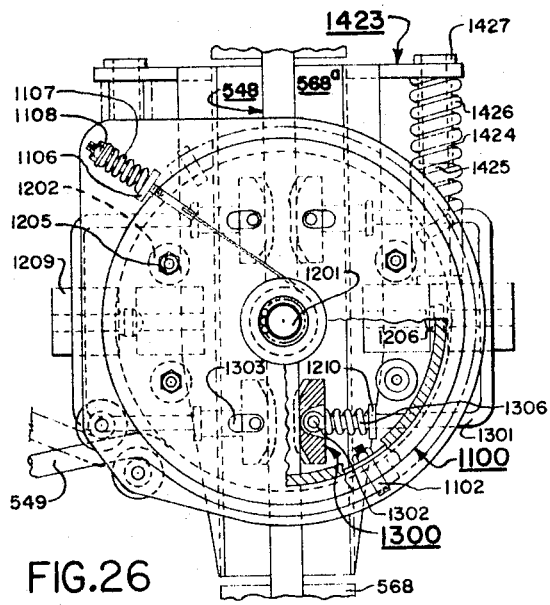
FIG.26
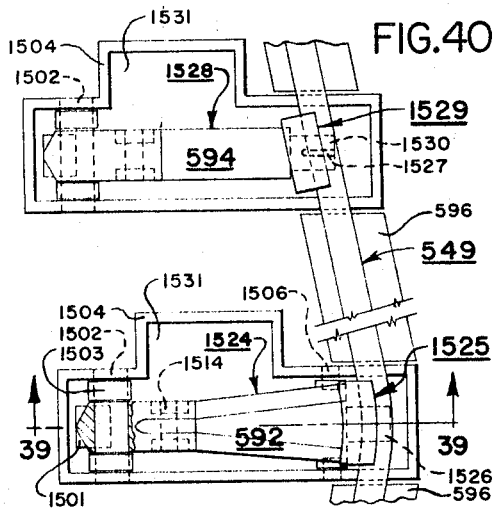
FIG.40
FIG.38
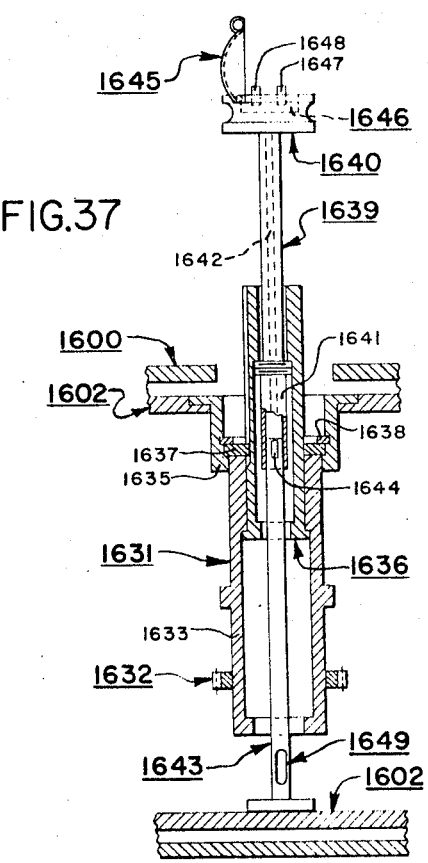
FIG.37
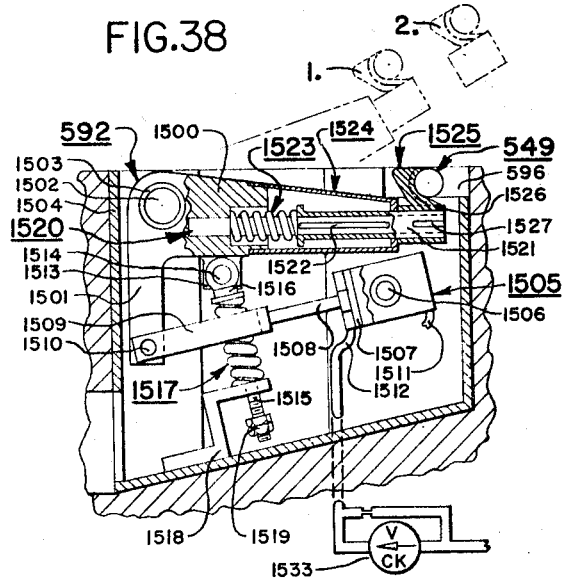
FIG.39
INVENTOR.
JOHN R. THOMAS
BY
Duane C. Bower

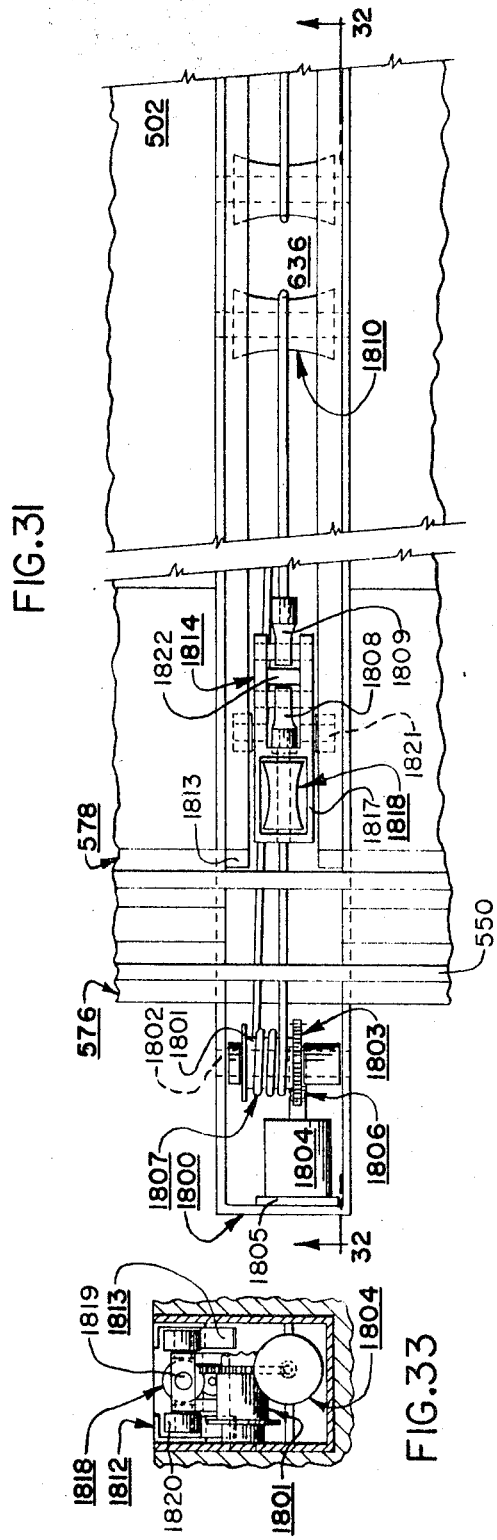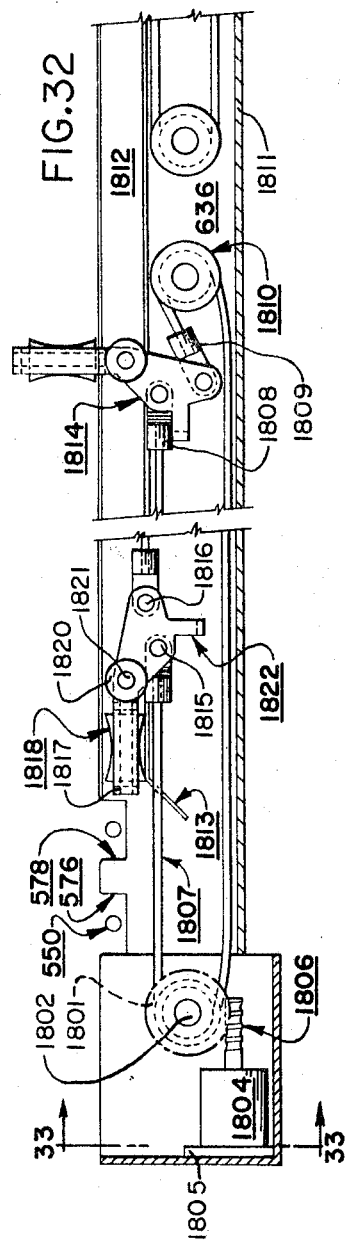

Aug. 5, 1969  J. R. THOMAS  3,459,393
VARIABLE POWER ABSORBING HYDRAULIC APPARATUS
Filed May 13, 1965  11 Sheets-Sheet 11
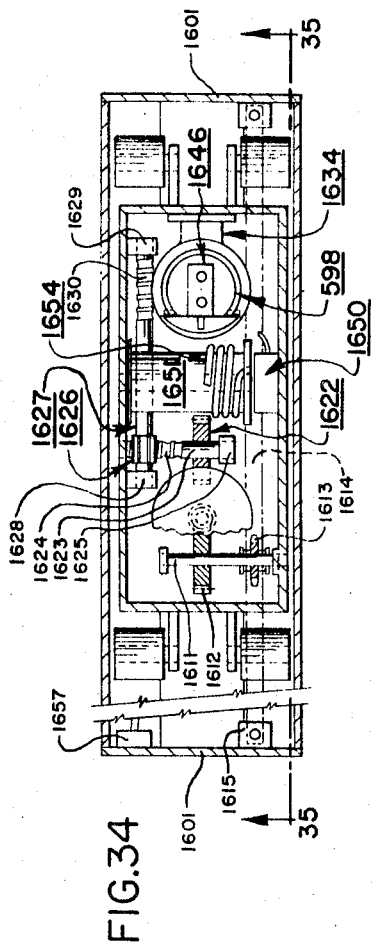
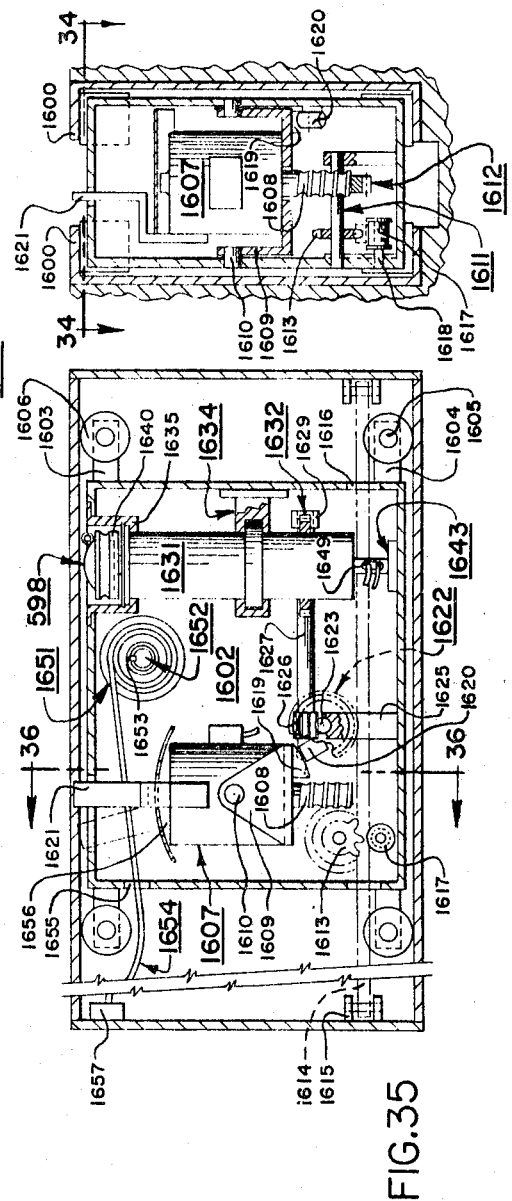
INVENTOR.
JOHN R. THOMAS
BY Duane C. Bowen

United States Patent Office 3,459,393
Patented Aug. 5, 1969

3,459,393
VARIABLE POWER ABSORBING HYDRAULIC APPARATUS
John R. Thomas, Wichita, Kans., assignor to The Thomas Company, Wichita, Kans., a corporation of Kansas
Filed May 13, 1965, Ser. No. 455,365
Int. Cl. B64f *1/02, 1/12*
U.S. Cl. 244—63                               74 Claims

ABSTRACT OF THE DISCLOSURE

Hydraulic apparatus of the hydrostatic type is used for retarding including (a) retarding a vehicle such as a truck by connecting a pump gear to a vehicle drive shaft, and (b) retarding an aircraft as a part of landing arrestment gear by connecting a pump gear to cable capstan. Maximum power absorption rate level of the hydrostatic unit is selectively limited. The complete aircraft system includes cables brought to about aircraft landing speed before aircraft engagement, during landing arrestment usage, and includes dual usage of cables and other parts of the arrestment system for aircraft launching.

---

This invention relates generally to the various fields of power absorption, power retardation or braking apparatus particularly wherein loads which have been put into motion and accelerated, require controlled rates of deceleration to a motionless state. Land vehicle retardation and aircraft retardation (in an aircraft arrest and/or launch system) are among the applications contemplated.

More specifically, this invention relates to the employment of hydraulic apparatus of the hydrostatic type to controllably decelerate loads. In land vehicles, previously, the commonly known friction brakes or the more recently introduced hydrodynamic retarders have been used primarily for such deceleration functions. The invention hereinafter shown and described, uses hydraulic hydrostatic apparatus of a type variably admitting air and/or oil to a pumping means and controlling discharge, to obtain the desired magnitude and speed of load deceleration.

The hydraulic apparatus used in the present invention may be described as including:

(a) a stationary or oscillatably mounted pump body
(b) rotary driven means operatively connected to the load
(c) a fluid circulating pumping means having relatively moving pump parts connected to the pump body and to the rotary driven means
(d) means including a sump providing a source of air and of oil for the pumping means
(e) a pump oil supply means operative to prime and feed the pumping means from said sump
(f) a pressure-relieving means for the pump, having selective means to establish and maintain a desired maximum rate of power absorption for the apparatus
(g) a fluid flow control means for the pumping means
(h) whereby substantially only air is permitted to be circulated by the pumping means during neutral or "off" operations and air and/or oil is admitted to the pumping means and the discharge thereof controlled to obtain the desired rate of power absorption and rate of load deceleration, including the capability to reduce load motion to substantially zero.

The preceding outline will indicate the general nature of the invention, however, it is not intended to describe all of the functions, structures or scope of the invention but only is meant to provide a brief introduction to the invention.

I have done considerable work in the field of variable power transmitting apparatus. However, the capacity to absorb power by such apparatus has either been practically absent or at best quite limited in utility in apparatus of a revolving pump body nature employing multiple gear pump elements consisting of a central or sun gear and a plurality of side or planet gears which, in apparatus operated at modern high speeds, involve planet gear support bearing loads often exceeding the capacity of available bearings. Such rotary body apparatus also has quite cumbersome physical dimensions. Further, power absorption usually requires the persence of a stationary (non-revolving) member.

The following of my prior patents should provide some background information which will assist in understanding the type of apparatus herein discussed:

(a) Patent 2,658,595 issued Nov. 10, 1953
(b) Patent 2,712,867 issued July 12, 1955
(c) Patent 2,899,035 issued Aug. 11, 1959
(d) Patent 3,144,923 issued Aug. 18, 1964, entitled "Variable Power Transmitting Hydraulic Apparatus," which is incorporated by reference herein so as to further explain certain portions of the apparatus illustrated herein without excessively detailed description of those portions in the present descriptions.

I have elected to illustrate one form of my invention as being a hydrostatic hydraulic retarder adapted to the drive-line of highway or off-highway vehicles and to illustrate another form of my invention as an aircraft arrest-launch system.

PROBLEMS AND OBJECTIVES

The use of friction materials in the form of contracting or expanding bands co-acting with load-rotated brake drums has been used in the power absorption art for a long period of time. However, it is well known that braking capacity of such braking systems decreases during operation (known as "fading"), in use of friction materials other than for relatively short durations of time and other than within certain operating temperature limits. Usage is accompanied by wearing away of the friction materials requiring their eventual replacement, meanwhile involving possibly unsafe operations.

More recently, disc-type friction brakes have been utilized to some extent to at least partially overcome the "fading" problem and to possibly extend the safe operating life. The wearing away of the friction materials and operating temperature limitations still exist, and replacement of at least the disc brake lining is still eventually required.

Hydrodynamic retarders also have been employed, more recently, as power absorption units for highway and off-highway vehicles, usually in connection with the vehicle's drive-line. Such hydrodynamic units feature a very long life factor which usually is practically maintenance-free. They include provision for the operating fluid to be routed through heat-exchanging facilities from which heat is transferred to ambient water or air. However, some problems are inherent to hydrodynamic retarders:

(a) The operating fluid must be removed from the retarder to provide its "off" or inoperative condition and it must be re-filled to provide retardation. The degree of fill establishes its degree of retardation. The relatively substantial time consumed in emptying or filling the retarder represents "lag" in its response to operator control.

(b) Since the braking effect depends upon kinetic energy imparted to the fluid by the "slip" or relative rotation existing between stationary and rotating parts of the retarder, full-range braking of maximum loads whereby such loads would be decelerated to the point of being substantially motionless, is not practically attainable.

(c) Lack of full-range braking (to zero slip condition) causes hydrodynamic retarders to produce heat exceeding reasonable capacity of heat exchanging facilities in some applications where the load/slip energy magnitudes are large, and requires the supplemental use of friction brakes to avoid damaging overheating of the retarder system. Such use of friction brakes is the very thing that the use of the hydrodynamic retarder seeks to avoid in the first place.

(d) The comparatively large physical dimensions required in relation to the power absorption capacity.

The problems in aircraft arresting and launching systems will not be described in detail, to avoid protracted discussion of a complex subject, and various matters will be covered in the description of my system or are presented in the objects. In general, present arresting and launching systems do not appear to be entirely satisfactory on the following primary counts (which my system solves):

(1) Need to absorb very large energy loads in arresting (and to produce very large energy forces for launching) and to adapt for either occasional or regular use.

(2) Need to absorb such energy while avoiding high buildups during original aircraft engagement (usually caused by the fact that systems are at rest prior to arrestment).

(3) Need to readily adjust to aircraft weight and landing speed to avoid loads damaging the system or aircraft.

(4) Need to minimize time (and personnel) required to ready for another arrestment or launching.

Objectives of my invention include the following:

(1) To provide a power absorbing hydraulic apparatus having a stationary body which is appropriate for direct combination with other stationary components of vehicle drive-lines such as torque converters, selective gear transmissions, power shift transmissions and the like, and which is appropriate as a retarding unit in an aircraft launching system.

(2) To provide a power absorbing apparatus which, in utilizing a multiple gear pump of the planetary type, permits stationary axis mounting of the planet gears thereof instead of same rotating in orbit around the axis of the apparatus, thus eliminating a problem of excessive planet gear support bearing loads in high speed applications.

(3) To provide said power absorbing hydraulic apparatus having a uniquely compact physical size relative to its power absorption capacity, afforded by use of the hydrostatic, positive displacement pump principle employed.

(4) To devise a power absorbing hydraulic apparatus as a self-contained unit which can be operationally independent of other hydraulic components with which it may be associated.

(5) To provide a power absorbing apparatus the continuous use of which is devoid of the fading tendencies associated with like use of friction brakes.

(6) To provide an apparatus capable of absorbing power without employment of mechanical friction elements in such apparatus.

(7) To provide a power absorbing apparatus having an inherent capability to afford substantially full-range braking operations, reducing the need, if any, for use of friction brakes to solely that of emergency or parking braking or the like.

(8) To provide a power absorbing hydraulic apparatus the operation of which is characterized by having practically instantaneous response to operator control throughout its operating range from "off" to "on" levels.

(9) To devise an apparatus the power absorbing capacity of which is selectively limited to (and then automatically prevented from exceeding) a pre-determined power absorption rate level.

(10) To provide a power absorbing hydraulic apparatus the automatically maintained torque absorption levels of which may be selectively varied within or throughout the entire torque absorption capacity of said apparatus by means which is located exteriorally of said apparatus and to provide for adjustment of the automatically maintained absorption level before or during operations.

(11) To provide other desirable features such as high reliability, economical cost, low maintenance, simplicity and adaptability to many fields of power absorption.

(12) To provide for heat dissipation in an external heat exchanger which may be of any size needed for energy absorption but which is not oversized by having to dissipate large and continuous slip energy losses in addition to load energy.

(13) To provide an aircraft arrest/launch system that avoids problems in other systems which problems include:

(a) limits of braking mechanisms in even arresting systems used only occasionally
(b) lack of ready flexibility to adjust for aircraft landing weights, speeds, etc.
(c) damage to and limits of mechanisms by high load conditions upon initial arresting action when the system is accelerated by aircraft landing speed and weight.

(14) To provide an aircraft system with both arrest and launch capability, which is adaptable to regular use rather than only occasional emergency usage, in which the system is generally brought up to landing speed before aircraft engagement in arrestment, in which energy is stored before launching, in which the system may be readily adjusted to avoid loads which will damage the system or the aircraft, which is adapted to abort and overshoot conditions, and which meets various other desirable or necessary needs in an arresting or launching system.

Further objectives and advantages of the invention and the manner in which various problems are solved, will be understood from the following more specific description.

DESCRIPTION OF THE DRAWINGS

FIG. 9 is a cross-section of the main control valve, positioned for neutral operation of the retarder.

FIG. 10 is a cross-section of the control valve moved to its all oil or engaged position.

FIG. 11 is a cross-section of the main control valve in a positioning providing all oil suction and fully closed discharge.

FIG. 12 is a schematical presentation of another specific embodiment of my invention, adapted as the hydrostatic retarder portion of a land-based aircraft arresting system.

FIG. 13 is a cross-section of a modified form of the automatic torque limiting valve and a remotely adjustable, selectively variable constant force operating system therefor.

FIG. 14 is a plan view of a modified form of abort pendant cables for temporary military airstrips or like usage.

FIG. 15 is a side view of an aircraft with a bridle in launching position.

FIG. 15a is a side view of an aircraft with a bridle in trailing, arrestment position.

FIG. 16 is a diagrammatical view showing the use of a combined oil reservoir for my retarder and for other hydraulic equipment.

FIG. 17 is a partially sectioned vertical view of the aircraft's launch-bridle engagement device and associated abort-arrestment facility, including means for disengaging the launching bridle engagement device, one device-supporting bracket being removed.

FIG. 18 is a partially sectioned view of the launching bridle engagement device taken at line 18—18 of FIG. 17.

FIG. 19 is a top view of the keel beam-mounted breast plate and its launching bridle engagement device support bracket positions taken at line 19—19 of FIG. 17.

FIG. 20 illustrates means for changing height of cable sheaves associated with the anchor-brackets, viewed from line 20—20 of FIG. 12.

FIG. 21 shows an actuating means for tilting cable sheaves located in traps, as seen from line 21—21 of FIG. 12.

FIG. 22 shows typical height-adjusting actuators for fairlead rollers at trap locations, as seen from line 22—22 of FIG. 12.

FIG. 23 is a general vertical section of a typical cross-runway pendant cable shuttle and the elevatable shuttle-supporting channel associated therewith.

FIG. 24 is a fragmentary side view illustrating a means of longitudinally centering shuttles at battery positions, including means for releasing the shuttle's main cable-gripping parts.

FIG. 25 illustrates the trap design at battery positions which permit lowering and raising of shuttles.

FIG. 26 is a general top plan view of shuttle and channel including a segmentary view taken at line 26—26 of FIG. 23.

FIG. 27 is a top view of the shuttle taken at line 27—27 of FIG. 23, showing the cable-gripper release cam and cable-grip triggering mechanism a portion of which is in section, the shuttle having been triggered into main cable engagement for aircraft arrestment or launching operation.

FIG. 28 is a view similar to FIG. 27, illustrating the cable-gripper release cam positioned for shuttle-released, free main cable operation when the shuttle has been retracted to battery positions.

FIG. 29 is a vertical section of the cam rotor and associated cable-gripper carriage bars.

FIG. 30 is a plan view of one panel of a control console.

FIG. 31 is a plan view of the mechanism for transverse retraction of main cables.

FIG. 32 is a side elevation of the transverse retraction mechanism as viewed at line 32—32 of FIG. 31.

FIG. 33 is an end view as seen at line 33—33 of FIG. 32.

FIG. 34 is a top view of self-propelled auxiliary support mechanism for pendant cable, for use during aircraft launching operations, taken at line 34—34 of FIG. 36.

FIG. 35 is a vertical section of the auxiliary mechanism taken at line 35—35 of FIG. 34.

FIG. 36 is a vertical section of the auxiliary mechanism taken at line 36—36 of FIG. 35.

FIG. 37 is a sectional view of the auxiliary pendant cable-supporting mast assembly in its vertically extended position.

FIG. 38 is a top view of primary support for a pendant cable.

FIG. 39 is a vertical section of primary support taken on line 39—39 of FIG. 38.

FIG. 40 is a top view of a secondary support for the pendant cable.

VEHICLE RETARDING

Figure 1:
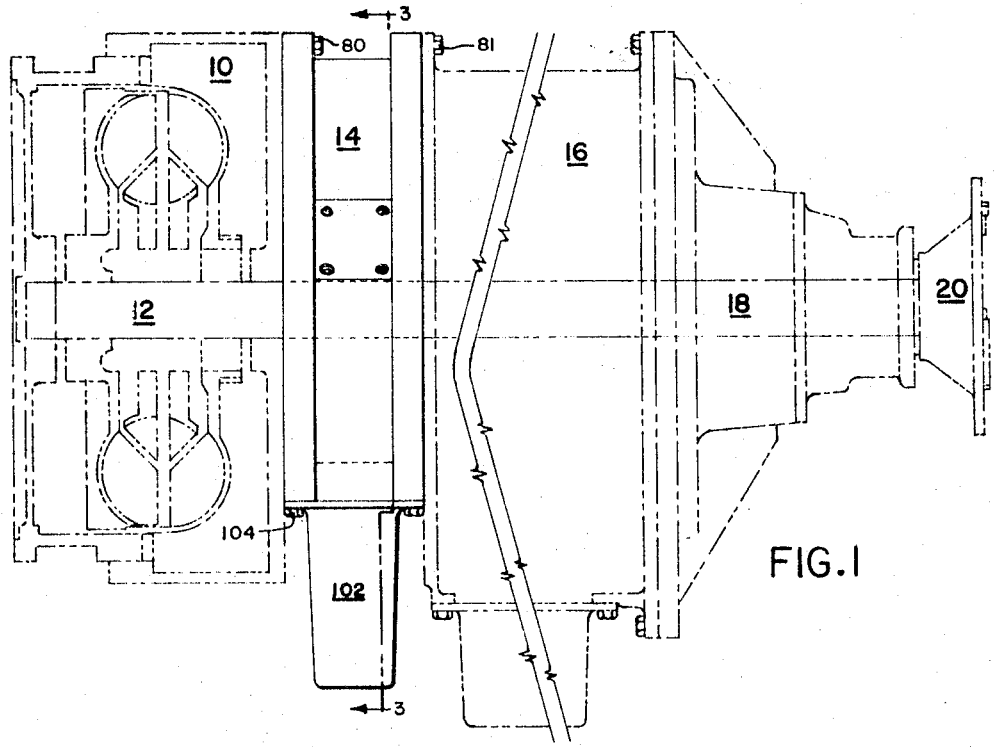
FIG. 1 illustrates a specific embodiment of my invention. This is a side elevation of a variable power absorbing apparatus (in the center) adapted as the hydrostatic retarder portion of a vehicle's power transmission system, which is diagrammatically shown to include (on the left) a torque converter and (on the right) a power shift or other transmission, the hydrostatic hydraulic retarder's pump supply unit having been removed.

The illustrated adaptation of my invention being employed as a vehicle retarder (see FIG. 1), places my hydrostatic retarder in an intermediate drive-line location, the front face of its body being fastened to the rear component-attaching face of the stationary housing of a vehicle's engine-driven hydrodynamic torque converter. The rear face of the retarder's body is fastened to a vehicle's transmission. However, neither the torque converter nor the transmission are components essential to the operation of the retarder. While the illustrated combination is characteristic of a possibly preferred style of adaptation, which has advantages that will be understood, the retarder may be considered as a completely self-contained operating unit (except for the usual heat exchange facility). I have elected to illustrate it in the combination of FIGURE 1 rather than to stationarily mount it in the vehicle at other various locations, such as in operative association with the vehicle's rear axle, differential, the propeller shaft connecting the engine power to the differential, the engine itself and any input or output shaft or counter-shaft of auxiliary or "midship" transmission. In other words, power being generated by the wheels of a vehicle during its deceleration or its operation on down-grades can be connected to the retarder in various manners for full-range absorption and substantially complete arrest. I perceived the capability and advantages of such usage of a hydrostatic retarder and conceived the structure to achieve the same.

In being combined with other hydraulically operating or hydraulically actuated power transmission components of a vehicle's drive-line system, it is possible, as later described, to adapt certain modified or simplified forms of my hydrostatic retarder for association with such other hydraulic components wherewith their fluid reservoirs and fluid pumps can be utilized as the main fluid reservoir and pump priming source for the hydrostatic retarder. It is essential, of course, that such fluid sources offer ample and unrestricted fluid volumes sufficient to satisfy the retarder's requirement for oil so as to not impair the proper functioning of either the hydraulic components or the retarder. There are thus limits to the concept of combination, i.e., a hydraulic fluid source from another system may become heated at times in operation of such other hydraulic system and not be suitable to receive the extra heat load of retarder functions. In other words "borrowing" from another hydraulic system may not "save" in fluid capacity requirements and often can have disadvantages or little advantage.

The illustrated adaptation of my invention being employed as a portion of a land-based aircraft arresting system (see FIG. 12), places my hydrostatic retarder in operative association with the cable-rotated capstan of a tail hook cable type of arresting system. However, my retarder may be considered as a completely self-contained operating unit (except for the usual heat exchange facility) which may be employed in the place of "water twisters" or "water squeezers" used in connection with this or other types of land or carrier based aircraft arresting systems, including end-of-runway safety barriers, naval aircraft carrier's arresting and safety barrier systems and the like.

In general, my hydrostatic retarder may be connected to any type of load, automotive, industrial or otherwise, which it is desired to selectively decelerate, to maintain various speed levels for said loads which change from being power driven to being the power driving force, including the ability to substantially completely arrest the motion of such loads.

Briefly, in any of the foregoing illustrations of my hydrostatic retarder's adaptations and capabilities, the retarder may be considered as consisting of a "potential" positive displacement type of hydraulic pump which, during "off" or neutral operations, circulates substantially only air. The pump potential during such neutral operation offers such slight resistance to being rotated that it "floats" on the power line during driving operations at a practically unnoticeable power absorption level. Under such neutral operations, the positive displacement pump loses almost all of its fluid suction capability and requires priming with oil when it is desired to begin the power absorption cycle. In the instant invention the pump priming means is fashioned after a pump supply unit contained in my Patent 3,144,923. Only a portion of one revolution of power input to the retarder is needed to prime its pump when the control valve is initially moved from its neutral operating position.

Various desired levels of power absorption may now be obtained up to and including power absorption at the desired automatically maintained maximum level, with no discernable time lag between control valve movement and retarder power absorption rate changes. In like manner, the "fully on" or engaged hydrostatic retarder naturally empties itself of oil and begins to circulate only air during a portion of one revolution of power input to the retarder, accomplishing the transition from its variable "on" operating condition to its fully "off" operating condition practically as fast as the control valve is moved to its "off" position and with no discernable time lag, e.g., not "discernable" in the type of operation discussed.

The above is a simplified explanation but will introduce the following description which relates the detailed structure, operation, and relationships, and shows how the above function can be achieved in variable power absorbing hydraulic apparatus.

(A) General working parts

The variable power transmitting hydraulic apparatus shown in the above cited Patents 2,658,595; 2,712,867; 2,899,035 and 3,144,923 illustrates use of rotating multiple spur gear pump bodies and use of other types of rotating positive displacement pumps is mentioned as being optional. The present invention involves use of a stationary multiple spur gear pump body, but the aforementioned patents are in other respects sufficiently related to the present invention to assist those skilled in the art to understand the following description of general working parts without needlessly protracting such description.

Referring to FIG. 1, a multistage hydrodynamic torque converter (diagrammatically illustrated), generally referenced by numeral 10, has an output shaft 12 shown (by dash lines) extending through a hydrostatic retarder carrying the general reference numeral 14. Shaft 12 extends to the right of retarder 14 as an input shaft for a reduced-length multiple shift transmission identified by numeral 16 (diagrammatically illustrated). A transmission output shaft 18 terminates as a flanged drive-line coupling 20. Similar assemblies of torque converter, output shaft therefor to a transmission, and output shaft and drive line coupling, and the like (without interposed hydrostatic retarder) are common in various types of vehicles and the like, including heavy duty road and off-road vehicles wherein the present invention will be particularly advantageous.

Figure 2:
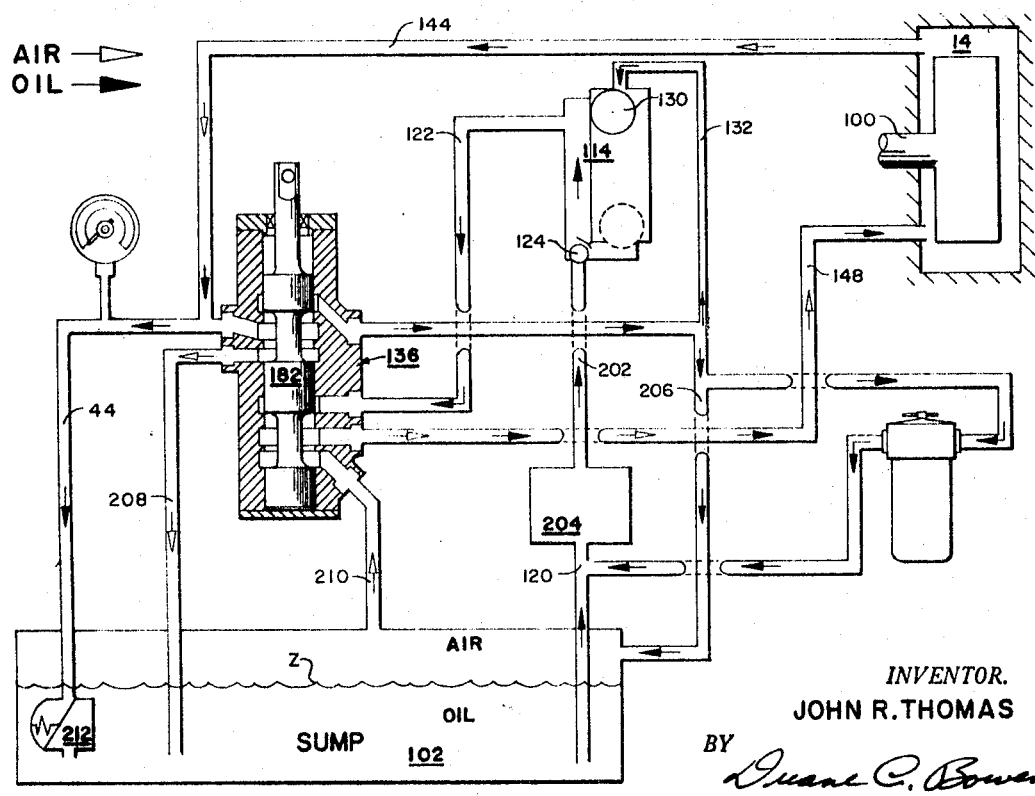
FIG. 2 is a schematical presentation of the complete retarder partially viewed in FIG. 1, the retarder's control valve being shown partly in elevation and partly in section.
Figure 3:
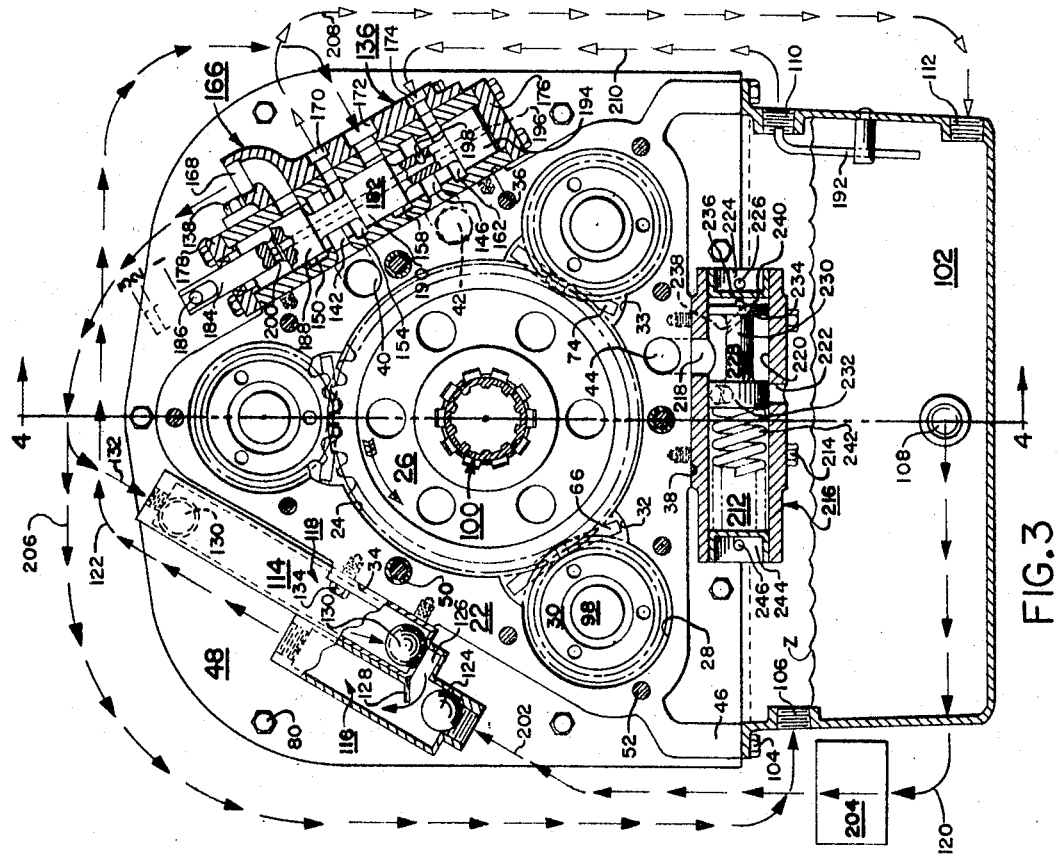
FIG. 3 is a view, partly in section, taken at line 3—3 of FIG. 1, the pump supply unit, the automatic torque limiting valve and the control valve being partly in elevation and in cross-section, the control valve being illustrated at its "off" or neutral position, some of the fluid passages being shown diagrammatically.
Figure 4:
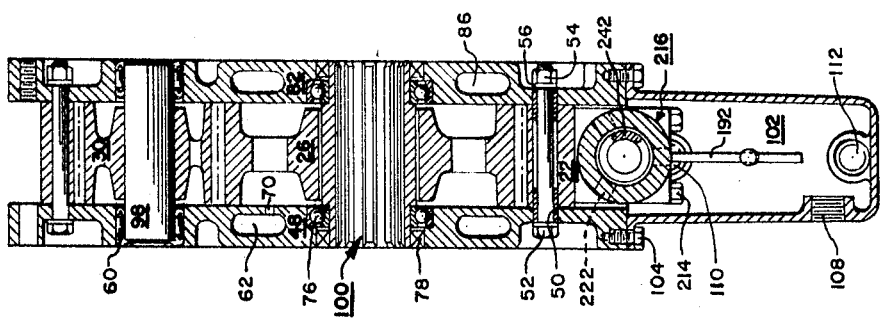
FIG. 4 is a vertical section of the power absorbing pump, taken on line 4—4 of FIG. 3.

(1) Retarder pump body.—Referring to FIGS. 2, 3 and 4, the hydrostatic retarder 14 includes a pump body 22 which, when comprising three side or planet gears as illustrated, is generally triangular in shape. Pump body 22 has a central bore 24 circumferential walls of which form peripheral compression walls for a pump central or sun gear 26. The bore 24 has three arcuate openings in its periphery which communicate with three circularly equally spaced cavities 28, each containing a pump planet gear 30 which meshes with the sun gear 26 to coact therewith in fluid pumping action when the apparatus is in operation. The central bore 24 and the cavities 28 are interconnected by recesses 32 and 33.

Located on external side surfaces of the pump body 22 are a series of machined accessory-mounting pads, pad 34 to accommodate a pump oil supply unit 114, pad 36 to receive a master control valve 136, and pad 38 for mounting an automatic torque limiting valve 212. Pump body 22 is provided with preferably a cored pump fluid discharge passage 40 and a cored pump fluid suction passage 42, which passages communicate with certain manifold passages to be later described, and these passages emerge at the outer surface of the pad 36 axially centrally of pump body 22. Pump body 22 is also provided with a cored alternate fluid discharge passage 44 emerging axially centrally of pump body 22 at pad 38.

Pump body 22 has sump-mounting wall extensions 46 at each end thereof, the lower surfaces of which are machined to practically coincide with adjacent surfaces of manifolds to be later described and which likewise form sump-mounting surfaces.

(2) Retarder pump suction manifold.—Referring to FIGS. 3, 4, 7 and 8, hydrostatic retarder 14 includes a suction manifold 48 which is maintained in proper fixed relation with pump body 22 by use of a plurality of tubular dowels 50, a plurality of pump body bolts 52 and 54. Fluid-sealing washers 56 may be employed beneath the heads of bolts 52 and nuts 54 as shown.

Suction manifold 48 is provided with three planet gear shaft bearing-mounting bores 58 which are radially and circumferentially located for proper relation with planet gear cavities 28 in pump body 22. A set of closed-end type needle bearings 60 are properly press-fitted in the bores 58.

Manifold 48 is provided with a suction-communicating fluid passage 62 preferably cored within the vertical wall of the manifold. Passage 62 emerges through the manifold wall surface which is adjacent pump gears 26 and 30, as fluid outlet ports 64 aligned with recesses 32 of pump body 22. Ports 64 are extended so as to form shallow, typical suction trap-relief channels 66. Each port 64 also has a suction groove 68 extending toward bores 58 sufficiently to communicate with planet gear recess and bearing areas so as to prevent accumulation of fluid discharge pressures therein. Passage 62 has a drilled port 70 which functions to prevent accumulation of fluid discharge pressures in recessed areas of sun gear 26, as well as in adjacent areas containing bearings and oil seals.

Passage 62 is provided with a suction fluid inlet port 72 located so as to register with suction passage 42 of pump body 22. Manifold 48 is preferably provided with shallow, typical discharge trap-relief channels 74 which are, as illustrated in FIG. 3, located within the confines of recesses 33. Manifold 48 has a horizontally centrally located bore adjacent its inside face which is sized to receive one of a pair of sun gear quill-supporting bearings 76. Another coaxial bore which is adjacent the manifold's outside face is sized to receive one of a pair of oil seals 78.

The outer rim portion of manifold 48 is provided with a plurality of holes to accommodate certain mounting bolts 80 (see FIGS. 1 and 3) which are located to appropriately fasten torque converter 10 to manifold 48.

Figure 6:
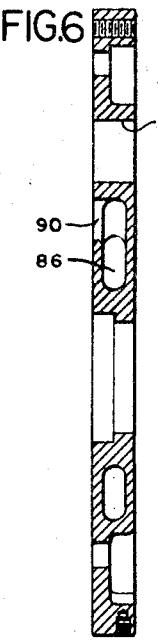
FIG. 6 is a vertical section of the pump discharge manifold, taken on line 6—6 of FIG. 5.
Figure 5:
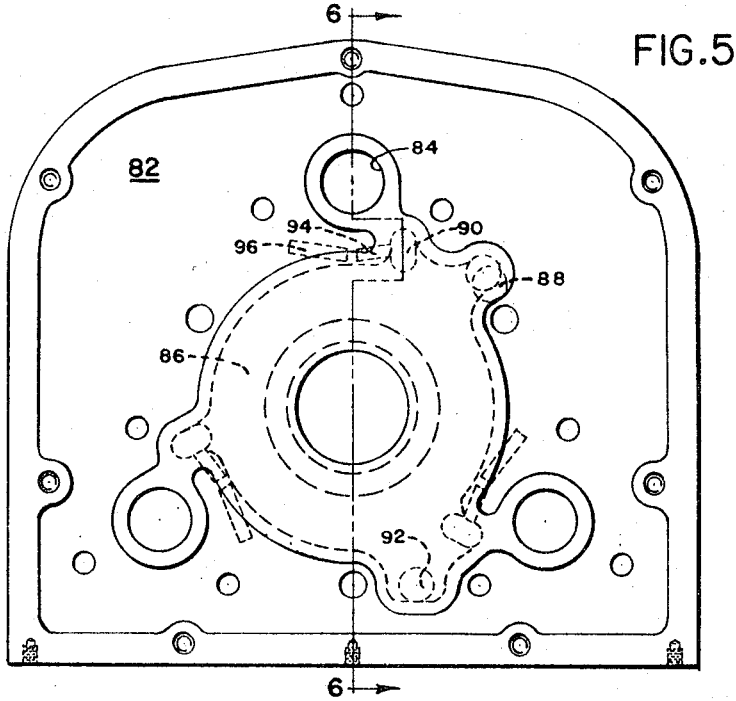
FIG. 5 is an end view of the pump discharge manifold.
Figure 7:
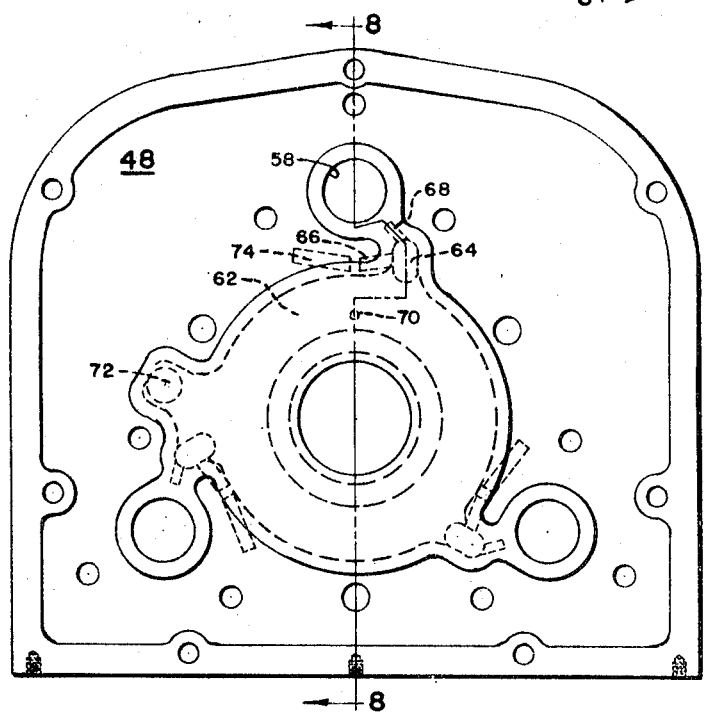
FIG. 7 is an end view of the pump suction manifold.
Figure 8:
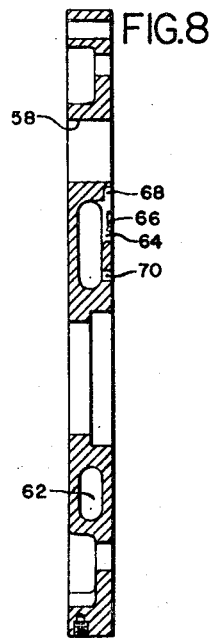
FIG. 8 is a vertical section of the pump suction manifold, taken on line 8—8 of FIG. 7.

(3) Retarder pump discharge manifold.—Referring to FIGS. 4, 5 and 6, hydrostatic retarder 14 includes a discharge manifold 82 maintained in proper fixed relation with pump body 22 and manifold 48 through use of dowels 50, pump body bolts 52 and nuts 54. Discharge manifold 82 has three planet gear shaft bearing-mounting bores 84 which are radially and circumferentially aligned with bearing-mounting bores 58 of suction manifold 48. A set of closed-end type needle bearings 60 are properly press-fitted in bores 84. Manifold 82 is provided with centrally located bores sized to receive one of the sun gear quill-supporting bearings 76 and one of the oil seals 78.

Preferably cored within the vertical wall of manifold 82 is a discharge-communicating passage 86 having a main fluid discharge outlet port 88 located to register with discharge passage 40 of pump body 22. Passage 86 is provided with three fluid inlet ports 90 for conveying fluid, when discharged by pump gears 26 and 30 into spaces provided by recesses 33, into passage 86. Passage 86 is also provided with an alternate fluid discharge outlet port 92 located so as to register with passage 44 of pump body 22.

Inlet ports 90 are extended to form shallow, typical discharge trap-relief channels 94. Manifold 82 is preferably also provided with shallow, typical suction trap-relief channels 96 as shown in FIG. 5. The outer rim portion of manifold 82 is provided with a plurality of holes to accommodate certain mounting bolts 81 (see FIG. 1) which are located to appropriately fasten transmission 16 to manifold 82.

(4) Retarder pump planet gears.—Referring to FIGS. 3 and 4, each of the planet gears 30 of hydrostatic retarder 14 are shown mounted on a planet gear shaft 98 which is rotatably supported by needle bearings 60 carried by manifolds 48 and 82. Unitary rotation of gears 30 with shafts 98 is achieved through use of interference fits therebetween or use of a shaft key (not shown). Planet gears 30 are preferably deeply grooved or recessed in their sides to remove excess weight affecting their mass inertia and to reduce fluid friction between gears 30 and manifolds 48 and 82. Such recessed areas are connected by a plurality of holes for fluid passage therethrough, whereby the fluid is removed by the suction grooves 68.

(5) Retarder pump sun gear.—Power input to hydrostatic retarder 14 is through means comprising an adapter quill (or hollow shaft) 100 slidably mounted within sun gear 26. As illustrated in FIGS. 3 and 4, sun gear 26 is deeply grooved or recessed in its sides to remove excess inertia-producing weight and fluid friction between sun gear 26 and manifolds 48 and 82. The remaining gear web is provided with a plurality of holes to implement fluid transfer to pressure-relieving port 70.

Quill 100 is provided with external splines fitted for axially slidable mating with internal splines broached within the central bore of sun gear 26. Quill 100 is internally splinded to mate with external splines of output shaft 12 of torque converter 10, which extends through retarder 14 to form the input shaft for transmission 16. The end portions of quill 100 are appropriately machined to receive its support bearings 76 and its fluid retaining seals 78. Seals 78 may be of the duplex type to prevent exchange of fluids between retarder 14 and other fluid-containing apparatus such as torque converter 10 and transmission 16.

(6) Sump.—As heretofore described, bottom surfaces of pump body end wall extensions 46 and of bottom rim portions of manifolds 48 and 82 are machined to provide an appropriate mounting surface for a sump identified by general reference numeral 102. As viewed in FIGS. 3 and 4, the top flanged portion of sump 102 is assembled to pump body 22 and manifolds 48 and 82 by use of cap screws 104. A gasket or seal (not shown) may be used to afford fluid-tight joining of these members.

To assist descriptions of fluid circuits to follow later, numerals 106, 108, 110 and 112 designate passages for fluids entering or leaving sump 102, said passages being shown as openings threaded to receive usual pipe or tubing fittings (not shown). Sump 102 also may be provided with usual fill pipe and drain plugs (not shown).

(7) Retarder pump oil supply unit.—As briefly mentioned in the Vehicle Retarding, a positive displacement pump loses practically all of its fluid suction capability when operated under conditions involving circulation of substantially only air through the pump. Pump suction capability is quickly restored when a relatively small quantity of oil is intermixed with the air being circulated by the pump. In the present invention, the pump oil supply unit 114 is generally similar to that described in detail in my Patent 3,144,923, which is referenced for background information. The supply unit shown in the patent has been modified to serve new and different operating conditions involved with my hydrostatic retarder. The modified pump oil supply unit, identified by general numeral 114, is illustrated in FIGS. 2 and 3.

Referring particularly to FIG. 3, pump oil supply unit 114 includes two tubular elements 116 and 118. Element 116 forms the main oil supply-controlling facility for the power-absorbing pump of retarder 14. The lower end of element 116 is shown connected by a conduit 202 to the outlet of a heat exchanger 204, the inlet of which is connected to passage 108 of sump 102 by use of a fluid conduit 120. It will be understood that passage 108, may, internally of the sump 102, be provided with a screen or foreign particles strainer (not shown but well known to the art). The upper end of element 116 is provided with a conduit 122 leading to an oil supply port of control valve 136 to be described later.

Element 116 contains a check valve 124 which is gravity-actuated to close the passage connecting conduit 202 during neutral retarder operations or when retarder 14 is at rest, to prevent the emptying of element 116 into sump 102. Element 116 is provided with a check valve-retaining tab 128 which maintains the check valve 124 in reasonably close proximity with its seat so as to stop reverse flow through conduit 120 without undue delay. Element 116 is also provided with a chamber 126 forming an oil passage from a pump-priming element 118.

Element 118 functions as the primary pump-priming portion of pump oil supply unit 114. Generally having considerably greater volume than element 116, element 118 contains a buoyant float-check valve 130 which is shown disposed at either a top-element or bottom-element position according to operating conditions to be hereafter described. The bottom wall of element 118 is shown forming the top wall of chamber 126 and this wall has a valve seat-type opening closeable by the float-check valve 130.

It will be noted that priming element 118 is vertically disposed so as to contain a considerable quantity of oil located above the pitch-line junction of sun gear 26 and the planet gear 30 that is positioned directly vertically above sun gear 26, the referred-to junction being the point of greatest distance to which oil from sump 102 must be elevated by means of vacuum forces of pump suction. The considerable quantity of oil within element 118 disposed above the stated pitch-line junction is selectively available to the pump of retarder 14 by gravity flow via chamber 126, element 116 and conduit 122.

The upper end of element 118 has an opening connected to a small discharge fluid by-pass conduit 132 the function of which will be described later.

Pump supply unit 114 is fastened to pad 34 of pump body 22 by means of cap screws 134.

(8) Retarder main control valve.—Referring to FIGS. 2, 3, 9, 11 and 10, hydrostatic retarder 14 is provided with a main control valve designated by general numeral 136, shown mounted on pad 36 of pump body 22 by use of bolts 138. Control valve 136 consists of a centrally bored valve body 140, two end caps 176 and 178, a fluid conduit-adapting manifold 166 and a slidable spool valve piece 182, all of which will now be described in detail.

Valve body 140 is generaly of rectangular shape having opposite flat machined surfaces to facilitate mounting on pad 36 of pump body 22 and attaching conduit manifold 166. Suitable gaskets (not shown) are employed if desired. The central bore of body 140 is provided with an annular pump fluid discharge groove 142 having a fluid inlet port 144 passing through the body wall so as to register with discharge passage 40 of pump body 22. A similar annular pump fluid suction groove 146 is provided within body 140 and groove 146 has a fluid outlet port 148 passing through the body wall so as to register with suction passage 42 of pump body 22.

Valve body 140 has an annular oil discharge groove 150 which is provided with an oil outlet port 152 passing through the body wall diametrically opposite the heretofore described ports 144 and 148. An annular air discharge groove 154 is axially spaced from the pump discharge groove 142 and it has an air outlet port 156 located similarly to port 152 and passing through the body wall as shown. Another annular groove 158, axially spaced from the air discharge 154, functions as an oil suction passage and it is provided with an oil inlet port 160 passing through the body wall. Valve body 140 also has an annular air suction groove 162 which is provided with an air inlet port 164 passing through the body wall, the groove 162 being axially spaced from the pump fluid suction groove 146.

The fluid conduit-adapting manifold 166 may be incorporated as an integral part of valve body 140, but is shown as being a separate part held in fluid-tight association with valve body 140 by control valve mounting bolts 138. Manifold 166 is provided with preferably cored passages 168, 170, 172, 174 the inner ends of which emerge through the wall of manifold 166 so as to register with ports 152, 156, 160 and 164, respectively, of valve body 140. The outer ends of passages 168, 170, 172 and 174 are appropriately drilled and threaded to receive fittings for the various conduits connected thereto.

Control valve 136 has its central bore closed at its lower end by means of an end cap 176 held in fluid-tight assembly with valve body 140 by a plurality of cap screws as shown (not numbered). An upper end cap 178 is similarly held in fluid-tight assembly with valve body 140 and cap 178 contains an oil seal 180 to prevent fluid escaping from the valve bore past the actuating stem of a spool valve piece identified by general numeral 182, description of which now follows.

Control valve 136 is employed to determine the nature as well as the quantity of fluids being circulated by the power-absorbing pump of hydrostatic retarder 14, through selective axial movement and positioning of its spool valve piece 182. Spool valve piece 182 has an actuating valve stem 184 extending exteriorly of valve 136, through end cap 178. Valve stem 184 is shown provided with a hole 186 through which, for example, the clevis pin of a remote control cable or other well-known linear actuating member (not shown) may be assembled for attaching such actuating member thereto.

Spool valve 182 has spool-like portions diametrically sized for fluid-sealing sliding fit within the central bore of valve body 140 and located relatively for coaction with or control of all of the annular fluid-handling grooves within valve body 140 heretofore described. An upper portion 188 is located so as to close oil discharge groove 150 during neutral operation of retarder 14 and to operate as a sliding separating wall between fluid discharge groove 142 and end cap 178 at all operating positions of valve piece 182. Referring to the valve position shown in FIG. 3, an intermediate valve portion 190 will be seen located immediately below, or to the right of annular air discharge groove 154, portion 190 extending to the right sufficiently to cover annular oil suction groove 158.

Valve piece 182 has a lower end portion 194 which abuts the inner face of end cap 176, which cap is the valve stop for the neutral position 1 illustrated in FIG. 3. Valve portion 194 is of sufficient length to be immediately adjacent the lower or right edge of air suction groove 162 so that this groove will be progressively closed simultaneously with closing of air discharge groove 154 by valve portion 190 as valve piece 182 is moved upward or to the left from position 1.

Valve stem 184 has a relatively small fluid transfer passage 196 drilled lengthwise of the stem, beginning at the outer end of valve portion 194 and ending just beyond valve portion 188. An intermediate passage 198, connecting with passage 196, is located between valve portions 190 and 194. The upper end of passage 196 has two or more holes 200 drilled through the stem 184 above the valve portion 188. Passages 196 and 200 provide for transfer of fluid displaced from the upper end of the spool valve compartment when valve portion 188 is moved toward end cap 178 during movement of valve 182 from position 1 toward a position 3 indicated in FIG. 3, and displaced from the lower end of the compartment when valve portion 194 approaches end cap 176 during movement of valve 182 from any of its advanced positions back toward position 1.

A relatively low vacuum is provided for both of the valve compartment end areas including trouble-free functioning of oil seal 180 effected by passage 198 which opens passage 196 into an area which is in communication with pump suction groove 146 at all positions of the valve 182.

End cap 178 functions as a valve stop for the valve 182 when it is moved to position 3 for maximum retarder engagement. Detailed description of all phases of fluid circulation control through use of the control valve 136 will be provided in Retarder Operation sections later in this specification.

(9) *Fluid conduits.*—To now complete the description of conduits required to provide fluid passage-ways between the various components of hydrostatic retarder 14 (conduits 120, 122 and 202 have been heretofore described), oil discharge passage 168 of valve manifold 166 is provided with a conduit 206 communicating with sump opening 106. Conduit 206 has a relatively small by-pass conduit 132 connecting it to pump priming element 118 of pump oil supply unit 114, the function of by-pass 132 being described later. Air discharge passage 170 is provided with a conduit 208 connecting it to sump opening 112. Air suction passage 174 has a conduit 210 leading to sump opening 110, which is provided with a tube 192 (often called a "venturi type tube" in the trade) within sump 102, the lower end of which may be provided with a screen (not shown). Tube 192 introduces a relatively small flow of oil into the flow of air carried by conduit 210 for intermixture therewith to lubricate moving parts of retarder 14 during extended periods of neutral operation thereof.

While I have chosen to diagrammatically illustrate fluid-carrying conduits which may comprise well known tubing and tubing fittings, so as to avoid prolix disclosure requiring additional sheets of drawing and specification were said conduits replaced by passages cored integrally within pump body 22 and manifolds 48 and 82, I wish to exemplify how such cored passages may be employed to supplant use of practically all of the tubing conduits diagrammatically illustrated herein.

Sump opening 106, remaining where shown, would become the outlet of a passage cored within the sump's vertical wall, registering, as at its flanged junction with manifold 48, with a passage cored within the wall of manifold 48 leading to the area of the main control valve's oil discharge opening 168 for communication therewith, thus replacing conduit 206. By-pass line 132 would be replaced by a drilled (or cored) passage communicating the just-described passage with element 118 of pump oil supply unit 114.

Another cored passage in the manifold 48 would be arranged to lead from the fluid outlet of pump oil supply unit element 116, at its upper end, to the area of the valve manifold's opening 172 to communicate therewith, dispensing with conduit 122. Except for certain fluid lines 120 and 202 connecting a usually remotely located heat exchanger 204 to retarder 14, all required fluid passage-ways may be cored within the walls of pump body 22 and manifolds 48 and 82.

Further simplification of the retarder's fluid passages may be accomplished by incorporating pump oil supply unit 114 as an integral part of manifold 48 or pump body 22. Control valve 138 may be incorporated as an integral part of pump body 22, in which event ports 152, 156, 160 and 164 of the eliminated valve manifold 166 would be located 90 degrees to the left or to the right of vertical center-line of valve 138 so as to register with the openings associated with the various passage-ways integrally incorporated with manifolds 48 and 82.

(10) *Automatic torque limiting valve.*—An automatically operable pressure-relieving means, employed to establish a selective maximum torque to be absorbed by retarder 14, is identified by general numeral 212. Valve 212 may be incorporated as an integral part of pump body 22 but is illustrated as a separate part mounted upon the pad 38 of pump body 22 by use of bolts 214. Valve 212 has a body 216 which has a discharge fluid inlet port 218 registering with alternate fluid discharge passage 44 of pump body 22. Inlet port 218 communicates with a longitudinally disposed central bore 220 having preferably a plurality of fluid outlet ports 222. One end of the bore 220 is provided with a fluid-tight plug 224 shown retained within the bore 220 by use of a cross-pin 226.

A free-floating spool valve, identified by general numeral 228, is sized for fluid-sealing, axially slidable movement within bore 220 of valve body 216. Valve 228 consists of a valve stem 230, an inner end portion 232 and an outer end portion 234. Outer end portion 234 is provided with an axially located protuberant knob 236 the curved outer end of which abuts plug 224 to act as a stop for valve 228. Knob 236 provides practically zero end area reduction of valve portion 234 for pressure-response when abutting plug 224. Valve 228 is also provided with a fluid passage 238 communicating the discharge fluid region surrounding valve stem 230 with a pressure chamber 240 located within valve body bore 220 between end plug 224 and valve portion 234.

Valve portion 232 is of sufficient length to effectively close the fluid discharge outlet ports 222 when the valve's knob 236 abuts plug 224. A compression spring 242, preferably designed so as to have a minimum force build-up when compressed more than required to provide the selected operating thrust, is installed within valve body bore 220. The outer end of spring 242 is fixedly positioned by a spring retainer 244 held within bore 220 at the end opposite that of plug 224 by use of a cross-pin 246. The inner end of spring 242 rests against the inner end portion 232 of spool valve 228.

To briefly describe the automatic functioning of the valve 212, spring 242 exerts the particularly selected, substantially constant thrust force upon valve 228 in the direction toward chamber 240, maintaining outlet ports 222 closed until the magnitude of torque being absorbed by retarder 14 reaches the desired maximum level. The retarder pump torque-created fluid pressure within chamber 240 now exerts sufficient thrust force upon valve 228 to overcome the thrust of spring 242 acting thereupon, moving valve 228 to the left so as to partially open the valve's outlet ports 222, providing sufficient flow of fluid discharged by the pump through ports 222 to prevent the absorbed torque from exceeding the selected maximum level.

(11) *Modified automatic torque limiting valve.*—Referring to FIG. 13, a modified form of valve 212 is illustrated, together with a novel remote control system therefor, which is particularly adaptable to immobile installations of the retarder 14 such as, for example, in land-based aircraft landing or arresting apparatus of the general type shown in FIG. 12. Parts of the modified valve form that are identical to the valve 212 and to other adjacent parts carry the same identification numerals, while modified, new and additional parts are given numerals having three digits in the 300 and 400 series.

The modified valve 312 has a shorter valve body 316, the end opposite that containing pressure chamber 240 being partially circumferentially flanged to facilitate mounting of a guide element 350 by use of cap screws 352. Guide element 350 is provided with a passage 354 to permit free escape of any fluids collecting within the area of bore 220 enclosed by guide element 350 and the valve 228. Guide element 350 is also provided with a pair of extended bar portions 356 the outer ends of which are drilled to receive a pivot cross-pin 358.

Guide element 350 is centrally longitudinally bored to receive a valve actuating rod 360, which is sized for suitable sliding fit within said bore. The outer end of rod 360 is fashioned to form a slotted crosshead within which is mounted a cam-follower type roller 362 carried by a cross-pin 364. It should be noted the thickness of roller 362 is only slightly less than the width of space between bar portions 356 so that such bar portions permit free longitudinal movement of rod 360 while preventing same from rotating about its axis.

Pivot cross-pin 358 mounts a motion transfer arm 366 having a curved roller-contacting surface such that its contact with roller 362 is maintained approximately in line with the axis of rod 360 throughout the rod's longitudinal travel, the end-of-travel contact between roller 362 and arm 366 being designated as approximately at point A of said curved surface.

Pump body 322 is identical to the heretofore described pump body 22 except that its sump-mounting wall portion 346 is horizontally bored to receive a combined rod-guide and control-pivoting member 368. Member 368 is maintained in fluid sealed association with pump body portion 346 by an O-ring 372 and held in fixed relation with pump body 322 by use of a set screw 370. Member 368 is centrally longitudinally bored for slidably supporting and guiding an arm-actuating rod 374. A suitable oil seal 376 is shown installed in the outer end-wall of member 368 to prevent fluid escape along arm-actuating rod 374.

Arm-actuating rod 374 has its inner end fashioned so as to form a slotted crosshead within which is mounted a cam-follower type roller 378 carried by a cross-pin 380. The side surface of the motion transfer arm 366 which is contacted by roller 378 is curved so that its contact with roller 378 is maintained approximately in line with the axis of rod 374 throughout its longitudinal travel, the end-of-travel between roller 378 and arm 366 being designated as approximately at point B of said curved surface. Roller 378 has a thickness slightly less than the width of space provided between two extended bar portions 382 of member 368 so that such bar portions 382 permit free longitudinal motion for rod 374 while preventing it from rotating about its axis.

Use of the pivoted motion transfer arm 366 mounted between rollers 362 and 378 provides a leverage advantage of approximately two-to-one for rod 374 over rod 360.

The outer end of arm-actuating rod 374 is provided with a cap 384 retained on rod 374 by a cross-pin 386. Cap 384 has a curved relief surface below its horizontal center-line so that effects of the arc of travel of associated rod-actuating members pivotally supported by the members 368 are substantially cancelled through continuous contact with cap 384 in line with the axis of rod 374.

Member 368 is shown provided with a projecting control-pivoting bracket portion 388 for oscillatably supporting a remotely adjustable, selectively variable constant-force transmitting system identified by general numeral 390. While I have chosen to illustrate a gravity-actuated control system to selectively vary the automatic torque limiting operating level of valve 312, one of numerous other types of variable-force generating systems (such as, for example, electrical solenoids, electrical torque motors and hydraulic or pneumatic linear actuating cylinders having variable actuating pressure sources) may be employed to produce a selectively variable constant thrust force upon rod 374.

System 390 consists of a rib-reinforced frame 392 having a U-shaped inner end portion 394 pivotally mounted astraddle bracket 388 by use preferably of an antifriction bracket-mounted bearing 396 and a pivot shaft 398. The lower end of end portion 394 is provided with a cross-pin 400 upon which is mounted a cam-follower type roller 402 located so as to coact horizontally thrust-wise upon cap 384 of rod 374. Frame 392 is provided with an under-mounted end bearing standard 404 and an intermediate under-mounted bearing standard 406. Standard 404 is bored to form a bearing surface for an un-threaded portion of a weight-moving threaded shaft 408. The near end portion of shaft 408 is of reduced diameter so that the inner side of standard 404 may be used to axially locate shaft 408, which end portion of shaft 408 is radially supported within standard 404. Anti-friction radial and thrust bearings (not shown) may be provided to support shaft 408 if desired.

Shaft 408 is equipped with a key 410 insuring its unitary rotation with a gear 412, which gear has an outside diameter which is sufficient to extend through a slotted area 414 of frame 392, whereby the teeth of gear 412 are above the upper surface of frame 392. Gear 412 is axially retained by standards 404 and 406. Frame 392 has a vertically disposed electric motor mounting plate portion 416 located adjacent the frame's edge, to which is fastened a reversible electric motor 418 by use of cap screws 420. A worm gear 422 is securely fastened to the armature shaft 424 of motor 418 for proper operative association with gear 412.

An end standard 426 is located in fixed relation to frame 392, being positioned and fastened to its outer end through use of dowels 428 and cap screws 430, permitting standard 426 to be line-bored together with standards 404 and 406 to accommodate shaft 408, the outer end of which shaft is of reduced diameter to provide a shoulder whereby shaft 408 is axially retained by standard 426.

A traveling weight 432 is supported on the threaded portion of shaft 408 by means of its vertically disposed threaded weight supporting arm 434. Weight 432 is maintained in proper traveling attitude with frame 392 and shaft 408 by means of a guide rod 436 assembled through a hole drilled longitudinally of arm 434, the rod 436 being mounted parallel with shaft 408 and supported by standards 406 and 426.

Traveling weight 432 is provided with a visual weight-position indicating pointer 438 arranged to register with a suitably numbered maximum torque level indicating strip 440 shown mounted on the reinforcing rib of frame 392. Pointer 438 or arm 434 may be provided with a suitable electrical contact or other pickup indicating system to reveal the operatng positon of weight 432 relative to the torque level indicating strip 440, remotely of the system 390 and the hydrostatic retarder 14.

(B) Operation as a vehicle retarder (1) Direction of input rotation.—As viewed from the outer end of torque converter 10 in FIG. 1, direction of rotation of shaft 12 is clockwise. Consequently, viewing quill 100 as seen at line 3—3 of FIG. 1, direction of input rotation of quill 100 and pump sun gear 26, imparted by shaft 12 and its associated shaft 18 of transmission 16, is counter-clockwise as indicated by the arrow in FIG. 3.

(2a) Oil charging and oil level.—Retarder 14 is initially charged with a suitable operating fluid such as oil, during which charging operation pump gears 26 and 30 are rotated for a short period of time with valve stem 184 located at position 2, whereby all oil passages including heat exchanger 204 and pump oil supply unit 114 are filled with oil. Valve stem 184 is then moved to position 1 for neutral operation of retarder 14, ball check valve 124 then closing fluid conduit 202 and float-check valve 130 then rising to its top-element position as rotation of pump gears 26 and 30 cease, due to input rotation of quill 100 being stopped.

(2b) With retarder 14 stationary, the quantity of oil in sump 102 is changed as required so as to provide a neutral operating oil level at approximately line Z of FIG. 3. Air resides within sump 102 above line Z and within conduits 208, 210, interdental spaces of pump gears including suction and discharge passages communicating said gears with valve 136.

(3) Suction circuits: General.—Referring to FIGS. 2, 3, 4, 7, 9 and 8, the fluid suction circuit provided for pump gears 26 and 30 may be said to originate at spaces defined by recesses 32 of pump body 22 including suction trap-reliefs 66 and 96, flow-wise then descriptively reversely progressing through suction ports 64 into passage 62, through its fluid inlet port 72, through passage 42 and port 148 communicating with suction groove 146 of the main valve 136. The suction circuit within body 140 of valve 136 branches into two paths. One path is the air suction groove 162, its air inlet port 164 and conduit 210 communicating with the air zone of sump 102. The other path is the oil suction groove 158, its oil inlet port 160 and conduit 122 communicating indirectly with the oil zone of sump 102. Both paths are subject to complete flow control by portions 190 and 194 of spool valve 182.

(3a) Suction air circuit.—Main control valve 136 is set for neutral operation of retarder 14 when valve stem 184 is situated at position 1 (see FIG. 3). Substantially only air enters conduit 210 through sump opening 110. The air then passes through opening 174 of valve manifold 166, travels through air inlet port 164 and annular air suction groove 162 to then enter fluid suction groove 146 and the general suction circuit heretofore described.

(3b) Suction oil circuit.—When valve stem 184 is shifted upward from its position 1 toward its position 2, portion 194 of spool valve 182 progressively closes annular air suction groove 162 while portion 190 simultaneously opens annular oil suction groove 158. Air suction groove 162 is fully blocked from the suction circuit and oil suction groove 158 is fully open to the suction circuit when valve stem 184 is at position 2 (see FIG. 10). Only oil is permitted to enter the suction circuit from position 2 to position 3 inclusive, oil flowing through sump opening 108, conduit 120, heat exchanger 204, conduit 202, pump oil supply unit 114 and conduit 122 communicating with valve manifold opening 172, thence flowing through oil inlet port 160 and oil suction groove 158 for entry into the general suction circuit heretofore described.

(3c) Automatic pump priming.—During the initial upward shift of valve stem 184 from its neutral retarder operating position 1 whereby portion 190 of spool valve 182 has slightly opened oil suction groove 158 to the general suction circuit, oil will flow by gravity from pump priming element 118 through chamber 126, pump oil supply element 116 and conduit 122 to flow through valve 136, thence into the general suction circuit to prime and initially satisfy the suction demands of pump gears 26 and 30. As the quantity of oil needed by pump gears 26 and 30 during upward advancement of spool valve 182 and simultaneously, as caused by increased suction capabilities of said pump gears resulting from the described priming, exceeds the quantity of oil available from pump priming element 118, the oil level therein lowers until float-check valve 130 reaches its bottom-element position, whereby the opening between element 118 and chamber 126 is closed. Primed pump gears 26 and 30 are now provided with oil flowing through pump oil supply element 116, conduit 202, heat exchanger 204 and conduit 120 communicating with sump opening 108.

Subsequent non-rotation of pump gears 26 and 30 when retarder 14 is brought to rest, or when subsequent neutral operation of retarder 14 is attained by returning spool valve 182 to position 1, is accompanied by return of ball check valve 124 to its seat, closing conduit 202. Cessation of suction forces acting to maintain float-check valve 130 at its bottom-element position permits it to return to the top of element 118 which has been re-filled with oil by conduit 132, and element 118 is ready for the next pump priming cycle.

(4) Dicharge circuits: General.—Referring to FIGS. 2 through 6 and 9, pump gears 26 and 30, during their rotation by quill 100, receive fluid from the suction circuit as heretofore described, delivering same to spaces defined by recesses 33 of pump body 22, including trap-reliefs 74 and 94. The positively-displaced discharge fluid then enters passage 86 through its fluid inlet ports 90, for delivery to either its main outlet port 88 or its alternate outlet port 92, or both, as hereafter described.

(4a) Fluid discharge circuit: Main valve at neutral position 1.—When main control valve 136 is set at position 1 for neutral operation of retarder 14, substantially only air is delivered by discharge passage 86 to its main outlet port 88. The pump-discharged air then passes through passage 40 of pump body 22 to enter the central bore of valve body 140 through its fluid inlet port 144. The air then emerges from fluid discharge groove 142 to freely return to sump 102 through air discharge groove 154, port 156, conduit 208 and sump opening 112. Retarder 14 "floats" on the power-delivering line represented by shafts 12 and 18, the retarder absorbing practically no power.

(4b) Fluid discharge circuit: Main valve at position 2.—Referring to FIGS. 3 and 10, the nature of suction fluids changes as previously described in (3b), during movement of spool valve 182 from position 1 to position 2. Power absorption by retarder 14 progressively increases as suction fluids change from substantially only air, through intermixed proportions of air and oil, to only oil, also as portion 190 of valve 182 partially closes pump discharge groove 142. When spool valve 182 is set at position 2, its portion 190 has closed air discharge groove 154 and groove 154 remains closed during movement of valve 182 from position 2 to and including position 3.

Oil discharge is through groove 150 and its outlet port 152, through opening 168 and conduit 206 to sump opening 106, including a portion of said oil discharge being conveyed to pump priming element 118 by by-pass conduit 132.

(4c) Oil discharge: Automatic torque-limiting valve.—Installation of retarder 14 as a vehicle drive-line component illustrated in FIG. 1, or in other manners of association with vehicular retardation some of which were set forth in the "Vehicle Retarding," may be considered as including selection of a spring 242 installed within torque-limiting valve 212 which exerts the proper amount of thrust upon spool valve 228 to establish a desired maximum torque-absorption level which will afford adequate protection for all other drive-line components with which retarder 14 is operatively associated.

Primarily related to the advancement of spool valve 182 from position 1 toward position 3, the amount of torque imposed upon quill 100 of retarder 14 by a vehicle and its load may create a discharge circuit and pump oil pressure within retarder 14 which exceeds that providing the selected maximum torque absorption level, caused through positioning valve 182 to obtain a particular rate of vehicular deceleration.

Referring to FIGS. 2 through 5, discharged oil within passage 86 of manifold 82 can flow through alternate outlet port 92, into and through passage 44 of pump body 22 to enter valve 212 through its inlet port 218, where the oil surrounds stem 230 of spool valve 228. The discharged oil (and oil pressure) is conveyed to pressure chamber 240 of valve 212 by passage 238 of spool valve 228. When the pressure within chamber 240 becomes excessive to the selected level, hydraulic thrust exerted upon spool valve 228 exceeds the thrust of spring 242 and valve 228 automatically moves to the left (see FIG. 3) until discharge outlet ports 222 of valve 212 are opened sufficiently to permit enough oil to escape therethrough directly into sump 102 to reduce the discharge circuit pressure to the level which provides the selected maximum torque absorption level. Some oil discharge through main valve 136 may also prevail as described in (4b), depending upon the magnitude of vehicle load and its travel velocity as related to attempted deceleration of said vehicle through positioning of spool valve 182.

(4d) Oil discharge: Main valve at position 3.—Referring to FIGS. 3 and 11, the fully engaged operation or the maximum rate of power absorption for retarder 14 is achieved by moving spool valve 182 to position 3. Portion 190 of spool valve 182 now fully closes oil discharge groove 142, completely arresting flow of pump-discharged oil through main valve 136. Assuming that the amount of torque imposed upon quill 100 of retarder 14 by a vehicle and its load does not exceed the selected maximum torque absorption level, such complete arrest of pump-discharged oil flow through valve 136 shall have resulted in obtaining substantially zero forward motion of said vehicle.

If, however, the amount of torque imposed upon quill 100 by a vehicle and its load does exceed the selected maximum torque absorption level during deceleration of said vehicle, a sufficient amount of oil will be automatically discharged through valve 212 to reduce the torque being absorbed by retarder 14 to the selected maximum level, to remain thereat or to fall below such maximum level as conditions of deceleration may require.

(C) Operation of retarder equipped with modified form of torque limiting valve

The foregoing description of operation of retarder 14 in use as a vehicle retarder is generally applicable as description of operation of a hydrostatic retarder identified by general numeral 612 (see FIGURE 12) which is particularly adaptable to fixed or immobile installations. The retarder 612 is generally identical in structure to that of retarder 14 except that it is provided with a full-range variable maximum torque-maintaining valve 312 the operation of which will be described later.

A capability to selectively vary the level of automatically regulated maximum torque absorption during actual operation, especially characterizes retarder 612, in comparison with retarder 14 which is limited to a pre-selected maximum torque absorption level as provided by its valve 212. Such capability is highly desirous with numerous retarder installations, of which a land-based aircraft launching and arresting system's use of one or more hydrostatic retarders 612, as illustrated in FIG. 12, is one example.

(D) Combined oil reservoirs

One example of combining the retarder with other hydraulically operating or hydraulically actuated power transmission apparatus, wherewith the fluid reservoir of such other hydraulic apparatus is employed as a source for oil to operate the retarder, is illustrated in FIG. 16.

Hydraulic apparatus 16 is such as, for example, a hydraulic torque converter, hydraulically actuated power-shift transmission or the like, having a fluid reservoir or main sump 102.

The modified retarder 14 may be considered as being mechanically operatively associated with the hydraulic apparatus 16. Retarder 14 includes a fluid-collecting sump 102ᵃ enclosing the automatic torque-limiting valve 212. Sump 102ᵃ is provided with an inter-sump communicating oil passage 102ᵇ having ample flow capacity to transfer all oil discharged through valve 212 to main sump 102 without causing undue back-pressure.

The modified retarder 14 is provided with an air and oil separating air supply tank 102ᶜ which is preferably mounted so that the bottom portion thereof is vertically above the top portion of sump 102 of the hydraulic apparatus 16. The retarder's main control valve 136 is provided with an air inlet passage 210 and an air return passage 208, both passages being arranged to communicate with the top portion of air supply tank 102c.

Air return passage 208 is provided with an elbow or other fluid-stream deflecting means internally of tank 102c so as to direct returned fluid downward toward the bottom portion of tank 102c to assist separation, by gravity, of any oil which is contained in the fluid stream passing through tank 102c. An oil-draining passage 102d communicates the bottom of tank 102c with inter-sump passage 102b for oil return flow therethrough into the main sump 102.

The retarder's main control valve 136 is provided with a retarder fluid discharge communicating passage 144 and a retarder fluid suction communicating passage 148. Valve 136 is also provided with an oil return passage 206 leading to the main sump 102, including a branch passage 132 leading to the top of the priming portion of pump oil supply unit 114 to replenish the priming oil supply therein. An oil supply passage 122 communicates pump oil supply unit 114 with the oil inlet of valve 136.

Retarder 14, after priming, draws oil from main sump 102 via passage 120, an optional heat exchanger 204 and the valve 136.

AIRCRAFT RETARDING

In the field of air travel, airport runway lengths frequently are a substantial problem to the take-off and landing of jet or other aircraft. Such problem is accentuated, not only by inclement weather conditions, but also by the future probable transition from sub-sonic aircraft to super-sonic aircraft. A practicable solution is the use of land-based launching and arresting gear or systems to assist the take-off of aircraft and to retard and arrest the forward travel of aircraft after touch-down, said gear or systems employing certain variable torque and speed transmitting or absorbing hydraulic apparatus of the type and character referred to, or defined herein.

My variable power absorbing hydraulic apparatus may be applied to an aircraft arresting and/or launching system, as will be illustrated by the following description of a specific embodiment of my invention. Implicit in the following is the fact that my variable power absorbing hydraulic apparatus has general application to various landing systems (besides the one specifically described), e.g., most arresting systems use a pendant cable which hooks to the landing aircraft and arresting is provided through cables or other flexible tension members attached to the pendant cable and some means are used to brake or otherwise resist movement of the cables or the like (such as by brakes or more exotic resistance systems). Any such cable or the like can be led around capstan means and my variable power absorbing hydraulic apparatus can be used to retard rotation of the capstan.

In the specific embodiment, I provide the following general type of system:

(a) moving endless main cables (usually one on each side of a runway)
(b) a pendant cable adapted to be attached to the moving main cables when arrestment or launching is initiated
(c) capstan means engaged with said main cables
(d) power and arresting means connected to the capstan including
   (1) power means for moving said main cables
   (2) a form of my variable power absorbing hydraulic apparatus for retarding rotation of the capstan during arrestment
   (3) a type of flywheel for storing up energy prior to launching.

The description hereafter will be essentially in the following order:

(1) General description of the system
(2) Description of operation
(3) Further details of various subsystems and assemblies.

To generally describe the system and referring particularly to FIG. 12, a typical airfield runway, generally identified by numeral 500, is arranged with launching/arrestment staging areas 502 and 504 located adjacent the thresholds of runway 500. To give a specific example illustrating typical runway and installation dimensions, the over-all length of runway 500 is given as 10,000 feet, the distance from battery 506 to battery 508 is 1800 feet, the distance from battery 508 to battery 510 is 5000 feet, the distance from battery 510 to battery 512 is 1800 feet, and the distance from the thresholds of runway 500 to batteries 506 and 512, respectively, is each 700 feet (whereby the arresting batteries are inside of the normal touchdown location of landing aircraft).

Staging area 502 is provided with two battery positions 506 and 508. Staging area 504 is provided with two battery positions 510 and 512.

Now referring to staging area 502, a pair of cable sheaves 514 and 516 are located near the infield end of battery position 508, one being on each side of runway 500. Sheaves 514 and 516 are rotatably anchor-mounted to suitably withstand cable forces tending to pull them generally toward battery position 506, as by brackets 518 and 520, which brackets permit sheaves 514 and 516 to be tilted by means of appropriate actuators of any suitable type such as, for example, pneumatic, hydraulic, electrical, electro-hydraulic or the like.

Staging area 502 has two pairs of cable sheaves located a slight distance from the threshold end of battery position 506. One pair of sheaves 522 and 524 are anchor-mounted, by a duplex bracket 526, at the left side of the threshold area to suitably withstand cable forces tending to pull them toward battery position 508 and toward the right side of runway 500. Bracket 526 is fashioned to permit sheaves 522 and 524 to be individually raised and lowered by appropriate actuators.

Another pair of sheaves 528 and 530 are anchor-mounted, by a duplex bracket 532, at the right side of the threshold are to suitably withstand cable forces tending to pull them toward battery position 508 and toward the right side of runway 500. Bracket 532 is fashioned to permit sheaves 528 and 530 to be individually raised and lowered by appropriate actuators.

All of the heretofore described cable sheaves and their associated anchor-mounted brackets are preferably installed in vertical relation to the grade surface at each side of staging area 502 so that the upper extremities of such sheaves and brackets are approximately level with the grade surface when the various sheaves are in un-tilted, neutral operating attitudes, that is, in neither launching or arrestment attitudes. An actuator similar in type to those described to tilt sheaves 514 and 516, is provided to raise and lower each cable sheave 522, 524, 528 and 530, individually or in suitably paired combinations as desired.

Power station equipment for the launching/arrestment system may be placed underground within runway threshold areas, but for the purpose of illustration is shown installed at one side of battery position 506, at one side of battery position 512 and their adjacent thresholds.

A cable capstan shaft 534 is suitably rotatably power station base-mounted by use of adequate pillow blocks or bearings (not shown). Two cable capstans 536 and 538 are mounted upon, and keyed to the shaft 534 for unitary rotation therewith. A cable-tensioning apparatus 540 of the counterweight, piston and cylinder or other suitable type, including a cable sheath 542, is provided in operative association with capstan 536. A similar cable-tensioning unit 544 having a cable sheave 546 is provided for capstan 538. Units 540 and 544 can be adjusted in tension, for adjusting under certain main cable tension requirements during use (or for slippage of cables during system retraction) (which make hydraulic pistons preferable to mere counterweights).

Left side grade-installed equipment

An endless power-transmitting cable 548 is trained 180° around the infield cable sheave 514 for in-bound travel lengthwise of runway 500 through battery positions 508 and 506 to pass 90° around cable sheave 522, thereafter running through fairlead tubes (see FIG. 20) to cable capstan 536 around which sufficient wraps of cable 548 are placed to establish efficient power transfer between cable 548 and capstan 536. Cable 548 then progresses from capstan 536 to make a 180° turn around sheave 542 of cable-tensioner 540, then continues toward cable sheave 524 whereat it makes a 90° turn to then proceed out-bound through battery position 506. Cable 548 continues to run length-wise of runway 500, through battery position 508 to the infield cable sheave 514 to complete its circuit.

The grade installation of cable sheave 514 and its bracket 518 includes provision of a debris and moisture-collecting primary trap 552. A similar primary trap 554 is provided for the installation of cable sheaves 522, 524 and their duplex bracket 526.

Cable 548 is provided with a plurality of in-bound portion cable-supporting fairlead rollers 560. An equal quantity of out-bound portion cable-supporting fairlead rollers 562 is provided for cable 548. Each pair of fairlead rollers 560 and 562 are installed near the top of a series of secondary traps 564 which function to collect debris and moisture similarly to primary traps 552 and 554.

The in-bound portion of cable 548 is provided with flush-installed U-shaped channels 566 having faired upper edges and having a depth sufficiently greater than the diameter of cable 548 to provide for cable slack or droop between fairlead rollers 560 so that cable travel is obtained without undue abrasion. Channels 566 are arranged to occupy the longitudinal spaces between primary and secondary traps 552, 554 and 564, respectively.

The out-bound portion of cable 548 is provided with similar flush-installed U-shaped channels 568 similar to channels 566 and channels 568 likewise occupy the longitudinal spaces between primary traps 552, 554 and secondary traps 564 except for one channel portion 568ᵃ installed at battery position 506 being equipped with actuators to change and maintain its operating height.

All in-bound fairlead rollers 560 are mounted on vertically movable bases so that their predetermined operating heights can be obtained through use of suitable actuators. All out-bound fairlead rollers 562 are likewise mounted on vertically movable bases so that their predetermined operating heights can be obtained through use of actuators. The basic neutral operating height for all fairlead rollers 560 and 562 is such that the top of cable 548 is about level with the grade surface when cable 548 passes over these fairlead rollers.

Right side grade-installed equipment

Another endless power-transmitting cable 550 is trained 180° around the infield cable sheave 516 for in-bound travel lengthwise of runway 500, through battery positions 508 and 506 to pass 90° around cable sheave 530, thereafter running to cable capstan 538 around which sufficient wraps of cable 550 are placed to establish efficient power transfer between cable 550 and capstan 538. Cable 550 then progresses from capstan 538 to make a 180° turn around sheave 546 of cable-tensioner 544, then continues toward cable sheave 528 whereat it makes a 90° turn to then proceed out-bound through battery position 506. Cable 550 continues to run length-wise of runway 500, through battery position 508 to the infield cable sheave 516 to complete its circuit.

The preceding description of "Left Side Grade-Installed Equipment" associated with cable 548 applies generally to like equipment associated with cable 550. However, certain specific grade-installed equipment for cable 550 is now described to support later discussions of such equipment operation as associated with that of cable 548.

Cable 550 is provided with fairlead roller pairs 570 and 572 which are located in approximate transverse alignment with fairlead roller pairs 560 and 562 of cable 548. Fairlead roller pairs 570 and 572 are installed near the top of a series of secondary traps 574 which cooperate with a primary trap 556 provided at the installation area of cable sheaves 528, 530 and their duplex bracket 532, also with a primary trap 558 provided at the installation area of cable sheave 516 and its bracket 520, to collect debris and moisture. Each fairlead roller 570 and 572 is mounted on vertically movable bases so that their predetermined operating heights can be obtained through use of suitable actuators.

The in-bound portion of cable 550 is provided with U-shaped flush-installed channels 576 which are identical in form and size to channels 568 which are associated with the out-bound portion of cable 548. The out-bound portion of cable 550 is provided with channels 578 which are identical in form and size to channels 566 associated with the in-bound portion of cable 548, including one channel portion 578ᵃ installed at battery position 506 with suitable actuators to change and maintain its operating height.

Cross-runway pendant cable and associated battery apparatus

The battery positions 506, 508, 510 and 512 are each provided with a cross-runway pendant cable assembly identified by the general numerals 580, 582, 584 and 586, respectively. Description of pendant cable assembly 580 and associated apparatus installed at battery position 506 will also apply to pendant cable assemblies 582, 584 and 586 and associated apparatus installed at their respective battery positions, like apparatus being identical.

Pendant cable assembly 580 consists of a cross-runway cable 549 the left end of which has a properly swaged terminal that is somewhat yieldably fastened to a shuttle 588. Shuttle 588 has facilities for securely gripping cable 548 as well as facilities for being transversely retained by upper inverted L-shaped portions of channel 568ᵃ when it is moved into battery position 506 during retraction operations.

Pendant cable assembly 580 also comprises a shuttle 590 to which the right end terminal of the assembly's cross-runway cable 549 is somewhat yieldably fastened. Shuttle 590 has facilities for securely gripping cable 550 as well as facilities for being aligned with, and being retained by upper L-shaped portions of channel 578ᵃ when shuttle 590 is moved into battery position 506 during retraction operations.

The heretofore described somewhat yieldable fastening of the cross-runway pendant cable's end terminals to shuttles 588 and 590 affords one simple means to "trigger" the cable-gripping action of the shuttles whereby, upon contact of the pendant cable 549 by an aircraft's tail hook during an arrestment operation, and subsequent forceful pull thereupon by the aircraft's forward relative motion while overcoming shuttle resistance to movement along channels 568ᵃ and 578ᵃ because of friction as well as resultant forces due to the slight off-transverse angle existing, shuttles 588 and 590 begin to grip the traveling cables 548 and 550, respectively.

It should be noted that the cable-gripping facilities of shuttles 588 and 590 are self-energizing once contact has been made with cables 548 and 550 and that the cable-gripping facilities are bi-directional in action whereby an increase in power being transmitted to shuttles 588 and 590 by cables 548 and 550, respectively, during launchings, or being transmitted by shuttles 588 and 590 to cables 548 and 550, respectively, during arrestments, tends to increase the cable-gripping action. It should be further noted that shuttles 588 and 590 are provided with substantially strong springs associated with the yieldable fastening of the cable's end terminals to said shuttles, so that these end terminals are urged toward the grade-side of the shuttles so as to maintain a certain minimum tautness for the pendant cable when it is at battery position and held aloft by certain cable supports now to be described.

An actuator operated, inclined and faired primary pendant cable support 592, for use in arrestment operations, is installed at battery position 506 and located slightly off-center of the outbound portions of cables 548 and 550 (a point which is slightly off-center of runway 500). Support 592 is pivotably anchored at its threshold end so as to permit its depression to a retracted position when encountered by landing gear wheels.

The support's actuator is of forceably yieldable nature so as to permit a transient downward depression of the support and the pendant cable 549 from an arrestment-operating height by tire impacts during aircraft roll-over, the actuator causing support and cable to thereafter instantly resume normal arrestment operating height. The upper end of support 592 is suitably contoured at its cable-contacting portion so as to engage and elevationally retain the pendant cable when positioned at an aircraft arrestment operating height.

A plurality of similarly depressable, actuator operated, inclined and faired secondary supports 594 are pivotably anchor-installed at battery position 506, the installed quantity being such that the between-support cable droop, as allowed by cable tautness, does not exceed permissible limits when the pendant cable is positioned at its arrestment operating height.

All supports 592 and 594 are preferably flush-installed with the battery's runway surface and include installation of channels 596 having a depth equal to the pendant cable's diameter. A suitable debris and moisture collecting trap is provided at each support. With such supports and channels flush-installed, the retracted (non-arrestment) height of the pendant cable's top surface coincides approximately with the runway surface. Accordingly, when retracted, supports 592, 594 and the pendant cable present no appreciable obstruction to passage thereover of rolling aircraft.

In the event the heretofore described flush-installation provisions for the pendant cable 549 and its supports are not employed, the retracted height is such that the cable rests upon the battery's runway surface.

The faired length of supports 592 and 594 in ratio to their width, is such that no appreciable shock is transmitted to an aircraft's tail hook due to the slight yaw angle created when it is displaced to one side during occasional deflecting encounters with these supports during an aircraft arrestment and the pendant cable 549 and its supports are at their arrestment-operating height. Preferably, the cable-engaging portion of each support may be fashioned to be ejected whenever head-on encounters therewith occur, so as to provide tail hook engagement of the pendant cable 549 at any point within the cross-wise area of runway 500 without causing side-wise tail hook deflection.

The installation of the pendant cable's primary support 592 and its actuator preferably includes a provision for its resilient movement a slight distance out-bound longitudinally of battery position 506 after the pendant cable 549 leaves the battery area during an arrestment so that, during retraction of the pendant cable assembly 580 to battery position 506 after an arrestment, cable contact with support 592 will provide appropriate cable tautness somewhat prior to the cable's arrival at secondary supports 594, facilitating re-entry of the cable 549 into the cable engaging portions thereof.

Inasmuch that shuttles 588 and 590 are supported on elevatable channel portions 568ᵃ and 578ᵃ during neutral operating attitudes, the top surface of shuttles 588 and 590 is arranged to be at or slightly below the grade surface adjacent battery position 506. Channels 568ᵃ and 578ᵃ are elevated to bring shuttles 588 anad 590 above the grade surface during out-bound arrestment or launching operations initiated at battery position 506.

An auxiliary pendant cable support 598 is installed at battery position 506 and is cross-wise located approximately at midpoint of staging area 502, placing it slightly to one side of support 592. Support 598 is preferably provided with a power-actuated travel longitudinally of battery position 506, which travel extends from the runway edge of the battery area and slightly ahead of support 592, to a point somewhat behind the threshold edge of the battery position 506. Support 598 is used during launching preparation operations to provide a temporary pendant cable support while bridling gear is attached to the pendant cable 549 and to an aircraft to be launched. When in use, support 598 provides a threshold-situated cable-supporting position at its furthest in-bound position whereat the cross-runway pendant cable 549 assumes the attitude illustrated by dash lines in FIG. 12.

In addition to its longitudinal travel, support 598 has an actuator operated vertical movement providing a retracted position whereat its top is at, or slightly below the runway and threshold surface, as well as various elevated positions extending well above those surfaces. Assuming that the pendant cable 549 is at its retracted position on the arrestment usage side of the battery position 506, consider that it is desired to prepare for an aircraft launching. Support 598 is then elevated so as to engage the pendant cable 549 as it approaches the runway edge of battery position 506, whereupon its further out-bound travel moves the cable 549 away from supports 592 and 594 sufficiently to establish disengagement therefrom. Support 598 is now elevated to allow the cable 549 to pass over supports 592 and 594 when support 598 is moved in-bound toward the threshold. The pendant cable 549 will fall to the runway surface behind all supports 592 and 594 as soon as enough cable slack occurs. Support 598 is then retracted and moved out-bound again until it passes under and beyond the pendant cable 549. Support 598 is now elevated so as to engage the pendant cable 549 as it is again moved in-bound toward the threshold which, when reached, will cause the pendant cable 549 to again be sufficiently taut to "trigger" shuttles 588 and 590 into cable-gripping contact with cables 548 and 550, respectively. Elevation of support 598 is now adjusted to the most appropriate height to expedite attachment of a launching bridle 646 (see FIG. 15), after which attachment support 598 is moved out-bound until free of the pendant cable 549 and it is then retracted vertically until it is flush with, or slightly below the threshold surface.

The anchor-brackets for those cable sheaves of the staging area 502 which have in-feed relation to the travel of cables 548 and 550, namely brackets 518, 520, 526 and 532 associated with cable sheaves 514, 516, 522 and 530, respectively, are provided with emergency shuttle ejectors 600 which automatically disengage the cable-gripping facilities of shuttles 588 and 590 from all contact with cables 548 and 550 in the event the pendant cable assembly 580 is not brought to a complete stop during arrestment or after launching operations (the pendant cable assembly normally is brought to a complete stop prior to reaching either end of staging area 502). Shuttle ejectors 600 have cable-straddling or cable-surrounding extensions of suitable length and shape to appropriately initiate the emergency disengagement of shuttles from cables 548 and 550 prior to any actual shuttle contact with the respective cable sheaves.

A more detailed discussion of the heretofore described grade and battery equipment which is associated with cross-runway pendant cable assembly 580 will be contained in coverage of system operations subsequent to my description of power station equipment now to follow.

Power station equipment

The description of power station equipment thus far has been limited to those portions of such equipment having direct relation with the routing, support and power connections of the endless live cables 548 and 550. Power stations for staging areas 502 and 504 are identified by general numerals 602 and 602', respectively.

Permanent runway installations of power stations 602, from particularly the live cable routing standpoint, can be placed underground in threshold areas at each end of runway 500, in which event cable capstans 536 and 538 are located approximately straddling the longitudinal center-line of runway 500. Such configuration will place cable sheaves 528 and 530 on the runway side of cable 550 instead of the grade side thereof as shown, and appropriate pairs of lead-in or guide sheaves is required to assist in routing cables 548 and 550 from the grade surface locations of sheaves 522, 524, 528 and 530 of staging area 502 to the underground threshold-located power station 602 and its capstans 536 and 538.

Such permanent type runway installations within threshold areas permit use of a disconnect unit for capstan shaft 534, located between capstans 536 and 538, in which event duplicate sets of power station live cable accelerating and decelerating apparatus will be employed, the left-hand set powering capstan 536 and the right-hand set powering capstan 538.

One operating advantage of this arrangement is to permit the use of a single live cable 548 or 550, including one shuttle or one bridged pendant cable, to launch or arrest certain lighter category aircraft which do not require the capacity afforded by the double cable system using both live cables 548 and 550. Single cable usage by lighter categories of aircraft would necessitate the grade construction to be appropriately constituted for use as landing and takeoff runways. The disconnect unit between capstans 536 and 538 will be engaged to provide a simple means to obtain matched rotating speeds for capstans 536 and 538 during their combined use as a double live cable system.

However, power station operation or its equipment maintenance may involve some problems which is obviated by placement of power stations to one side of the threshold and battery areas as illustrated. Further, the side-located power station type of runway installation is particularly advantageous for military short airfield for tactical support (SATS) operations wherein all cable sheaves, anchor-brackets, fairlead rollers and their actuators are usually above-grade installed in portable-size sections combined or associated with temporary runway matting. Power station 602, for SATS field installations, is appropriately dividable into portable-size sections and combined as a complete power station at site.

I have assumed that, for those skilled in the art, an adequate general description of the illustrated type of installation for power station 602 and the dual live cable concept associated therewith will suffice to cover such modified or partial capacity uses set forth except for SATS operations which will be covered in detail.

Power station 602 has a suitable power-developing unit 604 such as an electric motor or fuel-burning engine of, for example, a diesel, gasoline or other reciprocating type or a rotary gas turbine type. Power unit 604 is arranged to transmit power to a main variable torque and speed transmitting hydraulic drive such as that covered by the herein referenced Patent No. 3,144,923, identified by numeral 606, as by a chain or belt drive 608.

The controlled power transmitted by hydraulic drive 606 is conveyed to a retarder power input shaft 614 through means of a disconnecting and engaging unit 610 interposed therebetween. Shaft 614 is provided with a splined or keyed portion passing through one or more hydrostatic hydraulic retarders 612. Each retarder 612 is provided with an input quill 100 (see FIGS. 3 and 4) which operatively connect each retarder's sun gear 26 to retarder input shaft 614.

Retarder input shaft 614 is operatively connected to one shaft of a gear box 616 which is interposed between retarders 612 and capstans 536 and 538. Capstan shaft 534 of capstans 536 and 538 is operatively connected to another shaft of gear box 616. Gear box 616 is preferably of the parallel shaft type suitable for power to be transmitted to either shaft and taken from the other shaft in either a speed increasing or speed decreasing manner, according to the character of system operation being employed, i.e., arrestment or launching, respectively.

Retarder input shaft 614 is provided with a holding brake 618 for use in preventing rotation of capstans 536 and 538 and related travel of cables 548 and 550 as may be required during preliminary system preparations wherewith pendant cable assembly 580 is being brought into proper taut attitude preceding an arrestment or launching operation.

A reversed travel is required for cables 548 and 550 in order to return pendant cable assembly 580 to battery position 506 after completion of an arrestment or launching operation. To accomplish such reversed travel, a retraction power assembly identified by general numeral 620, preferably comprising the same type of motor or engine as power unit 604, coupled to a variable output power transmitting hydraulic drive of the same type as drive 606, is coupled to capstan shaft 534 by means of a disconnecting and engaging unit 622. However, various arrangements of components making up power station 602 may permit use of power unit 604 driving a reverse gear box to power the hydraulic drive of the retraction assembly 620 instead of using the separate motor or engine as herein described.

Aircraft launching operations, especially those involving certain heavier categories of aircraft, require the transmission of quite large amounts of energy to such aircraft within relatively short periods of time. In order to keep the size, space requirement and operating costs of power unit 604 at a practical minimum, an energy-storing flywheel 624 is shown directly aligned with hydraulic drive 606 and connected to the input side thereof by means of a disconnecting and engaging unit 626.

In addition to providing input power for hydraulic drive 606 through power transmitting means 608, power unit 604 is arranged to also provide input power for a variable output power transmitting drive 628 of the same type as drive 606, through means of a disconnecting and engaging unit 630. Output power of hydraulic drive 628 is transmitted to flywheel 624 through means of, for example, an appropriately ratioed belt or chain drive 632, whereby, preparatory to a launching operation, flywheel 624 is accelerated to, and maintained at, a transient speed of rotation approximating that of the input speed provided for hydraulic drive 606 by power unit 604.

It should be noted that hydraulic retarders 612, hydraulic drives 606, 628 and the hydraulic drive component of retraction power assembly 620 are provided with suitable heat exchange facilities (not shown) for the operating fluids thereof, having adequate capacity to allow recovery from transient higher fluid temperatures than which are within acceptable limits, to normal operating temperature levels within available time periods between arrestment and launching cycles, also that oil heaters (not shown) are used to maintain proper minimum temperatures.

To simplify descriptive numbering of duplicate equipment, identical accented (prime) numerals have been applied to like apparatus of staging area 504 to that of staging area 502, excepting the battery positions and cross-runway pendant cable assemblies associated therewith which have been given individual general numerals.

Although actual manual or remote control facilities for the various hydraulic drives, hydrostatic retarders, disengaging and engaging units, power units, actuators of cable sheave brackets, cable tensioners, fairlead rollers, pendant cable supports and the like are not illustrated in the drawings, it is deemed that the word-pictured description of control results as set forth in various system operations will suffice to enable those skilled in the art to adequately envision the essential manual or remote controls as if same were included in the drawings.

It should be noted, however, that each retarder 612 is dual-control equipped. One control, hereafter referred to as control RTM, is associated with the retarders' automatic torque limiting valve 312 to provide selective establishment of the maximum arrestment force to be exerted upon the aircraft by cables 548 and 550 during the landing cycle, according to the size and load of the aircraft being landed. Valve 312 is adjusted to perform at a selected automatic torque-limiting level by electrically energizing motor 418, through use of control RTM, to revolve as required to cause threaded shaft 408 to move weight 432 to the particular position whereat the desired torque-limiting level is established. For example, if it is desired to apply up to 140,000 lbs. to decelerate an aircraft, weight 432 is moved until its pointer 438 is located at numeral 140 on the indicating strip 440.

Another control, hereafter referred to as control RTA, leads to the retarders' main control valve 136 to selectively variably apply the desired proportion of the selected maximum arrestment cable force as arranged by setting of control RTM, to effect aircraft deceleration according to the current landing requirement.

It should also be noted that the cable-accelerating main hydraulic drive 606 is dual-control equipped. One control, hereafter referred to as control ATM, provides selective establishment of the maximum cable force to be transmitted to an aircraft during the launching thereof, according to its size and load. Another control, hereafter referred to as control ATA, provides selective application of the desired proportion of the control ATM-selected maximum launching force to the aircraft during launching thereof, according to its current take-off requirements.

The power stations 602 and 602' illustrated for runway 500, during aircraft arrestments, can be remotely controlled from the approaching aircraft, from the field's control tower or from appropriately programmed automatic monitoring equipment associated with the power stations 602 and 602'. Practically instantaneous response to overriding or master control may be arranged for any of the three alternatives as desired. To summarize, the arrestment system provides:

(a) selectively variable maximum retardation levels adjustable to conform to the size and load of each aircraft
(b) control of the proportion of the selected maximum retardation level which is desired to effect the deceleration rate appropriate to surrounding conditions
(c) practically instantaneous response of the arrestment system to direct or remote control, including visual indication of all essential transmitted power and speed levels by optional incorporation of instrumentation, and
(d) while initial use of the arrestment system may be limited to emergency arrestments, its full-range capability and familiarity therewith obtained through continued use will eventually promote full-time employment of the system and reduce the requirement for use of aircraft friction brakes to that of taxi-assist, parking or occasional emergency uses.

General description

As illustrated, the complete runway 500 comprises two identical end-of-runway located staging areas 502 and 504, including identical cable systems, battery positions and power station installations. Consequently, the heretofore detailed description of all apparatus associated with staging area 502, with grade areas adjacent thereto, with threshold-installed equipment, with battery positions 506 and 508 and with power station 602 equipment fully applies to the duplicate installations at the far end of runway 500, namely at staging area 504. Only certain elements of the equipment installed at staging area 504 is illustrated, more particularly to permit description hereafter of system operations involving use of some of such equipment simultaneously with that of staging area 502.

Although each battery position 506 and 512 is shown as overlapping the threshold area at each end of runway 500 for illustrative convenience, these batteries would be preferably located appropriately down-stream from the normal or average point of aircraft touch-down, some distance away from the threshold ends of runway 500.

(I) SYSTEM OPERATION-AIRCRAFT ARRESTMENT, DUAL PENDANT

The operation of the system in various arresting and launching modes will now be given.

(A) Aircraft landing direction to the right (1) Preliminary system activation.—Assuming that an aircraft of known size and load is approaching for a landing arrestment and, considering its normal landing speed in view of known headwinds, it is desired to apply a retardation force up to 240,000 lbs. during its arrestment; then (1a).—Units 622, 626 and 630 are disengaged, unit 610 and brake 618 are engaged, and power unit 604 is brought up to its normal no-load or governed full speed, including the input side of cable-accelerating drive 606, its control ATM being advanced to about half-load and its control ATA being placed in neutral position.

(1b).—Shuttle-supporting channels 568$^a$ and 578$^a$ together with shuttles 588, 590, pendant cable supports 592 and 594 at battery position 506 are raised from their retracted positions to their arrestment attitude height. Shuttles 588 and 590 are now in proper operating position for eventual cable-gripping contact with cables 548 and 550 when such are raised, but remain free therefrom until aircraft tail hook engagement of pendant cable 549 of the assembly 580 occurs.

(1c).—Cable sheaves 514 and 516 are actuator-tilted to raise outbound portions of cables 548 and 550, and fairlead rollers 562, 570, threshold cable sheaves 524 and 528 are actuator-raised to bring out-bound portions of cables 548 and 550 just above the grade surface level.

(1d).—Holding brake 618 is now fully released and cable-accelerating drive 606 is controllably engaged, through use of control ATA, to power the retarder shaft 614 (and capstan shaft 534) sufficiently to bring capstans 536, 538 up to a rotating speed whereby cables 548 and 550 are traveling at a speed slightly less than that of the approaching aircraft relative to runway 500.

(1e).—Retarders 612, assuming that more than one are employed as illustrated, are each set to provide, through means of gear box 616 and capstans 536 and 538, a maximum cable arrestment force for each retarder of 80,000 lbs., valves 312 being caused, by use of control RTM and its coacting system 390, to operate accordingly. A maximum compounded cable force of 240,000 lbs. total is now absorbable by cables 548 and 550.

(1f).—For dual pendant stand-by system operations, power station 602', its cables 548' and 550' as well as fairlead rollers and cable sheaves associated therewith at staging area 504 of runway 500 are activated in like manner as described in paragraphs (1a) through (1e) above. A dual electrical power station control circuit is provided which is optionally put into use whereby each apparatus item and its appropriate far-end counterpart is simultaneously activated. For example, when power unit 604 at power station 602 is brought up to its normal operating speed as set forth in (1a) above, far-end counterpart 604' at power station 602' is in like manner activated.

(2) Aircraft landing arrestment, normal.—Assuming that the approaching aircraft's tail hook has engaged the cross-runway cable of pendant cable assembly 580 at battery position 506; then (2a).—Shuttles 588 and 590 of pendant cable assembly 580 grip the out-bound portions of cables 548 and 550, respectively, and these shuttles are moved out of contact with battery-located channels 568$^a$ and 578$^a$. Pendant cable assembly 580 is quickly accelerated to aircraft rolling speed by combined forces of aircraft and cable (548 and 550) inertia without perceptible shock to the aircraft or the cable system.

(2b).—Unit 610 is instantly disengaged, cutting off all power-transmitting contact with the cable-accelerating drive 606.

(2c).—Simultaneously with disengagement of unit 610, control RTA is actuated so as to cause retarders 612 to decelerate capstans 536, 538, cables 548, 550, pendant cable assembly 580 and its engaged aircraft to a standstill within the length of staging area 502. Control RTA is now brought to neutral.

(2d).—Unit 610 is now engaged and sufficient outbound travel of pendant cable assembly 580 is obtained through use of control ATA to drop the cross-runway cable from the aircraft's tail hook. Control ATA is then brought to neutral and unit 610 disconnected.

(2e).—Retraction power assembly 620 is now operatively connected to capstan shaft 534 by means of unit 622 being engaged. Power is then applied to capstans 536, 538 and cables 548, 550 in reverse direction, bringing pendant cable assembly 580 back to battery position 506 in preparation for the next arrestment or launching cycle.

(3) Aircraft landing arrestment, dual pendant cable stand-by.—In the event an aircraft fails to engage pendant cable assembly 580 at battery position 506, for example due to over-shooting that battery position, stand-by pendant cable assembly 584 at battery position 510 is raised to its arrestment attitude height so that it will engage the aircraft's tail hook for arrestment of the aircraft within staging area 504. During the time consumed by the aircraft to roll from touch-down to battery position 510, the travel speed of cables 548' and 550' is adjusted, through proper manipulation of controls ATA and RTA for cable-accelerating drive 606' and retarders 612', respectively, so as to be somewhat less than the rolling speed of the aircraft when it finally reaches battery position 510.

After the aircraft's tail hook engagement of pendant cable assembly 584 has occurred, system operating procedures through arrestment to stand-still, through tail hook disengagement from the pendant cable assembly 584 and its retraction back to battery position 510 is the same as outlined by (a) through (e) of section (2), except for appropriate exchange of "prime" for "natural" numerals.

(B) Aircraft landing direction to the left (1) Preliminary system activation.—Again assuming that it is desired to apply a retardation force up to 240,000 lbs. during arrestment of the aircraft; then (1a).—Units 622', 626' and 630' are disengaged, unit 610' and brake 618' is engaged, and power unit 604' is brought up to its normal no-load or governed full speed, including the input side of cable-accelerating drive 606', its control ATM being advanced to about half-load and its control ATA being placed in neutral position.

(1b).—Shuttle-supporting channels 568ª' and 578ª' together with shuttles 588', 590', pendant cable supports 592' and 594' (not shown) at battery position 512 are raised from their retracted positions to their arrestment attitude height. Shuttles 588' and 590' are now in proper operating position for eventual cable-gripping contact with cables 548' and 550' when such are raised, but remain free therefrom until aircraft tail hook engagement of pendant cable assembly 586 occurs.

(1c).—Cable sheaves 514' and 516' are actuator-tilted and fairlead rollers 560', 572', threshold cable sheaves 524' and 528' are actuator-raised to bring out-bound (as seen from power station 602') portions of cables 548' and 550' just above the grade surface level.

(1d).—Holding brake 618' is now fully released and drive 606' is controllably engaged, through use of control ATA, to power the retarder shaft 614' (and capstan shaft 534') sufficiently to bring capstans 536', 538' up to a rotating speed whereby cables 548' and 550' are traveling at a speed slightly less than that of the approaching aircraft relative to runway 500.

(1e).—The three retarders 612' are each set to provide, through means of gear box 616' and capstans 536' and 538', a maximum cable arrestment force for each retarder of 80,000 lbs., valves 312 being caused, by use of control RTM and its coacting system 390, to operate accordingly. A maximum compounded force of 240,000 lbs. total is now absorbable by cables 548' and 550'.

(1f).—For dual pendant stand-by system operations, power station 602 at the far end of runway 500 and cables 548 and 550 of staging area 502 are activated in like manner as described in paragraphs (1a) through (1e) above, through use of the optional dual electrical power station control circuit. Pendant cable assembly 582 at battery position 508 is the dual pendant stand-by facility.

(2) Aircraft landing arrestment, normal.—Assuming that the approaching aircraft's tail hook has engaged the cross-runway cable 549 of pendant cable assembly 586 at battery position 512; then (2a).—Shuttles 588' and 590' of pendant cable assemblies 586 grip cables 548' and 550' and are quickly accelerated to aircraft rolling speed by combined force of aircraft and cable inertia without shock to the aircraft or to the cable system.

(2b).—Unit 610' is instantly disengaged, cutting off all power-transmitting contact with drive 606'.

(2c).—Simultaneously with disengagement of unit 610', control RTA is actuated so as to cause retarders 612' to decelerate capstans 536', 538', cables 548', 550', pendant cable assembly 586 and the engaged aircraft to a standstill within the length of staging area 504. Control RTA is now brought to neutral.

(2d).—Unit 610' is now engaged and sufficient outbound travel of pendant cable assembly 586 is obtained through use of control ATA to drop the cross-runway cable from the aircraft's tail hook. Control ATA is then returned to neutral and unit 610' disengaged.

(2e).—Unit 622' is engaged to operatively connect retraction power assembly 620' to capstan shaft 534'. Capstans 536', 538' and cables 548' and 550' are now powered in reverse direction to bring pendant cable assembly 586 back to battery position 512 in preparation for the next arrestment or launching cycle.

(3) Aircraft landing arrestment, dual pendant cable stand-by.—If the aircraft fails to engage pendant cable assembly 586 at battery position 512, stand-by pendant cable assembly 582 at battery position 508 is raised to its arrestment attitude height so that it will engage the aircraft's tail hook for arrestment of the aircraft within staging area 502. During the time consumed by the aircraft to roll from touch-down to battery position 508, the travel speed of cables 548 and 550 is adjusted, through proper use of controls ATA and RTA for cable accelerating drive 606 and retarders 612, respectively, so as to be somewhat less than the rolling speed of the aircraft when it finally reaches battery position 508.

After the aircraft's tail hook engagement of pendant cable assembly 582 has occurred, system operating procedures through arrestment to stand-still, through tail hook disengagement from cable 549 of pendant cable assembly 582 and its retraction back to battery position 508 is the same as outlined in section (B2) above for "Aircraft Landing Arrestment, Normal."

(II) SYSTEM OPERATION-ASSISTED TAKE-OFF AND ABORTED TAKE-OFF AIRCRAFT ARRESTMENT (A) Aircraft assisted take-off to the right (1) Preliminary system activation.—As set forth and described in the specification, battery position 506 and its counterpart battery position 512 is provided with auxiliary pendant cable supports 598 and 598', respectively, for use when readying the pendant cable assembly for an aircraft launching operation.

It is assumed that an aircraft of known size, load and take-off characteristics and equipped with a suitable disengageable launching bridle engagement device 648, is taxied or towed onto the threshold area of battery position 506. The aircraft is aligned with runway 500 in appropriate bridle-applying relation with the cross-runway cable 549 of pendant cable assembly 580 which is being temporarily held by the auxiliary support 598. Shuttles 588 and 590 are grippingly connected to outbound portions of cables 548 and 550 during positioning of support 598 as heretofore described in the specification.

A suitable launching bridle 646, see FIG. 15, is applied to the pendant's cross-runway cable 549 and to the aircraft's bridle engagement device 648 and the aircraft's brakes are fully set. Support 598 is now moved outbound until free, then lowered to the threshold surface. Considering the known aircraft take-off factors, it is desired to transmit an assisted take-off force of, for example, up to 200,000 lbs. to the aircraft; then (1a).—All sheaves and fairlead rollers supporting cables 548 and 550 are positioned the same as for arrestment of aircraft landing to the right (IA, 1c). Holding brake 618 is applied, control RTM at power station 602 for retarders 612 is adjusted to provide an appropriate deceleration force for arresting pendant cable assembly 580 after assisted take-off completion and control RTA at power station 602 is positioned for neutral operation. Units 622 and 626 are disengaged. Units 610 and 630 are engaged. Control ATA of cable-accelerating drive 606 is positioned at neutral, flywheel-accelerating drive 628 is set for neutral operation and power unit 604 is started and brought up to its no-load or governed speed.

(1b).—Power is transmitted from power unit 604 to flywheel 624 through controlled output of variable speed drive 628 until flywheel 624 and the input side of cable-accelerating drive 606 are revolving in approximate unity, at which time unit 626 is engaged. Control ATM for drive 606 is set for a maximum torque output which, through employment of gear box 616, capstans 536 and 538, provided a maximum of 200,000 lbs. total force to be transmittable to cables 548 and 550. (Steps (1a) and (1b) may be performed prior to or during the positioning of the aircraft and application of the launching bridle.)

(2a) Assisted take-off, normal.—Upon signal by the aircraft's pilot that the aircraft is self-powered as desired and ready for take-off, brake 618 is released, at which time additional cross-runway cable tautness will be discernible by power being transmitted to the launching bridle by pendant cable assembly 580 due to residual torque being transmitter by drive 606, which power may be augmented by slightly advancing its control ATA if such is required to insure sufficient cable system tautness during the aircraft's initial take-off roll, whereupon the aircraft's brakes are released.

(2b).—Upon initial out-bound movement of the aircraft, control ATA at power station 602 is advanced toward its full engagement position at a control movement/time ratio which reflects the rate of acceleration desired for the aircraft. Desired proportions of force up to 200,000 lbs. are transmitted to the aircraft through cables 548, 550 and pendant cable assembly 580 by drive 606 which is being powered by power unit 604 combined with the stored energy of flywheel 624.

(2c).—Just prior to, or upon obtaining flying speed and lift-off, the aircraft's launching bridle engagement device 648 is disengaged, whereupon control ATA for drive 606 is returned to its neutral position and retarders 612 are employed to arrest further out-bound travel of pendant cable assembly 580 and the launching bridle 646 through manipulation of control RTA.

(2d).—After cable arrestment, units 610 and 630 are disengaged and unit 622 engaged for retraction of pendant cable assembly 680 back to battery position 506 where it is positioned for use in a subsequent assisted take-off or an aircraft arrestment.

(3) Aborted take-off, aircraft arrestment.—The time required to activate power station 602' at the far end of runway 500 and cables 548' and 550' of staging area 504, in view of the type of power unit 604' employed as well as time required for actuators to elevate or lower cable sheaves and fairlead rollers, determines the practicability of activating power station 602' and staging area 504 equipment for an aircraft arrestment at the far end of runway 500 after a take-off abort arrestment is called for. If required, activation of such equipment as is needed to put battery position 510 and its pendant cable assembly 584 into stand-by arrestment readiness can take place before or during the normal assisted take-off. In either event as to time of the foregoing activation, an aborted take-off arrestment is handled as follows, assuming that the far-end runway equipment has been activated:

(3a).—Upon pilot decision to abort the take-off, control ATA at power station 602 is moved to neutral, cutting off all power being delivered to pendant cable assembly 580 and its aircraft-engaged launching bridle 646, whether or not such cable power termination occurs before, simultaneous with or after the aircraft crew's disengagement of the aircraft's launching bridle's engagement device 648, after which the aircraft rolls over and beyond the launching bridle 646.

(3b).—During the time required for the aircraft to roll from where the abort took place, to battery position 510 where the aircraft's deployed tail hook engages pendant cable assembly 584, the travel speed of cables 548' and 550' is adjusted, through proper manipulation of ATA and RTA controls for drive 606' and retarders 612', respectively, so as to be somewhat less than the rolling speed of the aircraft when it finally reaches battery position 510, control RTM for retarders 612' having been adjusted for proper maximum retardation. After the aircraft's tail hook engagement of pendant cable assembly 584 has occurred, control RTA is actuated so as to cause retarders 612' to decelerate capstans 536', 538', cables 548', 550', pendant cable assembly 584 and the engaged aircraft to a stand-still within the length of staging area 504.

(B) Aircraft assisted take-off to the left (1) Preliminary system activation.—It is assumed that the same aircraft and load which was launched in (IIA) is in like manner positioned on the threshold area of battery position 512 whereat a launching bridle 646 is applied to the cross-runway cable 549 of pendant cable assembly 586 which for launching operations is temporarily held by support 598', and to the aircraft's bridle engagement device 648. It is likewise assumed that it is desired, for example, to transmit an assisted take-off force up to 200,000 lbs. to the aircraft; then (1a).—All sheaves and fairlead rollers supporting cables 548' and 550' are positioned the same as for arrestment of aircraft landing to the left (see sections (B1b) and (B1c) above). Holding brake 618' is applied, control RTM for retarders 612' is adjusted to provide an appropriate deceleration force for arresting pendant cable assembly 586 after assisted take-off completion and control RTA for retarders 612' is positioned for neutral operation. Units 622' and 626' are disengaged. Units 610' and 630' are engaged. Control ATA of cable-accelerating drive 606' is positioned at neutral, flywheel-accelerating drive 628' is set for neutral operation and power unit 604' is started and brought up to its no-load or governed speed.

(1b).—Power is transmitted from power unit 604' to flywheel 624' through controlled output of variable speed drive 628' until flywheel 624' and the input side of cable-accelerating drive 606' are revolving in approximate unity, at which time unit 626' is engaged. Control ATM for drive 606' is set for a maximum torque output which, through employment of gear box 616', capstans 536 and 538' provides a maximum of 200,000 lbs. total force to be transmittable to cables 548' and 550'. (Steps (1a) and (1b) may be performed prior to or during the positioning of the aircraft and application of the launching bridle 646.)

(2a) *Assisted take-off, normal.*—Upon signal by the aircraft's pilot that the aircraft is self-powered as desired and ready for take-off, brake 618′ is released, at which time additional cross-runway cable tautness will be discernable due to residual torque being transmitted by drive 606′, which power may be augmented by slightly advancing its control ATA if such is required to insure sufficient cable system tautness during the aircraft's initial take-off roll, whereupon the aircraft's brakes are released.

(2b).—Upon initial out-bound movement of the aircraft, control ATA at power station 602′ is advanced toward its full engagement position in accordance to the rate of acceleration desired for the aircraft. Desired proportions of force up to 200,000 lbs. are transmitted to the aircraft through cables 548′, 550′ and pendant cable assembly 586 by drive 606′ which is being powered by power unit 604′ combined with the stored energy of flywheel 624′.

(2c).—Just prior to, or upon obtaining flying speed and lift-off, the aircraft's launching bridle engagement device 648 is disengaged, whereupon control ATA for drive 606′ is returned to its neutral position and retarders 612′ are employed to arrest further out-bound travel of pendant cable assembly 586 and the launching bridle 646 through manipulation of control RTA.

(2d).—After cable arrestment, units 610′ and 630′ are disengaged and unit 622′ engaged for retraction of pendant cable assembly 586 back to battery position 512 where it is positioned for use in a subsequent assisted take-off or an aircraft arrestment.

(3) *Aborted take-off, aircraft arrestment.*—Assuming that the far-end power station 602 and staging area 502 equipment has been activated so as to put battery position 508 and its pendant cable assembly 582 into arrestment readiness; then (3a).—Upon pilot decision to abort the take-off, control ATA for drive 606′ is moved to neutral, cutting off all power being delivered to pendant cable assembly 586, after which power termination the aircraft's launching bridle engagement device 648 is disengaged and the aircraft rolls over and beyond the launching bridle.

(3b).—During the time required for the aircraft to roll from the abort location to battery position 508 where the aircraft's deployed tail hook engages the cross-runway cable of pendant cable assembly 582, the travel speed of cables 548 and 550 is adjusted, through proper manipulation of ATA and RTA controls for drive 606 and retarders 612, respectively, so as to be somewhat less than the rolling speed of the aircraft when it finally reaches battery position 508, control RTM for retarders 612 having been adjusted for maximum retardation. After the aircraft's tail hook engagement of pendant cable assembly 582 has occurred, control RTA is actuated so as to cause retarders 612 to decelerate capstans 536, 538 cables 548, 550, pendant cable assembly 582 and the engaged aircraft to a stand-still within the length of staging area 502.

During actual aircraft arrestment operations when a cross-runway pendant cable assembly is transmitting power from its engaged aircraft to staging area cables 548 and 550 (or 548′ and 550′), and during aircraft launching operations when a cross-runway pendant cable assembly is transmitting power to its engaged aircraft from said staging area cables, the in-bound or out-bound shuttle-engaged portions of staging area cables will be deflected toward the center-line of runway 500, assuming the shape of an ever-changing arc. The extent of deflection from their normal no-load path, whereat the staging area cables are supported by various fairlead rollers and cable sheaves, depends upon numerous factors such as (1) cable-tightening forces being exerted by cable tensioners 540 and 544, (2) relation of transmitted power to the strength of staging area cables, (3) extent of off-center engagement of pendant cable assemblies by an aircraft's tail hook or launching bridle, etc.

It should be noted that the ever-changing arc character of operation of staging area cables 548 and 550 is taken into consideration when planning the location of those fairlead rollers which are next to battery positions, so that pendant cable assembly shuttles, having securely gripping contact with staging area cables, will always pass to the runway side of the grade-located fairlead rollers and their associated traps.

However, the arcing character of staging area cables may be readily modified during pendant cable assembly travel, more particularly during an aircraft's final stage of roll toward stand-still in arrestment operations, also during pendant cable assembly arrestment after an aircraft is disengaged from its launching bridle after launching operations, by changing the cable tensioning forces being exerted by cable tensioners 540 and 544. All pendant cable assembly retraction cycle will, however, be performed with cable tensioners 540 and 544 operating at considerably increased force levels so as to facilitate relocation of staging area cables upon the fairlead rollers.

To augment the normal no-load re-location of staging area cables upon fairlead rollers for support thereby during subsequent preliminary system activations, a pair of staging area longitudinally centrally located, transversely actuatable cable retraction members 634 and 634a are shown operating in a suitable cross-runway channel 636. Cable retraction members 634 and 634a are fashioned so as to be retracted within channel 636 except when elevated to contact and assist the movement of staging area cables into position for support by fairlead rollers.

(III) SYSTEM MODIFIED FOR MILITARY SHORT AIRFIELD USE-SYSTEM OPERATION, LAUNCHING AND ARRESTMENT (A) Modification to include take-off abort arrestment The same general type of live cable staging area and power station apparatus such as is described for runway 500, that is, for example, similar to one staging area such as 502 and one power station 602, is suitable to form military short airfield installations when modified as hereafter set forth. (The length of a portable staging area and power station to meet military short airfield requirements, as compared to the length of staging areas for civilian or commercial installations of a permanent nature, particularly if the military aircraft involved are within a considerably lighter weight category, can be considerably shorter. If aborted take-off arrestment capabilities are not considered essential, the length of the short airfield can be at least 50% less than otherwise required.)

(1a) *System description.*—All apparatus associated with staging area 502 and power station 602 is designed to be transportable in suitably sized sections for above-ground surface reassembly installation at site. The provision of staging area channels 566, 568, 576 and 578 used in permanent commercial installations is preferable but optional for military use. If employed, such channels are incorporated as a part of on-surface border matting sections similar to incorporation of anchor-bracketed sheave assemblies and fairlead roller assemblies with runway matting sections now to be described.

(1b).—The duplex anchor-bracket 526 and operatively associated sheaves 522 and 524, together with a shuttle ejector 600 for sheave 522 is made up as a one-section, anchorable assembly, including elevational sheave actuators. In like manner, the duplex anchor-bracket 532 and associated sheaves 528 and 530, together with a shuttle ejector for sheave 530 and including elevational sheave actuators, is made up as a one-section, anchorable assembly. These bracket and sheave assemblies are made up so that when they are runway-installed and sheave pairs 522–524 and 528–530 are horizontally leveled in non-operating attitude, cable center-lines as supported by the sheaves are approximately 6″ above the runway matting surface.

(1c).—Anchor-brackets 518 and 520 with associated sheaves 514 and 516, respectively, together with shuttle ejectors 600 and sheave-tilting actuators are each made up as a one-section assembly for runway installation so that the sheave-supported cable center-lines are about 6" above the runway matting surface when these sheaves are horizontally level.

(1d).—The runway forming staging area 502, for portability and temporary usage, is made up of suitably sized interlocking matting sections which are preferably mechanically tied to each of the four anchor-bracket-sheave assemblies heretofore described. Also, the runway matting sections at areas of fairlead rollers 560, 562, 570 and 572 are fashioned to incorporate such fairlead rollers and their elevating actuators as one-section assemblies which interlock with adjacent runway matting sections. All fairlead roller pairs, when horizontally leveled, are fashioned to provide a supported cable center-line height approximately 6" above the runway matting surface. In the event channels 566, 568, 576 and 578 are not used, all fairlead rollers are suitably grooved to retain the staging area cables 548 and 550 in approximate longitudinal alignment except during actual launching and arrestment operations. In lieu of said channels, border sections of runway matting are formed so as to appropriately curve upward in areas adjacent each fairlead roller assembly so that the incline to reach 6" height at each fairlead roller pair area presents an acceptable aircraft roll-over condition in the event an aircraft, during launching or arrestment operations, would inadvertently veer to, or cross the runway border.

(1e).—At certain staging area locations, the interlocking matting is fashioned to form, when assembled, battery positions as follows:

(1) End-of-runway battery positions 506 and 508 are located relatively the same as the battery positions 506 and 508 illustrated in FIG. 12 and are similar thereto, except that channels 596 may be omitted and pendant cable supports 592 and 594 may be actuator-elevated just to raise the cross-runway cable 549 of pendant cable assembly 580 from the matting surface to a desired aircraft tail hook-engaging height. A retracted below-surface position for the cross-runway cable which requires provision of channels 596 is optional. The longitudinally movable power-actuated cable support 598, used in the commercial version of battery positions 506 and 512 during aircraft launching preparations, is optional as prompted by runway span dimensions as well as available manpower to effect application of an aircraft launching bridle without the assistance of cable support 598 if such is not provided in the runway layout.

(2) Shuttle-supporting channels 568$^a$ and 578$^a$ are incorporated as part of the sections of matting making up battery positions 506 and 508 and these channels may be installed fastened upon the top surface of the matting.

(3) A duplex battery position (see FIG. 14), if aborted take-off arrestment is desired, is located centrally of the runway length and is hereafter referred to as the "abort arrestment battery" 640. It is made up of two back-to-back installed sets of pendant cable assemblies 642 and 644 and supports which are like those provided for pendant cable assembly 580 at battery position 506 except that, (a) their cross-runway cable lengths are somewhat shorter, (b) the apex supports 592 are consequently closer in-line with their pendant cable assembly shuttles, (c) shuttle-supporting channels similar to channels 568$^a$ and 578$^a$ at battery position 506 except that they are of necessity actuator-equipped for elevating or retracting said channels, which are longitudinally retained but movable toward the runway's center-line by the arcing of cables 548 and 550 as deflected during launching and arrestment operations.

The shuttles of the pendant cable assemblies 642 and 644 used at the abort arrestment battery 640 have more capacity for cross-runway pendant cable feed-in than those used at other battery positions, for maintaining proper cable tautness while compensating for deflection of cables 548 and 550 during launching and arrestment operations. The apex of each cross-runway cable support set is directed at its runway end, and the abort arrestment battery 640 may or may not include the transversely actuatable cable retraction members 634, 634$^a$ and channel 636, as desired.

(1f).—Power unit 604 of power station 602 is a fuel-burning engine of, for example, a diesel, gasoline or gas turbine type appropriate for use as prompted by environmental conditions.

(2) Preliminary system activation: Assisted take-off to the right.—As affected by wind direction or other conditional factors, the most suitable direction of use for the airfield is selected, whether out-bound to the right or in-bound to the left as viewed at power station 602. Assuming that aircraft launchings are to be made out-bound or to the right, the system is readied by removing the left-hand pendant cable assembly 644 from the abort arrestment battery 640 and retracting its supports 592 and 594. The aircraft to be launched is taxied or towed to the threshold area adjacent battery position 506, its bridle engagement device 648 lined up with, and positioned slightly to the threshold side of the position shown for support 598. A suitable launching bridle 646 is now applied to pendant cable assembly 580 and to the aircraft's launching bridle engagement device 648 and the aircraft's brakes are fully applied.

Shuttles 588 and 590 are now caused to grip the out-bound portions of cables 548 and 550, respectively, either by tightening the cross-runway cable 549 of pendant cable assembly 580 through backward rolling of the aircraft, or by engaging each shuttle's cable-gripping facility through use of an appropriate tool manually applied at each shuttle.

It is also assumed that, in view of the aircraft's take-off characteristics with its borne load and the fact that the take-off should be completed within the first two-thirds of the distance from battery position 506 to the in-field edge of the abort arrestment battery 640 at midfield, an assisted take-off force of, for example, 150,000 lbs. should be transmittable to the aircraft; then (2a).—Units 622 and 626 are disengaged. Holding brake 618 is set. Control RTM for retarders 612 is adjusted to provide a suitable deceleration force for pendant cable assembly 580 so as to completely arrest same within the last one-third of the distance from battery position 506 to the in-field edge of the abort arrestment battery 640 at midfield after aircraft disengagement from the launching bridle 646. Control RTA of retarders 612 is positioned for neutral retarder operation, control ATA for cable-accelerating drive 606 is positioned at neutral and flywheel-accelerating drive 628 is set for its neutral operation.

The right-hand pendant cable 642 at the abort arrestment battery 640 is raised to tail hook engagement position by actuation of supports 592 and 594.

(2b).—Sheaves 522 and 530, fairlead rollers 560 and 572 are lowered, sheaves 514 and 516 are tilted and sheaves 524 and 528, fairlead rollers 562 and 570 are raised to bring out-bound portions of cables 548 and 550 to their supported 6" cable operating height. Power unit 604 of power station 602 is started and brought up to full speed.

(2c).—Units 610 and 630 are engaged. Flywheel-accelerating drive 628 is now variably engaged to transmit power from power unit 604 to flywheel 624 until its rotating speed is approximately equal to that of the input side of drive 606 which has been brought up to its full speed by power unit 604 through drive 608. Unit 626 is now engaged. Control ATM for drive 606 is set for a maximum torque output which, through employment of gear box 616, capstans 536 and 538, provides a maximum of 150,000 lbs. total force to be transmittable to cables 548 and 550, pendant cable 580, the launching bridle 646 and the aircraft. (Steps (2a), (2b) and (2c) may be performed prior to or during the positioning of the aircraft and application of the launching bridle 646.)

(3a) Actual assisted take-off to right, normal.—Upon signal by the aircraft's crew that the aircraft is self-powered as desired and ready for take-off, brake 618 is released. Slightly increased power will now be discernably transmitted to the launching bridle by pendant cable assembly 580 due to residual torque coming from drive 606. Such may be augmented by slightly advancing its ATA control if more power is required to insure cable system tautness during the aircraft's initial take-off roll. The aircraft's brakes are now released.

(3b).—Upon initial out-bound roll of the aircraft, control ATA is advanced toward its full engagement position at a control movement/time ratio which produces the acceleration rate desired for the aircraft. Proportions of force up to 150,000 lbs. with desired gain in speed is transmitted to the aircraft by drive 606 which is being powered by power unit 604 combined with the stored energy of flywheel 624.

(3c).—Shortly before or at lift-off, the aircraft's crew disengages the aircraft's bridle engagement device 648, whereupon control ATA is returned to neutral and retarders 612 are employed to stop further out-bound travel of pendant cable assembly 580 and the launchng bridle 646 by manipulation of control RTA.

(3d).—After cable and bridle arrestment, units 610 and 630 are disengaged and unit 622 engaged for retraction of pendant cable assembly 580 and the launching bridle 646 back to battery position 506 by employment of retraction power unit assembly 620, wherewith cable assembly 580 is positioned for use in a subsequent assisted take-off or in an aircraft arrestment.

(4a). Take-off to right aborted, aircraft arrestment.—Step (3a) above having been completed, it is assumed that, during Step (3b), an aircraft malfunction or other factor has caused the aircraft's crew or the ground crew to signal for a take-off abort, whereupon control ATA is quickly moved to neutral to terminate power transmission to cables 548 and 550.

(4b).—If the abort has been caused by factors other than an aircraft power failure, the aircraft's crew releases the launching bridle 646, retaining power-on conditions until the aircraft travels over and beyond pendant cable assembly 580 and the launching bridle 646, whereupon the aircraft's power is cut off. Control RTA or control ATA is now applied sufficiently to cause retarders 612 or drive 606, respectively, to establish a speed of travel for cables 548 and 550 to a level which is somewhat below the aircraft's roll-down speed as it crosses the midfield abort arrestment battery 640, where the aircraft's deployed tail hook engages the battery's out-bound abort arrestment cable assembly 642.

Control RTM of retarders 612 having been adjusted to an appropriate maximum force level for the aircraft's arrestment, retarder control RTA is now advanced as required to bring the aircraft to a complete stand-still within the runway length between the midfield abort arrestment battery 640 and battery position 508 at the far end of the runway. Step (3d) is now performed, the abort arrestment cable assembly 642 being retracted to, and re-installed upon the abort arrestment battery 640.

(2) If the take-off abort has been prompted by an aircraft power failure, the aircraft's crew releases the launching bridle 646 and signals for the abort arrestment. Through manipulation of control RTA, retarders 612 are caused to decelerate cables 548, 550, pendant cable assembly 580 and the released launching bridle 646 sufficiently to permit the aircraft to pass over and travel beyond the pendant cable 580 and launching bridle 646. The travel speed of cables 548 and 550 is now adjusted to be somewhat below the aircraft's roll-down speed as it crosses the midfield abort arrestment battery 640, where the aircraft's deployed tail hook engages the battery's out-bound abort arrestment cable assembly 642. Tail hook engagement is followed by retarder control RTA being advanced as required to bring the aircraft to a complete stand-still within the runway length between the midfield abort arrestment battery 640 and battery position 508. Step 3d is now performed and the abort arrestment cable asesembly 642 is retracted to, and re-installed upon the abort arrestment battery 640.

(4c).—In either event outlined by (4b)(1) and (2), deployment of the aircraft's tail hook simultaneously with, or immediately following disengagement of the launching bridle 646 may result in a possible tail hook engagement of the launching bridle 646 or the pendant cable assembly 580. Such engagement will cause the shorter abort arrestment pendant cable assembly to serve as a "dual" or stand-by arrestment means without creation of interference between the two sets of pendant cable shuttles.

If the tail hook engagement and containment of the launching bridle 646, which thereby functions as an arrestment bridle, prevents the tail hook's engagement of the abort arrestment battery's pendant cable assembly, shuttles of pendant cable assembly 580 will "trigger" the abort arrestment battery's shuttles into gripping action upon cables 548 and 550 and both sets of shuttles will proceed down the runway together until the aircraft arrestment has been completed. Step (3d) is now performed, the abort arrestment cable assembly being retracted to, and re-installed upon the abort arrestment battery.

(5) Preliminary system activation: Assisted take-off to the left.—The system is readied by removing the right-hand pendant cable assembly 642 from the midfield-located abort arrestment battery and retracting its cable supports 592 and 594. The aircraft to be launched is taxied or towed to the threshold area adjacent battery position 508, its bridle engagement device 648 lined up with, and positioned slightly to the threshold side of the position shown for support 598' (illustrated at battery position 512). The launching bridle 646 is now applied to pendant cable assembly 582 (see dash lines shown for launching attitude of pendant cable assembly 586 at battery position 512) and to the aircraft's launching bridle engagement device 648 and the aircraft's brakes are fully applied.

Shuttles 588 and 590 are now caused to grip the in-bound portions of cables 550 and 548, respectively, through backward rolling of the aircraft or by engaging each shuttle's cable-gripping facility through use of an appropriate tool manually applied at each shuttle. Assuming that an assisted take-off force of, for example, 150,000 lbs. should be transmittable to the aircraft; then (5a).—Units 622 and 626 are disengaged and holding brake 618 is set. Control RTM for retarders 612 is adjusted to provide a suitable deceleration force to arrest pendant cable assembly 582 and the launching bridle 646 after its disengagement from the aircraft upon take-off. Control RTA of retarders 612 is positioned for neutral retarder operation, control ATA for drive 606 is positioned at neutral and flywheel-accelerating drive 628 is set for neutral operation.

The left-hand pendant cable assembly 644 at the abort arrestment battery 640 is raised to tail hook engagement position by actuation of its supports 592 and 594.

(5b).—Sheaves 524, 528, fairlead rollers 562 and 570 are lowered. Sheaves 514 and 516 are tilted and sheaves 522 and 530, fairlead rollers 560 and 572 are raised to bring in-bound portions of cables 548 and 550 to their supported 6" cable operating height. Power unit 604 is started and brought up to full speed.

(5c).—Units 610 and 630 are engaged. Drive 628 is now variably engaged to transmit power from power unit 604 to flywheel 624 until its rotating speed approximates that of the input side of drive 606 and unit 626 is now engaged. Control ATM of drive 606 is set for a maximum torque output which will provide the maximum total force of 150,000 lbs. to be transmittable to the aircraft. (Steps (5a), (5b) and (5c) may be performed prior to, or during the positioning of the aircraft and application of the launching bridle 646.)

(6) *Actual assisted take-off to left, normal.*—All take-off procedures are the same for actual take-off to the left as were herebefore outlined for "Actual Assisted Take-Off to Right, Normal" covered in (3a) through (3d), except that references made therein to pendant cable assembly 580 and battery position 506 are made herein to pendant cable assembly 582 and battery position 508.

(7) *Take-off to left aborted, aircraft arrestment.*—All take-off to the left aborted, aircraft arrestment procedures are the same as were herebefore outlined for "Take-Off to Right Aborted, Aircraft Arrestment" covered in (4a) through (4c), except that references made therein to pendant cable assembly 580, out-bound abort arrestment cable 642, and battery position 508 is made herein to pendant cable assembly 582, in-bound abort arrestment cable 644 and battery position 506.

(8) *Assisted take-off to right or to left for heavy aircraft having lift-off beyond abort arrestment battery.*—In the event the contemplated use for the short airfield includes assisted take-off for aircraft which is substantially heavier than that which is properly handled by system operations as outlined by (A1) through (A7) above, which heavy aircraft has a lift-off point somewhat beyond the abort arrestment battery at midfield; then (8a).—The left-hand and right-hand pendant cable assemblies 644 and 642 are both removed from the abort arrestment battery and all supports 592 and 594 therefor retracted.

(8b).—Control ATM for drive 606 is set for the maximum torque output which will provide the desired maximum total force to be transmittable to cables 548 and 550. Steps (3a) through (3c) (or (4a) through (4c)) are now employed to obtain the normal assisted take-off of the heavier aircraft.

(8c).—Such heavier aircraft may be provided with a relatively loosely suspended abort-facility cable 650. The rearward end of the abort-facility cable 650 is suitably fastened to the base of the aircraft's tail hook assembly which is mounted to the fuselage aft of the aircraft's main gear. The forward end of the abort-facility cable 650 is slidably and actuatably mounted slightly aft of the aircraft's launching bridle engagement device 648 and provided with a retractable actuator.

(8d).—If a take-off abort is desired, the abort-facility cable's actuator is activated to move the cable's forward end into positive engagement with the aircraft's bridle engagement device 648 at a point below the area of actual bridle engagement, after which the actuator is retracted away and free of the abort-facility. Control ATA is moved to neutral. The launching bridle is now disengaged by control ATA for drive 606 being moved to neutral and control RTA being applied to decelerate cables 548, 550 and pendant cable 549 to a speed somewhat below that of the aircraft.

(8e).—The loosely suspended abort-facility cable 650 now falls toward the runway surface together with the launching bridle 646, followed by the aircraft's roll-over of the bridle 646 and the cross-runway cable 549 of the pendant cable assembly. The bridle thereafter engages the aircraft at a point in line with, and to the rear of the aircraft's tail hook which has been retained in retracted position. Control RTA is now further advanced to decelerate the aircraft as desired, control RTM being advanced to the proper torque absorption position to obtain the desired maximum cable retardation force exertable upon the aircraft, preceding or simultaneous with the advancing of control RTA.

(B) *Modification into short-short airfield without take-off abort arrestment*

As heretofore briefly mentioned, omission of aborted take-off arrestment capabilities permits reduction of the length of a short military airfield by at least 50%. To illustrate such an arrangement, reference is made to staging areas 502 and 504 wherewith a usable runway length of 1800 feet is indicated for an example.

Reducing such length of 1800 feet to 900 feet places cable sheaves 514, 516, anchor-brackets 518, 520 and other directly associated apparatus approximately at the location illustrated for cross-runway cable retraction members 634, 634a and channel 636. These members, if retained in the runway design, are re-located approximately at the midfield point of the shortened runway. The duplex abort arrestment battery 640 at midfield is omitted. Battery position 508 is provided at the same location relatively to cable sheaves 514 and 516 as shown.

Short-short airfield assisted take-offs to the right follow the same procedures outlined in section (IIA1) and (IIA2). Assisted take-offs to the left follow the same procedures outlined in section (IIB1) and (IIB2). Pendant cable assembly retractions back to battery positions are performed as typically described in section (IA2e).

(C) *Aircraft landing arrestments, normal—short or short-short airfield*

Military airfield systems as covered in sections (IIIA) and (IIIB) provide for performing aircraft-landing full arrestments to the right and to the left. The system covered in section (IIIA), due to the inclusion of a midfield-located duplex abort arrestment battery 640, provides dual-pendant cable arrestment capabilities whereby, upon failure of the aircraft's tail hook to engage one of the end-of-runway arrestment cables at battery positions 506 or 508 (according to landing direction), may still engage the midfield cable for full arrestment thereby.

Military airfield systems as covered in section (IIIB) are limited to one end-of-runway pendant cable assembly engagement for each aircraft landing arrestment.

(D) *Launching bridle arrestments, take-off abort—short or short-short airfield*

Aircraft equipped with the aircraft-mounted abort-facility cable 650 described in section (IIIA8c) through (IIIA8e), having load-borne take-off characteristics involving a lift-off which is slightly beyond the midfield point on the short or short-short airfields, may abort their take-offs by making use of the abort-facility cable 650 to transfer their launching bridle 646 from their nose-located bridle engagement device 648 to their tail hook mounting area for prompt aircraft roll-down arrestment as outlined in said section. Such take-off abort arrestments are made possible by the practically instantaneous response of the systems to ATM, ATA, RTM and RTA control.

(IV) DESCRIPTION OF DETAILS OF STRUCTURES AND SYSTEMS

The above more general description was not interrupted by some descriptions of details of structures and systems and these more detailed descriptions are set forth below.

(A) *Details of launching bridle assembly*

The launching bridle engagement device 648 (see FIGS. 17, 18, 19) consists of a body 1000 the lower end of which is provided with an angular, slightly funnel-shaped opening 1001 fashioned to receive and automatically retain a swaged end link 1002 of the abort-facility cable 650. A pair of slidable plungers 1003 are transversely mounted within the lower part of body 1000, each prevented from rotation about their axis by a key 1004. Plungers 1003 are maintained in pressed-together attitude by compression springs 1005 and their inner ends are chamfered on their aft-facing sides 1006 so as to be readily transversely separated by a forceful introduction of link 1002 to be later described.

The launching bridle engagement device's body 1000 has an intermediate shank portion 1007 which is appropriately contoured to support the launching bridle 646 without damaging the same. Shank portion 1007 terminates in an upper cylindrical portion 1008 which is securely mounted upon a support shaft 1009. The central area of portion 1008 is milled away to provide room for installation of a shaft-mounted actuating arm 1010, arm 1010 and portion 1008 of body 1000 being suitably keyed for unitary rotation with shaft 1009 by a key 1011. Body 1000 and its support shaft 1009 are oscillatably mounted upon a breast plate 1013 by a pair of brackets 1012.

The breast plate 1013 is appropriately mounted for proper force-transmitting association with the keel beams of the aircraft. An actuating cylinder-mounting bracket 1014 is securely fastened to breast plate 1013, within which bracket an abort-facility cable actuator cylinder 1015 is rigidly installed. A piston 1016 within cylinder 1015 has a piston rod 1017 which is provided with a cable end link holder 1020 fastened to its outer end. It will be noted that mounting bracket 1014 rigidly supports cylinder 1015 in such manner as to align piston rod 1017 and its link holder 1020 with opening 1001 of launching bridle engagement device's body 1000 for entry of link 1002 into said opening. Cylinder 1015 is provided with a fluid line 1018 at its upper end and a fluid line 1019 at its lower end.

Link holder 1020 is internally fashioned to firmly hold link 1002 in proper alignment for ready entry into opening 1001 and the cable-swaged end portion of link 1002 is retained within holder 1020 by means of an easily shearable, expendable arming pin 1021 which is inserted through the link 1002 and through the sidewalls of holder 1020. The lower portion of holder 1020 is slotted for entry and exit of that end of the abort-facility cable 650 to which link 1002 is swaged.

A brief outline of operation of the heretofore described abort-facility cable actuator is as follows:

When a take-off abort is desired, fluid pressure is transmitted to the upper end of cylinder 1015 through its fluid line 1018. Piston 1016, its rods 1017 and link holder 1020 inserts the link 1002 into opening 1001, said link spreading plungers 1003 apart as the link passes thereby. Plungers 1003 return together to retain link 1002 with body 1000. Pressure is released from the upper end of cylinder 1015 and transmitted to the lower end of the cylinder through its fluid line 1019. The arming pin is sheared as holder 1020 retracts upward to its neutral operating position adjacent cylinder 1015.

The upper surface of bracket 1014 is provided with a pair of cylinder-mounting lugs 1022 to which an actuating cylinder 1023 is connected by a cross-pin 1024. The left end of cylinder 1023 is provided with a fluid line 1025. A piston 1026 is installed within cylinder 1023 and has a piston rod 1028 the outer end of which is connected to the actuating arm 1010 of body 1000 by a cross-pin 1029. Cylinder 1023 is provided with a fluid line 1027 located at its right end. During launching operations fluid pressure is maintained to the left of piston 1026 through line 1025 which pressure holds body 1000 in the position shown in FIG. 17. A launching cycle may be completed with a fly-out of body 1000 with the cable 646 dropping off said body rearwardly thereof, or fluid pressure may be released from line 1025 and applied to the right of piston 1026 through line 1027 just prior to or simultaneously with lift-off, wherewith body 1000 swings forward and upward, permitting its release of launching bridle 646.

After an aborted take-off arrestment has been completed, launching bridle 646 is removed from engagement with cable 650. Holder 1020 may be re-connected to link 1002 while it is being retained within body 1000, a new arming pin 1021 then being installed. A curved hand tool having a wedge-shaped end may be inserted along the open mid-portion of link 1002 to separate plungers 1003 to permit withdrawal of link 1002 from body 1000 and subsequent retraction of the link with its holder 1020 to their neutral operating position adjacent cylinder 1015.

(B) Details of shuttles and associated structure

Details of shuttles and associated structures will now be given and reference is made to FIGS. 23–29. The shuttle's pendant cable-supporting sheave 1100 consists of a rim portion 1101 fashioned to receive and support the end portion of the cross-runway pendant cable 549. Cable 549 is securely fastened to sheave 1100 by means of one or more cable clamps 1102. Sheave 1100 has a flanged upper hub portion 1103 around which is wound a flexible member such as the steel band 1104. A threaded take-up rod 1105 is securely fastened to the flexible band 1104 and passes through a frame-mounted anchor plate 1106. A compression spring 1107 surrounds the take-up rod 1105 and is interposed between the anchor plate 1106 and a take-up nut 1108.

Sheave 1100 has a lower hub portion 1109 the outer surface of which coacts with overrunning clutch rollers 1110. The sheave's upper portion 1103 is bored to receive a roller bearing 1111. The sheave's lower hub portion is bored to receive a roller bearing 1112.

The shuttle 588 has a main frame 1200 which has a centrally located sheave-supporting spindle 1201 fastened securely thereto and upon which are mounted the aforementioned roller bearings 1111 and 1112. The main frame 1200 is provided with four shuttle-aligning and shuttle-carrying chamfered, flanged guide rollers 1202. A spacer bushing 1203 is employed to establish a proper operating height for each guide roller 1202 and each guide roller assembly is mounted to the frame 1200 by a bolt 1204 which is threaded into the main frame and retained by a lock nut 1205.

The shuttle's main frame 1200 is provided with two swiveled shuttle-carrying roller mounts 1206 having lower extended portions 1207 to which are attached roller axles 1208. Two pairs of shuttle-carrying rollers 1209 are rotatably supported by these axles. The tread span of each pair of rollers 1209 is substantially greater than the width of channels 566 and 568 (see FIG. 12) so that shuttle 588 is smoothly transported across such channels when arcing of main cable 548 occurs during aircraft arrestment or launching.

Four cable-gripping shoe spring anchor-plates 1210 are provided on the lower surface of main frame 1200 and two cable-gripper release cam tension spring anchors 1211 are provided on the upper surface of main frame 1200.

Referring particularly to FIGS. 23, 27, 28 and 29. the shuttle's main cable-gripping facilities consists of two sets of co-acting, self-energizing cable gripping shoes 1300 which are located on the under side of frame 1200 by means of a pair of U-shaped rods 1301 which are slidably carried by the anchor-plates 1210. Each shoe 1300 is pivotably supported upon a flanged pivot pin 1302 inserted through a vertical hole in the shoe so as to pass through a flattened, drilled inner end portion of the rods 1301. Pins 1302 then extend through slots 1303 of frame 1200 to securely fasten to a pair of shoe carriage bars 1304 and 1305. Each shoe 1300 is urged to move toward the longitudinal centerline of shuttle 588 for grippingly engaging main cable 548 by means of a compression spring 1306 interposed between the shoe and the anchor-plate 1210. It will be noted that each shoe 1300 is provided with a bell-mouthed horizontal opening intersecting the shoe's vertical pivot pin hole, accommodating the inner end of rod 1301 so that the shoe may oscillate about the pivot pin 1302 (see sectioned portion of FIG. 26).

A rotatable cam 1307 surrounds the lower hub portion 1109 of sheave 1100, its central bore being sized to freely rotate thereon. A recessed portion of the cam's central bore has angular, tangential planes fashioned to receive the overrunning clutch rollers 1110 in such manner that the sheave 1100 and its hub portion 1109 may rotate counter-clockwise freely relative to cam 1307 as urged by the pendant cable tension spring 1107, but clockwise rotation of sheave 1100, when pendant cable 549 receives a pay-out force, securely carries cam 1307 in firm rotation with the sheave's hub portion 1109.

Cam 1307 is provided with two diametrically oppositely located cam lobes 1308 having a vertical height or thickness approximating that of shoe carriage bars 1304 and 1305. Cam lobes 1308 have an operative radius such that, when rotated to the position shown in FIG. 28, carriage bars 1304 and 1305 are held separated to their outer positions as illustrated. Cam 1307 is also provided with two carriage bar obstruction arms 1309 located approximately 90° from cam lobes 1308. Arms 1309 are located slightly vertically above the surface of carriage bars 1304 and 1305 so as to pass above these bars when the cam is rotated to the position shown in FIG. 27, whereat an approximately 45° angled surface of each arm 1309 is positioned to present an obstruction to normal separation forces being conveyed to bars 1304 and 1305, through contact with a carriage bar pin 1310.

Cam 1307 has two tension spring-engaging lugs 1311 placed near its top end above the cam lobes 1308. A pair of tension springs 1312 are installed to engage lugs 1311 and the main frame-supported anchors 1211 so as to impart counter-clockwise rotation to cam 1307 whenever (1) carriage bars 1304 and 1305 are mechanically forcefully separated toward their outer operating position shown in FIG. 28 as will be hereafter described, and (2) pendant cable 549 has been relaxed due to an arrestment or launching completion. The spring-imparted counter-clockwise rotation of cam 1307 is terminated when the cam assumes the position shown in FIG. 28, by a pair of stops 1313 located on the main frame 1200.

When the pay-out of pendant cable 549 causes the lower hub portion 1109 to rotate cam 1307 clockwise from its position shown in FIG. 28 to its position shown in FIG. 27 by means of the wedging action imposed upon clutch rollers 1110, cam lobes 1308 contact main-frame mounted stops 1314 after approximately 90° of cam rotation. The path of forces being transmitted between pendant cable 549 and main cable 548 is through sheave 1100, its hub 1109, overrunning clutch rollers 1110, cam 1307 and its lobes 1308, stops 1314 to main frame 1200, pivot pins 1302 and cable-gripping shoes 1300.

Referring to FIG. 25, the shuttle-supporting channel 568ª is shown in fully retracted position at a battery position. Channel 568ª is provided with one or more pneumatic or hydraulic cylinders 1400 containing a double-acting piston 1401 having a piston rod 1402 which is suitably attached to the bottom of channel 568ª. Cylinder 1400 is mounted in the lower area of the channel/shuttle retraction space or pit by means of a bracket 1403.

Now referring to FIGS. 23 and 24, the shuttle-supporting channel 568ª is provided with a transversely aligned pair of vertically disposed slots 1404. A pneumatic or hydraulic cylinder 1405 is slidably mounted within the channel 568ª and maintained in vertical attitude by guide rollers 1406. Cylinder 1405 is provided with two pistons 1407 and 1408. Piston 1407 is provided with a rod 1409 the outer end of which is fitted with a gusseted V-shaped arm 1410. Piston 1408 has a rod 1411 the outer end of which is fitted with another arm 1410. Cylinder 1405 is provided with a centrally located air or fluid line opening 1412, also with end-located line openings 1413 and 1414. Piston rods 1409 and 1411 are provided with a telescoping guide portion 1415 to insure alignment of the sliding parts. Cylinder 1405 is provided with a longitudinally centrally located wall 1428 having a key coacting with a keyway 1429 of piston rod guide portion 1415, to maintain proper vertical attitude of arms 1410.

Cylinder 1405 is provided with a stirrup 1416 pivotably connected thereto by a pin 1417. A pair of pneumatic or hydraulic cylinders 1418 are mounted at the bottom of channel 568ª, spaced so as to be directly beneath the ends of stirrup 1416. Piston rods 1419 are connected to each end of stirrup 1416. Each cylinder 1418 has a piston 1420 which operates to vertically move cylinder 1405 and its V-shaped arms 1410 into or out of engagement with the U-shaped rods 1301. The vertical movement has sufficient amplitude in lowering so that the arms 1410 are beneath the path of horizontal travel of shuttle 588 and its carrier rollers 1209 when the shuttle leaves a battery position.

Each cylinder 1418 is also provided with an upper end air or fluid line opening 1421 and a lower end line opening 1422 so that pressure may be applied to pistons 1420 simultaneously or separately, as desired, to augment the shuttle-centering action of arms 1410 to be hereafter described.

The threshold-facing end of channel 568ª is equipped with a resilient shuttle stop mounted in association with a channel bracket 1423 provided on each side of the channel and at a vertical position approximating that of the roller axles 1208 when the shuttle 588 is supported upon the flanges of the channel by guide rollers 1202. Each bracket 1423 has a tubular portion 1424 to provide a horizontally aligned support for a bumper shaft 1425. The shuttle roller-contacting end of bumper shaft 1425 is enlarged so as to present a bumper surface when contacted by the pairs of shuttle rollers 1209.

A compression spring 1426, interposed between the enlarged end of bumper shaft 1425 and bracket 1423, provides sufficient recoil to move shuttle 588 back to the approximate longitudinal position shown in FIG. 26, in the event of a retraction overshoot, so that the V-shaped arms 1410 of cylinder 1405 will further center the shuttle 588, by wedge-line action upon its rollers 1209 as provided by the gusseted arms 1410, adequately for the upper ends of arms 1410 to enter into and be able to engage the U-shaped rods 1301. Bumper shaft 1425 is provided with a retaining collar 1427 shown located adjacent the side of bracket 1423 opposite spring 1426.

The threshold end of channel 568ª is provided with a fairlead roller 1430 which is rotatably mounted upon a channel-supported shaft 1431 (see FIGS. 23 and 24). The fixed height of roller 1430 is such that, relatively to channel 568ª, main cable 548 is supported to feed through the area of cable-gripping shoes 1300 approximately at their horizontal center line.

It should be noted that after sheave 1100 has been rotated clockwise by the payout of pendant cable 549 for an aircraft launching or during an aircraft landing arrestment, its counter-clockwise rotation is transiently prevented by a relatively small spring-energized brake pad supported by frame 1200. The release plunger of such brake pad extends vertically beyond the underside of frame 1200 where it is actuated (1) by the vertically inclined surface of rods 1301 as they are moved, together with shoe carriage bars 1304 and 1305, to their outermost positions as shown in FIG 28; or (2) through action of the emergency shuttle ejectors 600, accomplishing release of said sheave brake to again permit free counter-clockwise rotation of sheave 1100.

When shuttles 588 and 590 have been retracted to battery position 506 and are longitudinally located upon channels 568ª and 578ª as hereabove described, cylinders 1405 are elevated to their shuttle-cocking height as shown in FIGS. 23 and 24, by pressure being introduced into cylinders 1418 through their fluid line openings 1422. Pressure is now introduced into cylinders 1405 through their central openings 1412. As pistons 1407 and 1408 are moved toward the outer ends of cylinders 1405, arms 1410 cause rods 1301 to move shoe carriage bars 1304 and 1305 apart toward their separated positions shown in FIG. 28. Springs 1312 promote unitary rotation of cams 1307 with sheaves 1100 as cable 549 is being tensioned by springs 1107 and their associated bands 1104, until cam 1307 assumes the position shown in FIG. 28, whereupon cam lobes 1308 act to maintain bars 1304 and 1305 apart as shown. The overrunning clutch rollers 1110 permit sheave 1100 to continue its counter-clockwise rotation to properly tension the pendant cable 549 now being supported by pendant cable supports 592 and 594 now to be described, through action of the cable-tensioning springs 1107. Force is now reversed in cylinders 1405 by pressure being introduced through their end openings 1413 and 1414 to retract arms 1410, after which cylinders 1405 are fully lowered by pressure being introduced into the upper region of cylinders 1418 through their openings 1421.

(C) Pendant cable supports

The details of pendant cable supports will now be given. See FIGS. 38–40. Primary pendant cable support 592 has a main body 1500 provided with an actuating arm portion 1501. Body 1500 is pivoted on a pivot pin 1502 mounted in a horizontal transverse bore of the body 1500 and which extends through spacer bushings 1503 to fasten to the sidewalls of a mounting box 1504. The arm portion 1501 is coupled to preferably a pneumatic-type actuating cylinder 1505 which is pivotably mounted within box 1504 by use of pivot pins 1506. Cylinder 1505 contains a piston 1507 having a rod 1508 terminating in a clevis portion 1509 which is connected to arm 1501 by a clevis pin 1510. Cylinder 1505 is provided with an air line 1511 for its outer end and an air line 1512 for its inner end as shown. The under side of the support's body 1500 is provided with a pair of lugs 1513 containing a connecting cross-pin 1514 which passes through the end of a threaded rod 1515 used to adjust the aircraft arrestment operating height of cable support 592. The cross-pin end of rod 1515 is provided with a shoulder portion 1516 against which is assembled the upper end of a compression spring 1517. Spring 1517 surrounds rod 1515 and these parts are positioned between the side arms of the clevis 1509 and extend to the vicinity of a bracket 1518 which is securely fastened to the bottom of the box 1504, upon which bracket the lower end of the compression spring 1517 rests. The threaded end of rod 1515 projects through and beyond bracket 1518 and is provided with two adjustment nuts 1519 which, when support 592 rises to its arrestment operating position, rest against the under side of bracket 1518. A resilient shock-absorbing member (not shown) may be interposed between the bracket 1518 and nuts 1519 if desired.

The support's body 1500 is bored for secured assembly therewith of a shaft 1520. A flanged tubular sleeve 1521 is fashioned to freely slide longitudinally upon shaft 1520 and is prevented from having relative rotation therewith by a key or pin fastened to sleeve 1521 and sliding in the shaft's keyway 1522. A compression spring 1523 is interposed between the body 1500 and the flange of sleeve 1521. A faired shroud 1524 encloses the spring 1523 and the greater portion of sleeve 1521. Shroud 1524 is securely fastened to the body 1500 by flush-mounted screws (not shown). The outer end of shroud 1524 is inwardly flanged so as to perform as an outward and inward travel stop for sleeve 1521 and its pendant cable holder 1525.

FIG. 39 includes a schematic position 1 illustrating primary support 592 at a pendant cable-supporting, aircraft tail hook-engaging height, and position 2 whereat its cable holder 1525 is fully extended by spring 1523, ready to pretension the pendant cable 549 upon its arrival at a battery position during retraction following an aircraft arrestment.

The outer portion of sleeve 1521 carries an ejectable pendant cable holder 1525 which includes a cylindrically through-bored shank portion 1526 having a relatively loose fit upon the outer end of sleeve 1521. Cable holder 1525 has an arced cable-contacting surface as illustrated in FIG. 38 which may be hard-surfaced to prevent abrasion of pendant cable 549. The threshold-facing surface of cable holder 1525 is contoured for compatibility of coaction with an aircraft's tail hook when directly encountered thereby so as to be carried along with, or ejected from, cable 549 by the aircraft's tail hook. The shank portion 1526 is provided with a projecting tab or key within its bore, to engage a keyway 1527 of the sleeve 1521 to maintain the holder in a generally horizontal attitude.

FIG. 40 is a top view of one of the secondary pendant cable supports 594. The make-up of supports 594 is the same as that of primary supports 592 except (1) sleeve 1521 and spring 1523 are omitted from the support assembly; (2) shroud 1528 may be cylindrically shaped instead of being triangularly shaped as is shroud 1524; (3) shaft keyway 1522 may be omitted and keyway 1527 is applied directly to the shaft's outer end; and (4) its cable holder 1529 is of straight form which is applied to its shank portion 1530 at a slight angle to conform to the general line-up of the cross-runway pendant cable's retraction channel 596.

Both primary and secondary pendant cable support mounting boxes 1504 are provided with a normally covered access area 1531 the cover plate of which may be removed to service or adjust any of the support mechanisms.

When primary supports 592 and secondary supports 594 are desired to assume a retracted attitude as illustrated in FIG. 39, air pressure is introduced into their cylinders 1505 at line openings 1511 and maintained within the outer end of the cylinder as long as the retracted position is desired. It should be noted that an air pressure failure, as well as a controlled air pressure bleed-off through opening 1511 will permit these supports to raise pendant cable 549 to normal arrestment height, through force of the springs 1517 which are compressed when supports 592 and 594 are retracted (1) by introduction of air pressure at openings 1511 or (2) by roll-down of these supports or the pendant cable 549 by aircraft landing wheels.

In addition to being an arrestment fail-safe method of retracting pendant cable 549 together with supports 592 and 594 as just described, pneumatic cylinders 1505 provide means of selectively changing the recovery rate of bringing cable 549 back to arrestment height (see position 1 of FIG. 39), after a landing wheel roll-down of the cable and its supports. Cylinders 1505 also provide means of imparting accelerated vertical motion to cable 549, or portions thereof, to achieve a cable height even beyond that of the erected primary and secondary supports 592 and 594, if desired, by suddenly releasing air out of line openings 1511 and simultaneously introducing air pressure into line openings 1512.

Upon release of air pressure at line openings 1511, pistons 1507 assume a position adjacent the outer end of cylinders 1505. Lines feeding openings 1512 are equipped with an appropriately orificed check valve 1533 to permit free in-flow of air into cylinders 1505 during support erection, and a highly restricted out-flow of air out of cylinders 1505 during force-down of supports by landing wheel roll-down. Consequently, an increase in air pressure within the inner end of cylinders 1505 will occur due to the check valving of line openings 1512. The thrust of such air pressure acting upon pistons 1507 to move them to the opposite (outer) end of cylinders 1505 will augment the action of compression springs 1517 in returning supports 592 and 594 to their normal tail hook engaging height.

Selective levels of air pressure may be introduced into cylinders 1505 as required to obtain the precise arrestment height recovery rate desired for pendant cable 549 together with supports 592 and 594 after transient depression due to landing wheel roll-downs.

(D) System for moving pendant cable between arrest and launch positions

The details of the system for moving support 598 between arrest and launch positions will now be described. See FIGS. 34–37. Two junior class channels 1600 are shown, having a length sufficient to provide the required longitudinal travel for support 598 as illustrated in FIG. 12, and are fastened together in spaced-apart conformation by end plates 1601 to form a box-shaped girder within which is located a self-propelled, rectangularly shaped trolley 1602. Trolley 1602 is equipped with four top-roller brackets 1603 and four bottom-roller brackets 1604. Each of the eight roller brackets have a roller axle 1605 and a trolley-carrying roller 1606 contacting the top and bottom flanges of girder channels 1600.

Trolley 1602 is provided with a reversible electric motor 1607 the armature shaft of which is equipped with a worm gear 1608. Motor 1607 is mounted upon a pivoted bracket 1609 supported within the trolley frame by pivot shafts 1610. A traction counter-shaft 1611 has a keyed gear 1612 which is optionally driven by the motor's worm gear 1608. Traction countershaft 1611 is also provided with a keyed roller chain sprocket 1613. A roller chain 1614, having sufficient length to extend from one girder end plate 1601 to the other, is fastened thereto by brackets 1615. Roller chain 1614 is passed through openings 1616 in each end of the trolley frame. A guide roller 1617 is rotatably mounted upon a trolley frame-supported shaft 1618 so as to properly maintain roller chain 1614 in mesh with chain sprocket 1613.

The motor's mounting bracket 1609 is provided with a curved detent-associated portion 1619 having a radius of curvature about the axis of rotation of motor bracket 1609 upon shafts 1610. A detent pin and associated spring is mounted in a trolley frame-attached housing 1620. A manual motor-tilting lever 1621 is securely fastened to motor 1607 or its bracket 1609 and is employed to tilt the motor approximately 15° to disengage the motor's worm gear 1608 from gear 1612, a detent-retained engaged position (illustrated in FIG. 35) so as to engage another gear 1622 which is associated with the raising and lowering of a pendant cable-supporting mast.

Gear 1622 is keyed to a primary countershaft 1623 having a worm gear portion 1624 near the end opposite said gear. Primary countershaft 1623 is rotatably supported at its worm gear end by the trolley frame's sidewall and at the gear end by a trolley frame-mounted pedestal 1625. Worm gear 1624 meshes with a gear 1626 keyed to a secondary countershaft 1627 which is rotatably supported by brackets 1628 and 1629 attached to the trolley frame's sidewall. The end portion of secondary countershaft 1627 which is adjacent bracket 1629 is fashioned as a worm gear 1630 associated with a power-extendible and power-retractable, telescoping pendant cable-supporting mast assembly 16631. Worm gear 1630 meshes with a gear 1632 keyed to a cylindrical outer mast member 1633.

The outer mast member 1633 is fashioned to be rotatably supported and vertically located by a trolley frame-mounted bracket 1634. Outer mast member 1633 is also rotatably supported at its upper end by a trolley frame sleeved portion 1635. Outer mast member 1633 is internally recessed and such portion threaded to accommodate the threaded lower end flanged portion of an intermediate mast member 1636 for vertically propelling the same. The cylindrical stem portion of intermediate mast member 1636 is provided with one or more longitudinal keyways for causing unitary rotation of a friction plate 1637 the outer surface of which has sliding frictional contact with the inner surface of the non-rotating sleeved frame portion 1635. Friction plate 1637 is prevented from being vertically displaced by a retaining ring 1638. Intermediate mast member 1636 has a recessed and threaded portion associated with a tubular, lower-end flanged inner column 1639 which has a grooved, pendant cable-supporting holder 1640 securely fastened to its upper end. Column 1639 has a tubular portion 1641 extending below its flange, and its flange is threaded for being vertically propelled by the recessed threaded portion of intermediate member 1636. Column 1639 is provided with a full length internal keyway 1642 and is, at all vertical positions, prevented from rotation by a stationary tubular guide member 1643, which is fastened to the bottom of trolley 1602 and which is equipped with a key 1644 at its upper end.

Cable holder 1640 is provided with a hinged protective cap 1645 enclosing an electric motor-controlling switch box 1646 having two motor rotation-selecting push buttons 1647 and 1648. Switch box 1646 is provided with suitable wiring (not fully shown) which emerges through an opening 1649 located near the bottom of guide member 1643 and which wiring connects with a brush-equipped, trolley frame-mounted electric current pick-up box 1650.

An electric cable wind-up drum 1651 is rotatably supported upon a trolley frame-mounted shaft 1652. A drum-rotating spring 1653 is anchored to, and surrounds shaft 1652, its opposite end being fastened to cable wind-up drum 1651. An electric cable 1654 is suitably anchored on the outside surface of drum 1651, its current-carrying wires being connected to current-transferring, co-axially disposed slip rings mounted upon the end of drum 1651 adjacent the electric current pick-up box 1650, said slip rings being contacted by brushes associated with box 1650.

Cable 1654 passes through an opening 1655 in the end of the frame of trolley 1602. Cable 1654 is prevented from having interference contact with motor 1607 by a curved plate 1656 fastened to the upper end of said motor. Cable 1654 has sufficient overall length to be appropriately anchored to, and wired into an electric junction box 1657 located on an end plate 1601 as shown, when the trolley 1602 is positioned at the far opposite end of the girder.

(E) Control console

Control of the general arrest and launch systems can be accomplished in various ways. The control console which will be described (see FIG. 30) can be located in the airport or airstrip control tower or elsewhere. However, it will be noted that certain systems (i.e., positioning the proper pendant cables in primary arresting and overrun arresting position, activation of movement of the main cables, giving values for RTM, RTA, ATM and ATA according to the type of aircraft and landing weight, etc.) can be adapted to be controlled by radio signals from an aircraft ready to land. Various details of control from control tower or from aircraft will be readily understood by those skilled in the art, so the following description will be only of certain primary instrumentalities of a control console forming a specific embodiment of my invention.

Referring to FIG. 30, console 652 includes a control panel 1700 having four pivotably mounted manual control levers 1701, 1702, 1703 and 1704 which are shiftable to obtain desired values for selective maximum aircraft arrestment retarder torques (RTM), to obtain desired applied retardation torques and deceleration velocities during aircraft arrestment (RTA), to obtain selective maximum cable-accelerating drive torques (ATM) and to obtain various levels of cable-accelerating drive output torques and velocities during cable pre-acceleration preparatory to arrestments as well as power levels to be delivered during aircraft launchings (ATA), respectively.

Control lever 1701 is fashioned to impart push-pull movement to a remote control type of flexible cable 1705. The remote end of caable 1705 is connected to the traveling weight 432 (see FIG. 13), carried by a shaft 1706 which is securely coupled to a retarder-mounted shaft 1707. Shaft 1707 is provided with three arm-mounted rod-actuating rollers 402 each of which operates a rod 374 shown in FIG. 13.

The retarders' power indicating gage 250 is provided with two pointers. Pointer 250ᵃ is positioned in accordance with the selective location of the maximum torque-controlling weight 432 by lever 1701.

Control lever 1702 is fashioned to impart push-pull movement to a flexible cable 1708 the remote end of which is coupled to a bell crank 1709. Bell crank 1709 is securely fastened to a retarder-mounted shaft 1710 which, when oscillated by bell crank 1709, selectively positions spool valve 182 of main control valve 136 associated with each retarder 612.

Pointer 250[b] of gage 250 is operated by the average hydrostatic pressure within units of the compounded retarders 612 so as to indicate the actual applied torque being absorbed by said retarders as controlled by lever 1702.

Control lever 1703 is equipped with a remote cable 1711 to provide oscillatory motion to an actuating arm 1712 which is securely fastened to a control shaft 1713 of the cable-accelerating hydraulic drive 606. Drive 606 is provided with an automatic torque-limiting valve similar in form to valve 212 (see FIG. 3), but equipped with a variable rate compression spring in the place of spring 242. Control shaft 1713 is operatively associated with changing the anchor position for said spring so as to vary the thrust force thereof to selectively establish the operating level of the automatic torque-limiting valve of drive 606.

The cable-accelerating drive 606 has a power-indicating gage 1717 which is provided with two pointers 1718 and 1719. Pointer 1718 is positioned according to the selective location of lever 1703 during establishment of the maximum torque level for drive 606.

Control lever 1704 is arranged to impart push-pull movement to a flexible cable 1714 which is of the remote control type, the remote end of which is connected to a valve control shaft's actuating arm 1715. Arm 1715 is securely fastened to the valve control shaft 1716 which operates the main control valve to establish the actual power output of drive 606.

Pointer 1719 of gage 1717 is sensitive to the working pressure within drive 606 so as to indicate the actual applied torque being delivered by drive 606 as controlled by manipulation of lever 1704.

(F) System for repositioning cables

During arrestment or launch, the main cables may be pulled into arced positions out of normal alignment with channels 576, 578, 566, 568. Below will be more specifically described the system for repositioning the main cables into normal position after arrest or launch is completed. Reference is made to FIGS. 31–33.

(1) Structures.—A powered installation at each side of staging areas 502 and 504 consists of a box 1800 within which is mounted a small flanged cable capstan 1801 rotatingly supported by a shaft 1802 fastened to the side walls of box 1800. One flange of capstan 1801 is fashioned to form a gear 1803. A reversible electric motor 1804 is mounted within box 1800 by means of a bracket 1805. Motor 1804 has an armature shaft provided with a worm gear portion 1806 meshing with capstan gear 1803.

A relatively small flexible power-transmitting cable 1807 has several wraps placed around capstan 1801. One end of cable 1807 is provided with a swaged fitting 1808 and the other end with a swaged fitting 1809. Cable 1807 is supported by capstan 1801 and by a rotatably supported sheave 1810 located in a cross-runway channel 636 and near the runway center-line as shown.

Channel 636 includes a lower U-shaped portion 1811 which extends from box 1800 to box 1800 located at the sides of staging area 502 and adjacent main cable channels 576 and 566. The top of portion 1811 is somewhat below the bottom of longitudinal channels 576, 578, 566 and 568 within which main cables 550 and 548 are clearance-supported by fairlead rollers 570, 572, 560 and 562 so that these cables are not interferingly contacted by transverse cable 1807. An upper portion 1812 of channel 636 is comprised of two channels having open-faced relation with each other and the span of which begins at the runway sides of main cable channels 578 and 568. The end portion 1813 of the bottom flange of each channel portion 1812 is angled downward so as to assist re-entry of certain channel-supported rollers to be described later (see FIG. 32).

Cable fitting 1808 is connected to a retractable, main cable retraction carrier assembly 1814 by means of a cross-pin 1815. Cable fitting 1809 is connected to carrier assembly 1814 by a cross-pin 1816. Carrier assembly 1814 is provided with a rectangularly shaped end-cage portion 1817 within which is mounted a main cable-contacting roller 1818 (referred to as 634 and 634[a] in FIG. 12), which is rotatably supported upon a shaft 1819 securely mounted in the frame of the end-cage portion 1817. A pair of carrier-supporting rollers 1820 is rotatably mounted upon an axle 1821 which is securely fastened to carrier 1814.

Carrier assembly 1814 is provided with an erection stop portion 1822 which is vertically disposed as viewed when the carrier is in retracted attitude as illustrated at the left end of the FIG. 32. Stop portion 1822 is horizontally disposed and in contact with the under side of cable fitting 1808 when carrier assembly 1814 is in erected attitude as illustrated near the right end of FIG. 32. The width of carrier assembly 1814 is such that it is at all times closely adjacent the flanges of channel portions 1812 so as to prevent excessive longitudinal rotation of carrier 1814 about the centerline of cable 1807 when the carrier 1814 is retracting main cables into the general area of channels 576 or 578 and said carrier is being vertically supported by capstan 1801 and cable 1807.

(2) Operation of transverse repositioning system.—To describe the automatic retracting and erecting action provided for carrier assembly 1814, reference is made to FIG. 32 and FIG. 12. Assuming, for example, that the outbound portion of cable 550 has been arced away from the area of channel 578 during an aircraft arrestment or launching, and that such arrestment or launching cycle has been completed, motor 1804 is operated to rotate capstan 1801 in clockwise rotation. The portion of cable 1807 between capstan 1801 and carrier 1814 by way of sheave 1810 and fitting 1809 will be in tension and the portion of said cable between capstan 1801 and carrier 1814 by way of fitting 1808 will be relaxed. The slight difference in horizontal planes of force between fittings 1808 and 1809, due to the slight vertical offset therebetween is substantially countered by the combined weight of the carrier's end-cage portion 1817 and its roller 1818 to such extent that only a slight elevation, if any, of said end-cage will occur during movement of carrier assembly 1814 toward the runway center-line until the carrier passes under and beyond the arced main cable 550.

Motor 1804 is now reversed to operate capstan 1801 in counter-clockwise rotation. The portion of cable 1807 between capstan 1801 and carrier 1814 by way of fitting 1808 is now in tension, and the balance of the cable between capstan 1801 and carrier 1814 by way of sheave 1810 and fitting 1809 will be relaxed. It will be noted that the fitting 1808 and its cross-pin 1815 is connected to carrier assembly 1814 at approximately 45° to a vertical line through the carrier's axis of rotation at axle 1821, being a point which is well below the horizontal plane of said axle. Consequently, the reaction of a tensioned fitting 1808 and a relaxed fitting 1809 produces a revolving of carrier assembly 1814 in clockwise direction about the axis of axle 1821 until its main cable-contacting roller 1818 is in substantially vertical attitude and stop 1822 has contacted the tensioned cable fitting 1808.

It should be noted that any substantial continued clockwise revolving of carrier 1814 beyond the vertical attitude will cause a rapid over-taking of fitting 1809 relative to fitting 1808 with resultant increase in the wrapping tension of cable 1807 around capstan 1801 for prevention of slippage therebetween. Such increased tension of the entire length of cable 1807 is initiated and progressed during carrier rotation from its retracted to its erected position. Also, it should be noted that the position of connection of fitting 1808 relative to the carrier's axle's vertical centerline (retracted attitude) may be designed so as to change the character of erected-carrier performance as desired. For example, connecting the fitting 1808 to the carrier 1814 45° to the left of a point that is directly below the axle 1821 when the carrier is in retracted attitude will cause cable 1807 and its fitting 1808 to be substantially above the horizontal plane of axle 1821 were the roller 1818 to assume a completely vertical attitude. Consequently, the resultant of forces will cause the roller 1818 to present a negative inclined plane to the main cable with somewhat of a "hooking" action, during the transverse retraction of main cable 550.

After the main cable 550 has been returned to its normal operating position in longitudinal channel 578, motor 1804 is caused to again rotate capstan 1801 clockwise, whereupon the tensioned cable fitting 1809 and relaxed cable fitting 1808 produces full retraction of the carrier assembly 1814 for parking purposes. Parking location for the carrier assembly 1814 is preferably between channel 578 and the edge of the runway.

(G) Description of main cable support equipment at staging areas

Referring to FIGS. 12 and 20, sheaves 522 and 524 are shown associated with an anchor-bracket assembly 526 consisting of a base 1900 securely anchored to the threshold end of the primary trap 554.

Base 1900 includes a pair of vertically disposed V ways 1901 and 1902 fashioned to retain sheave-supporting members 1903 and 1904, respectively, from horizontal movement while permitting said members to be moved vertically as desired.

A pneumatic or hydraulic cylinder 1905 is securely mounted to a bracket portion 1906 of base 1900. Cylinder 1905 contains a piston 1907 having a rod 1908 which is connected to an arm portion 1909 of member 1903 by a cross-pin 1910. Cylinder 1905 is provided with an air or fluid line opening 1911 at its lower end and a line opening 1912 at its upper end.

A similar cylinder 1913 is securely mounted to a bracket portion 1914 of base 1900. Cylinder 1913 contains a piston 1915 having a rod 1916 which is connected to an arm portion 1917 of member 1904 by a cross-pin 1918. Cylinder 1913 has a fluid line opening 1919 at its lower end and a line opening 1920 at its upper end.

The sheave-supporting member 1904 includes the emergency shuttle ejector 600. As shown in FIG. 12, the upstream end of ejector 600 is chamfered so as to effect full separation of cable gripping shoes 1300 of pendant cable shuttle 588 in the event of an aircraft launching or arrestment system over-run, whereupon shuttle 588 is released from cable 548 to pass over the area of primary trap 554.

The main cable 548 passes through shuttle ejector 600, then around sheaves 522 and 524 to pass through a fairlead tube 1921 en route to capstan 536.

Referring to FIGS. 12 and 21, sheave 514 is rotatably supported by an oscillatable shaft portion 1922 of its anchor-bracket 518. Bracket 518 is securely anchored to the mid-field end of primary trap 552.

A pneumatic or hydraulic cylinder 1923 is pivotably fastened to the bottom area of trap 552 by means of a bracket 1924 and a cross-pin 1925. Cylinder 1923 is provided with a piston 1926 having a rod 1927. A fluid line opening 1928 is located at the lower end of cylinder 1923 and a line opening 1929 is provided at the upper end of cylinder 1923.

Rod 1927 is connected to an arm 1930 which is keyed for unitary movement with shaft portion 1922 of bracket 518, by a cross-pin 1931. FIG. 21 illustrates sheave 514 at its neutral attitude, however, a dash-line illustrated attitude of tilt is used to relate to aircraft arrestment or launching cycles employing shuttles 588 and 590 using ing-bound portions of main cables 548 and 550. Pressure is introduced at line opening 1928 to cause piston 1926 to assume its uppermost position within cylinder 1923. Pressure introduced at line opening 1929 will move piston 1926 to its lowermost position, rotating shaft 1922 and sheave 514 approximately 90° to facilitate like use of out-bound portions of main cables 548 and 550.

Fairlead rollers 560 and 562 are raised and lowered by us of a pair of pneumatic or hydraulic cylinders 1932 and 1933, illustrated in FIG. 22, each of which is rigidly vertically mounted in secondary traps 564 through use of a bracket 1934. Cylinder 1932 contains a piston 1935 having a rod 1936 terminating in a U-shaped roller support 1937 within which roller 560 is rotatably mounted on a shaft 1938. Cylinder 1932 has an air or fluid line opening 1939 at its lower end and a line opening 1940 at its upper end.

Cylinder 1933 contains a piston 1941 having a rod 1942 terminating as a U-shaped roller support 1943 within which roller 562 is rotatably mounted on a shaft 1944. Each roller support 1937 and 1943 is provided with a guide bar 1945 having sufficiently close proximity with the side walls of trap 564 so as to maintain rollers 560 and 562 in appropriate longitudinal alignment with channels 566 and 568. Cylinder 1933 has a fluid line opening 1946 at its lower end and a line opening 1947 at its upper end.

Pistons 1935 and 1941 are illustrated at their lowest or neutral height whereat rollers 560 and 562 carry cable 548 with its top surface at or slightly below the runway surface. During aircraft arrestment or launching cycles employing out-bound portions of main cables 548 and 550, fairlead rollers 562 and 570 (see FIG. 12) are raised so as to bring these cables slightly above the runway surface. During employment of in-bound portions of main cables 548 and 550, fairlead rollers 560 and 572 are raised so as to bring such portions of these cables above the runway surface.

Having thus described my invention, as applied to land vehicles and to aircraft arresting-launching systems, I do not wish to be understood as limiting myself to the exact details shown. Instead, I wish also to cover other modifications of my invention which will occur to those skilled in the art after learning of my invention as described and within the proper scope of my invention.

Although in this specification I have used the term "cable," for the purpose of interpretation of the claims, this term, when used in specification and claims, is defined to include all suitable flexible tension members such as wire rope, metal chain, fibrous rope (to the extent applicable) and nylon or similar plastic reinforced strips, bands or ropes, such as the nylon tape that has been used as so-called "purchase tapes" in some prior aircraft arrestment systems.

I claim:

1. A variable power absorbing retarding system comprising
    (a) a rotatable input shaft for coupling to a load to be retarded;
    (b) non-rotatable, force accepting means stationarily positioned with respect to said input shaft;
    (c) a stationary housing coupled to said force accepting means;
    (d) positive displacement pump means within said stationary housing,
        a first section of said pump means being connected to said input shaft for rotation therewith;
        a second section of said pump means being coupled to said stationary housing;
    (e) a source of oil and air connected to said pump means;
    (f) externally operable control means connected between said source and said pump means;
        said control means being adaptable to meter air and oil selectively and variably in all proportions between 100% oil and 100% air, and to control adjustably discharge from said pump means;
    (g) whereby said pump means is operable as a hydrostatic hydraulic mechanism to apply retarding action on said load between the limits of substantially zero retardation when all air is fed to said pump means and maximum retardation when oil is fed to said pump means and pump discharge is substantially prevented.

2. The subject matter of claim 1 in which said first pump section includes a central gear and in which said second pump section includes a series of side gears engaged with said central gear, each side gear being rotatable about its axis but the axes of the series of side gears being non-rotatable relative to the axis of said central gear.

3. The subject matter of claim 2 in which there are three side gears and in which said housing is substantially triangular in a cross-section transverse of the axes of said central gear with one of the side gears positioned generally in each angle of the triangle.

4. The subject matter of claim 1, in which there is automatic torque limiting means automatically operative when said control means is limiting discharge of oil from said pump to bleed off pump discharge pressure when torque tends to exceed a preset limit, said torque limiting means bleeding off pressure to the extent required to maintain torque at a level not above the preset limit and overriding the setting of said control means to limit discharge.

5. The subject matter of claim 1 in which said retarding system is associated with another hydraulic system that includes a source of oil which forms said oil source means for said pump means, whereby separate oil supply means is not required for said retarding system.

6. The subject matter of claim 5 in which said retarding system is on a vehicle supported by rotating supporting members and said load includes the momentum of said vehicle involving the tendency of said supporting members to rotate on supporting surfaces which load is applied to said input shaft by connection of said input shaft to at least part of said rotating supporting members and in which said other hydraulic system is a hydraulic system of said vehicle.

7. The subject matter of claim 1 in which said retarding system is on a vehicle supported by rotating supporting members and said load includes the momentum of said vehicle involving the tendency of said supporting members to rotate on supporting surfaces which load is applied to said input shaft by connection of said input shaft to at least part of said rotating supporting members.

8. The subject matter of claim 7 in which said vehicle has an engine, a torque converter, and a power shift transmission, and said input shaft is a part of a driveline from said engine through said torque converter and transmission to some of said rotating supporting members, said housing being interposed between and secured to said torque converter and said transmission and said input shaft being connected to said torque converter and said transmission to transmit power therebetween.

9. The subject matter of claim 1 in which said load includes an aircraft arresting system including a capstan and a cable system including a cable wrapped around said capstan, said input shaft being connected to said capstan.

10. The subject matter of claim 9 in which said cable system is endless and a source of power driving said cable portion whereby cable can be moved along the path of a landing aircraft and the arresting system is in motion prior to aircraft connection, said cable system including a shuttle adapted to connect to said cable system upon aircraft engagement therewith, whereby upon aircraft engagement with said shuttle said source of power may be disconnected from said cable system and retardation may be applied by operation of said control means.

11. A retarding system comprising
(a) a load to be retarded having an input to the retarder system in the form of rotary motion applied to an input shaft;
(b) non-rotatable, force accepting means which is stationary relative to said input shaft;
(c) a stationary housing secured to said force accepting means and positive displacement pump means therein having a first pump section connected to said input shaft and rotatable therewith and having a second stationary pump section secured to said stationary housing, pump action being achieved by rotation of said first section relative to said second section;
(d) source means of oil and air connected to said pump means and externally operable control means interposed between said source means and said pump means and adjustably metering air, oil and various proportions of air and oil to said pump means and said control means also adjustably controlling discharge from said pump means;
(e) automatic torque limiting means automatically operative when said control means is limiting discharge of oil from said pump to bleed off pump discharge pressure when torque tends to exceed a preset limit, said torque limiting means bleeding off pressure to the extent required to maintain torque at a level not above the preset limit and overriding the setting of said control means to limit discharge;
(f) said torque limiting means including a cylinder having an inlet and an outlet port, a bypass passageway between said control means and the discharge side of said pump means, said bypass passageway being connected to said inlet port, a piston in said cylinder and movable between a first position blocking said outlet port and positions variously opening said outlet port to discharge from said cylinder, and means biasing said piston toward said first position and susceptible of being overcome by pressure on the discharge side of said pump means;
whereby said pump means is operable in the nature of a hydrostatic hydraulic mechanism to apply retarding action on said load between the limit of substantially zero retardation when all air is fed to said pump means and the limit of maximum retardation when all oil is fed to said pump means and pump discharge is substantially prevented.

12. The subject matter of claim 11 in which said biasing means is a spring.

13. The subject matter of claim 11 in which said biasing means includes a cantilevered pivotal arm, a weight movably mounted of said arm for selective positioning realtive to the axis of pivoting of said arm, and motion transfer means between said arm and said piston applying biasing force to said piston according to the tendency of said weight to pivot said arm in the various positions of said arm and whereby the biasing force may be varied according to the selected positioning of said weight.

14. The subject matter of claim 13 in which there is a remotely controlled and selectively operated motor connected to said weight and operable to move said weight to various positions on said arm, whereby retardation may be varied within certain limits by setting said control valve to limit discharge and by moving said weight by said motor between positions of greater and lesser biasing force thereby decreasing and increasing maximum torque.

15. An aircraft arresting system for an aircraft runway, comprising:
(a) an endless main cable along each side of said runway and sheave support means therefor;
(b) retarding means operative to restrain movement of said main cables;
(c) a cross-runway pendant cable and means at each and of said pendant cable operative to attach said pendant cable to said main cables;
(d) control means for said retarding means, whereby during aircraft arrestment by engagement with said pendant cable movement of said main cables can be retarded by said retarding means.

16. The subject matter of claim 15 in which said retarding means includes capstan means engaging said main cable, a retarder input shaft connected to said capstan means whereby the aircraft load is applied to said retarding means in the form of rotary motion, positive displacement pump means having one pump section connected to said input shaft and having another pump section held stationary, and said control means variably and selectively supplying air, oil, and various mixtures thereof to said pump means and variably and selectively limiting pump discharge thereby varying retardation between substantially zero retardation when supplying all air and maximum retardation when supplying all oil and also limited pump discharge.

17. The subject matter of claim 15 in which said sheave support means for each main cable has means operable to produce a differential in height between inner and outer cable runs in the endless path formed by the endless main cable, thereby during arrestment to prevent rubbing between the inner and outer cable runs and between the main cable and the pendant cable.

18. The subject matter of claim 17 in which there are U-shaped channels containing said inner and outer cable runs, there being fairlead rollers supporting said main cable between sheave support means and means operable to change fairlead roller heights at the time a differential in height is produced between the inner and outer main cable runs, there being traps along said runs for collecting derbris and the like, said main cables, sheave support means, U-shaped channels, and fairlead rollers normally having a height substantially no higher than grade except when said differential in cable height is produced, at which time the outer cable run is above grade level.

19. The subject matter of claim 15 in which there is power means operative to power movement of said main cables in endless paths defined by said sheave support means whereby said main cables may be brought up to a speed comparable to that of an approaching aircraft before arrestment begins, said means at each end of said pendant cable operative to attach to said main cables being shuttles adapted to secure to said main cables when said pendant cable is first tensed by an aircraft to initiate arrestment, at which time said power means is deactivated and said retarding means is applied.

20. The subject matter of claim 19 in which there is a channel member containing each main cable portion to which one of said shuttles attaches and said shuttles being releasably retained by said channels to be supported thereby until separated therefrom by aircraft engagement tensing said pendant cable, said channels being elevatable to support said shuttles in position for initiation of arrestment.

21. The subject matter of claim 19 in which said power means and arresting means include a common capstan for each endless main cable, said power means and arresting means acting on said capstan for transmission of power and for applying retardation, and each main cable having a cable tensioner to maintain tension therein.

22. The subject matter of claim 21 in which there is a motor adapted to be attached to said capstan operative to power movement of said main cables in the opposite direction from that in which said main cables are moved during powering by said power means, whereby said main cables may be moved to bring said pendant cable back to initial position after arrestment.

23. The subject matter of claim 15 in which said system is used for launching as well as arresting aircraft and power means operative to power movement of said main cables in endless paths defined by said sheave support means for launching.

24. The subject matter of claim 23 in which said power means includes a power plant, capstan means connecting to said cables, a flywheel unit for storing of energy prior to launch, and a disconnect unit between the capstan means and said flywheel unit, whereby said power plant can power said flywheel into rotation storing energy prior to launch with said disconnect unit disconnecting said capstan unit therefrom, and upon launching said flywheel may be connected to said capstan means to power said main cables during aircraft launching.

25. The subject matter of claim 24 in which said retarding means is also connected to said capstan means and said power plant is operative to bring said main cables up to nearly landing speed of an aircraft prior to arrestment and said means at each end of said pendant cable being shuttles adapted to be secured to said main cables prior to launching and operative to secure to said main cable when said pendant cable is first tensed by an aircraft to initiate arrestment at which time said power plant is disconnected.

26. The subject matter of claim 15 in which said runway has channel means operative to accept said pendant cable in retracted position when not in use for arrestment.

27. The subject matter of claim 15 in which there is support means supporting said pendant cable in position for arrestment above the surface of said runway including a support central of said runway, said support being pivotably anchored at its runway threshold end and having actuator means for raising it to operative height for arrestment and permitting retraction of said support to close to runway level when not in use for arrestment.

28. The subject matter of claim 27 in which said product cable includes spring means tensing said pendant cable across said support for arrestment, said support being grooved and said pendant cable being held in V disposition with the central part of said pendant cable on said support means farther from the runway threshold than the ends of said pendant cable.

29. The subject matter of claim 27 in which said support is faired and inclined and in which said actuator means is yieldable thereby to minimize disturbance to an aircraft tire or tail hook hitting the same.

30. The subject matter of claim 27 in which said support is a primary support and there are a plurality of secondary supports for said pendant cable at either side of said primary support and pivotably anchored and actuator biased in the same manner as said primary support, said secondary supports assisting in holding said pendant cable within arrestment begin specification tolerances.

31. The subject matter of claim 15 in which there is support means supporting said pendant cable in arrestment position in V disposition with the central part of said pendant cable farther from the runway threshold that the ends of said pendant cable.

32. The subject matter of claim 31 in which said system is used for launching as well as arresting aircraft and in which there is a second launching pendant cable support closer to the runway threshold than said primary support and supporting said pendant cable in position cable in V disposition with the central part of said pendant cable closer to the runway threshold than the ends of said pendant cable.

33. The subject matter of claim 32 in which there are guide and actuating means for said second support to travel from its normal position to a position at the other side of the first-mentioned support for moving said pendant cable between its arresting and launching positions, said support means also having actuator means for raising and lowering the same for maneuvering the pendant cable and for retraction from pendant cable support to positions substantially no higher than the runway surface.

34. The subject matter of claim 15 in which there are shuttles forming said means at each end of said pendant cable operative to attach to said main cables and there being emergency shuttle ejectors associated with said sheave support means for disengaging pendant cable from said main cables in case said pendant cable approaches said sheave support means.

35. The subject matter of claim 15 in which there is a RTM control on said retarding means selectively operative to establish the maximum arrestment force to be exerted on an aircraft by the cables during arrestment.

36. The subject matter of claim 15 in which there is a RTA control on said retarding means selectively operative to progressively modify levels of arrestment forces to be exerted on aircraft by the cables during arrestment.

37. The subject matter of claim 15 in which said system is also used for launching and in which there is power means operative to power movement of said main cables in endless paths defined by said sheave support means for launching and in which there is an ATM control on said power means selectively operative to establish the maximum cable force to be exerted by the cables during launching.

38. The subject matter of claim 15 in which said system is also used for launching and in which there is power means operative to power movement of said main cables in endless paths defined by said sheave support means for launching and in which there is an ATA control on said power means selectively operative to progressively modify levels of cable forces to be exerted by the cables during launching.

39. The subject matter of claim 15 in which there is a cable positioning means located midway longitudinally of said main cables having a pair of cable retraction carrier finger members normally retracted to a level substantially no higher than the runway surface, and said cable positioning means including actuating means operative to raise each of said finger members and to move said finger members and said main cables to positions approximately at normal main cable positions, whereby when said main cables become bowed during engagement of an aircraft with said pendant cable, said cable positioning means may be later used to assist in repositioning said main cables in their normal positions.

40. A method of retarding a load, comprising:
  (a) applying the load in the form of rotary motion;
  (b) providing positive displacement pump means and applying the rotary motion to one pump section of the pump means while holding the opposite pump section of said pump means stationary;
  (c) variably and selectively supplying air, oil, and various mixtures thereof to said pump means and variably and selectively limiting pump discharge, thereby varying retardation between substantially zero retardation when supplying all air and maximum retardation when supplying all oil and also limiting pump discharge.

41. The subject matter of claim 40 in which the load includes a moving vehicle and in which the retardation is in slowing the vehicle, the vehicle being supplied with rotating supporting members rotating on a supporting surface, and in which said rotary motion is supplied by connecting said pump means to one or more of said rotating supporting members.

42. The subject matter of claim 40 in which the load includes an aircraft during landing operations and in which the retardation is in slowing the aircraft, the retardation being accomplished by connecting the aircraft to said pump means by a cable system applying the load in said rotary motion.

43. An aircraft having a flexible launching bridle, a launching bridle releasable attachment device, and a flexible abort member attached at one end to said aircraft nearer the tail portion of the aircraft than said attachment device, and means operative selectively to connect the other end of said abort member to said aircraft at a location so that the abort member extends through said launching bridle and thereby connects therewith, whereby when said aircraft is being launched by a member applying a towing force to said launching bridle and it is decided to abort said abort member can be connected to said launching bridle and said attachment device can be operated to release said bridle and said launching bridle and flexible abort member may be permitted to assume trailing positions and the member applying the towing force may then apply a retarding force to the aircraft.

44. An aircraft arresting system for an aircraft runway, comprising:
  (a) a staging area near each end of said runway for aircraft arrestment and an endless main cable along each side of each staging area and sheave support means therefor;
  (b) a battery position near each end of each staging area and a cross-runway pendant cable at each battery position and means at each end of said pendant cables operative to attach said pendant cables to said main cables, the pendant cables at threshold ends of said runway each being a principal arrestment cable and the medial pendant cables being standby arrestment cables in case of failure of arrestment of principal arrestment cables, the standby arrestment cable for each principal arrestment cable being in the opposite staging area;
  (c) retarding means operative to restrain movement of said main cables;
  (d) control means for said retarding means, whereby during aircraft arrestment by engagement with a pendant cable movement of said main cables can be retarded by said retarding means.

45. The subject matter of claim 44 in which there is means associated with each pendant cable for moving it between a lower inoperative position and an upper operative arrestment position disposed to be engaged by an aircraft tail hook, whereby on each aircraft landing only the principal pendant cable at the runway threshold the aircraft approaches and the standby cable in the opposite staging area are selectively positioned in arrestment position.

46. The method of aircraft arrestment by a system including at least one cable, extending longitudinally of a runway, having means for aircraft connection to said cable in arrestment, comprising:
  (a) before aircraft engagement bringing said cable to a speed, in the same direction as aircraft landing, close to aircraft landing speed, thereby minmizing load applied to the aircraft in bringing the cable and aircraft to the same speed;
  (b) thereafter applying a retarding force on said cable retarding said aircraft thereby accomplishing arrestment.

47. The method of aircraft arrestment by a system including a pair of main cables at each side of a runway and a pendant cable to be attached to said main cables and to be engaged by an aircraft in arrestment, comprising:
  (a) by the time of aircraft touchdown bringing said main cables to speeds, in the same direction as aircraft landing, close to aircraft landing speed, thereby minimizing load applied to the aircraft in bringing the main cables and aircraft to the same speed;
  (b) holding said pendant cable stationary until aircraft engagement therewith and then attaching said pendant cable to said main cables and applying a retarding force on said main cables retarding said aircraft thereby accomplishing arrestment.

48. An aircraft arresting system for an aircraft runway, comprising:
  (a) attachment means operative to be engaged by an aircraft during arrestment;
  (b) tension means connected to said attachment means;
  (c) retarding means connected to said tension means including means converting the load of aircraft arrestment and the movement of said tension means to rotary motion applied to a retarder input shaft, positive displacement pump means having one pump section connected to said input shaft and having another pump section held stationary, and control means variably and selectively supplying air, oil, and various mixtures thereof to said pump means and variably and selectively limiting pump discharge thereby varying retardation between substantially zero retardation when supplying all air and maximum retardation when supplying all oil and also limiting pump discharge.

49. The method of performing abort retarded arrestment after an unsuccessful tow of an aircraft for launching by means of a towing launching member towed by a tow member applying towing force, comprising:
  (a) upon decision to abort and arrest, moving said launching member from forward towing disposition to arresting trailing position while maintaining connection between said tow member and said launching member; and
  (b) applying an arresting force to said tow member.

50. The method of performing abort retarded arrestment after an unsuccessful tow on an aircraft for launching by means of a towing launching bridle towed by a tow member applying a towing force, comprising:
  (a) upon decision to abort and arrest, releasing said launching bridle from launching attachment with said aircraft and permitting the bridle to move to a position nearer the tail of the aircraft in trailing position while maintaining connection between the launching bridle and the aircraft and between the launching bridle and the tow member; and
  (b) applying an arresting force to said tow member.

51. Means for performing abort retarded arrestment after an unsuccessful tow on an aircraft for launching by means of a towing launching member towed by a tow member applying towing force, comprising:
  (a) a first releasable attachment means operative to connect said launching member to said aircraft in launching disposition;
  (b) a second connection means operative to connect said launching member to said aircraft in trailing position, whereby upon decision to abort and arrest said launching member may be connected to said aircraft by said second connection means and said first attachment means may release said launching member and said tow member can be used to apply an arresting force to the aircraft by means of said launching member.

52. The subject matter of claim 51 in which said second connection means is operative to permit said launching member to move as a whole rearward of said aircraft after release by said first attachment means.

53. The subject matter of claim 52 in which said launching member is a launching bridle and in which said second connection means includes a cable and said second connection means loops said cable through said bridle to effect connection therewith, said bridle moving as a whole rearwardly by sliding along said cable.

54. The subject matter of claim 53 in which said cable is secured to said aircraft at one end and has a connection member at its other end and there being locking means in said second connection means operative to receive and secure said connection member to said aircraft and there being powered means to move said connection member into locking engagement with said locking means, said locking means being located relative to said first attachment means so that said cable loops through said bridle in the movement of said connection member into engagement with said locking means.

55. The subject matter of claim 54 in which said connection member includes a swaged end on said cable including a link with an eye-like opening, said locking means including a pair of springs pressed together, plungers having beveled ends whereby the plungers may be forced apart by said link and lock in said eye-like opening of said link, said locking means having a funnel shaped opening to guide said link to said plungers, said powered means including a piston and cylinder, the piston being connected to said link by a shear pin, and said first attachment means including a necked member to hold said bridle when said necked member is in a first upright position and said bridle is in launching disposition, said necked member being pivotally mounted and power means to tilt said necked member in normal bridle release.

56. The improvement in means for applying force to an aircraft including a main cable to be connected to said aircraft and means to apply force to said main cable comprising:
  (a) a shuttle;
  (b) means connecting said shuttle to said aircraft;
  (c) said shuttle receiving said main cable and having means operable to grip said main cable to connect said aircraft thereto;
  (d) means to operate said shuttle to grip said main cable; and
  (e) said shuttle and said means to operate said shuttle to grip said main cable having two sets of pivotal cable gripping shoes and spring means normally biasing said shoes into cable gripping disposition, a cam operated cocking means operable to cock said shoes in retracted positions, and in which said means connecting shuttle and aircraft includes a tension member operative to transmit tensioning force between said aircraft and said shuttle to overcome said cam operated cocking means to initiate gripping of said main cable.

57. The subject matter of claim 56 in which there is a channel support for said shuttle at its battery position and rollers on said shuttle whereby said shuttle is guidably supported by said channel, piston and cylinder means for moving said channel up and down from an upper operative position in which said shuttle is substantially above grade level to a lower position in which said shuttle is below grade level.

58. The subject matter of claim 57 in which said channel contains vertically movably supported first piston and cylinder means horizontally operable and having end members movable in opposite directions, second piston and cylinder means operative to raise and lower said first piston and cylinder means, and means on said shuttle connected with said cocking means and outwardly extending from said shuttle in a manner engageable by said end members when said first piston and cylinder means is raised into position by said second piston and cylinder means and said end members are moved apart to lock said locking means.

59. The improvement in means for applying force to an aircraft comprising
  (a) a pair of main cables;
  (b) a shuttle mounted in operative relationship with each main cable;
  (c) a pendant cable connected between said shuttles; and
  (d) brake shoes operatively disposed with respect to each shuttle to grip automatically said main cables in a self-energized manner after being brought into contact therewith.

60. The subject matter of claim 59 in which there is a shuttle battery position at the threshold of a runway and said main cables run parallel of said runway and there is a channel supporting said shuttle and a resilient shuttle stop at the threshold end of said battery position to provide a stop for said shuttle when returning with said main cables to said battery position.

61. A pendant cable supporting system associated with a runway comprising:
  (a) a primary cable support pivotally mounted central of the runway and having a cable supporting end;
  (b) power means connected to said support to raise and lower said cable supporting end of said support; and
  (c) an ejectable cable holder on said cable supporting end of said support.

62. The subject matter of claim 61 in which there is adjustable stop means to limit the height of raising of said cable supporting end of said support.

63. The subject matter of claim 61 in which there is compression spring means interposed between said ejectable cable holder and the pivot of said support whereby said cable may be tensed against the give of said compression spring.

64. The subject matter of claim 63 in which there are a plurality of secondary cable supports on either side of said primary support generally similar thereto except for eliminating said compression spring means.

65. A pendant cable supporting system associated with a runway adapted to move the cable between arresting and launching positions, comprising:
 (a) a trolley and first housing means including track means therefor extending longitudinally of said runway substantially no higher than grade;
 (b) power means on said trolley;
 (c) transporting means between said trolley and said housing means and powered by said power means for moving said trolley along said track means between launch and arrest pendant cable positions;
 (d) a pendant cable supporting mast operative to raise and lower a cable holder at the upper end of said mast;
 (e) said power means being disengageable from said transporting means and engageable with said mast to raise and lower the same.

66. The subject matter of claim 65 in which said transporting means includes chain and sprocket means and in which said power means is an electric motor and there is electrical connection of electric power to said motor by means including an electric cable wind-up drum.

67. An arresting and/or launching aircraft system for repositioning a main cable into original position on a runway after it is arced by an aircraft during its arresting or launching, comprising:
 (a) a cable retraction carrier finger member;
 (b) means operative to raise and lower said finger member;
 (c) means operative to move said finger member transversely of said runway, whereby said finger member can be moved to a cable engaging position and can thereafter be moved to reposition said cable in said original position.

68. The subject matter of claim 67 in which there is a pair of said main cables disposed generally parallel to each other in said original position and there is a pair of said finger members.

69. An arresting and/or launching aircraft system for repositioning a main cable into original position on a runway after it is arced by an aircraft during its arresting or launching, comprising:
 (a) a cable retraction carrier having a finger portion for acting against said main cable;
 (b) a transverse cable disposed transversely of said main cable secured at each end to said carrier forming an endless configuration;
 (c) a powered capstan around which said transverse cable is wrapped to power movement of the same;
 (d) sheave means disposed oppositely to said capstan together forming end supports for said transverse cable in movement thereof, both capstan and sheave means being substantially below grade level;
 (e) said cable retraction carrier being operative to pivot said finger portion downwardly during movement of said carrier away from said original position and to pivot said finger portion to an upward position during movement of said carrier toward said original position by means of differential in cable tension produced in opposite ends of said transverse cable depending on direction of rotation of and direction of wrapping of said transverse cable upon said capstan, whereby said finger member can be moved to the right side of said main cable in down position and then can be raised to move said main cable therewith in movement toward said original position.

70. The subject matter of claim 69 in which there is a housing for said capstan and sheave means, said carrier having roller means guidably supported by said housing and including an axle about which said finger portion pivots in raising and lowering and the ends of said cable being pivotally secured to said finger member in a manner so that the pivots of cable ends and the axes of said axle are disposed to produce said pivoting of said finger portion depending on which cable end has the most tension.

71. A variable power absorbing retarding system comprising
 (a) a rotatable input shaft for coupling to a load to be retarded;
 (b) non-rotatable, force accepting means stationarily positioned with respect to said input shaft;
 (c) a stationary housing coupled to said force accepting means;
 (d) positive displacement pump means within said stationary housing;
   a first section of said pump means being connected to said input shaft for rotation therewith;
   a second section of said pump means being coupled to said stationary housing;
 (e) a source of oil and air connected to said pump means;
 (f) externally operable control means connected between said source and said pump means;
   said control means being adaptable to meter air and oil selectively and variably in all proportions between 100% oil and 100% air, and to control adjustably discharge from said pump means;
 (g) pump priming means between the oil source and the control means including check valve means trapping a quantity of oil upon cessation of retarder operation and upon changing from oil to air supply to the pump means by change of said control means, said priming means holding said quantity of oil at a level suitable for pump priming upon the control means being changed to require oil supply, the pump priming means including a section resupplied during oil pump operation with oil through a by-pass, reverse flow conduit from the pump oil supply circuitry;
 (h) whereby said pump means is operable as a hydrostatic hydraulic mechanism to apply retarding action on said load between the limits of substantially zero retardation when all air is fed to said pump means and maximum retardation when oil is fed to said pump means and pump discharge is substantially prevented.

72. The improvement in means for applying force to an aircraft including a main cable to be connected to said aircraft and means to apply force to said main cable comprising
 (a) a shuttle;
 (b) means connecting said shuttle to said aircraft including a pendant cable and a sheave in said shuttle to which said pendant cable is secured and in which said pendant cable when not under tension produced externally of said shuttle wraps around said sheave and slack is taken up in said pendant cable under force of spring means and means transmitting rotation of said sheave under tension into motion accomplishing gripping of said main cable, said means transmitting rotation being independent of and adapted not to be operated by said spring means;
 (c) said shuttle receiving said main cable and having means operable to grip said main cable to connect said aircraft thereto; and
 (d) means to operate said shuttle to grip said main cable including operating means normally operating said shuttle to prevent gripping of said main cable and in which said operating means is adapted to be overcome by tension produced externally of said shuttle in said means connecting said shuttle to said aircraft.

73. The improvement in means for applying force to an aircraft including a main cable to be connected to said aircraft and means to apply force to said main cable comprising:
  (a) a shuttle;
  (b) depending flanged guide rollers rotatable about upright axes, shuttle-carrying rollers rotatable about horizontal axes and swivel mounted relative upright axes and a flanged channel in shuttle battery position on which said shuttle is slidably mounted by bearing of said depending flanged rollers on channel flanges tops and sides and by bearing of said shuttle carrying rollers on channel flanges bottoms, said shuttle carrying rollers forming rotatable supports for said shuttle out of said battery positions;
  (c) means connecting said shuttle to said aircraft;
  (d) said shuttle receiving said main cable and having means operable to grip said main cable to connect said aircraft thereto; and
  (e) means to operate said shuttle to grip said main cable.

74. A runway transverse pendant cable supporting system comprising
  (a) pivotally mounted primary and secondary pendant cable supports holding a pendant cable in an upper position at a selective aircraft tail hook-engaging height by means of a compression spring member associated with each support, and including ejectable cable holders on said cable supports' supporting ends having V disposed association with said cable;
  (b) a pneumatic cylinder and piston operatively connected to each support, operable to lower said supports when air pressure is introduced and maintained within one end of said cylinder;
  (c) orificed check valve means associated with an air supply line feeding the other end of said cylinder;
  (d) whereby, upon a lowering of said pendant cable supports by physical contact therewith by an aircraft's landing wheels, a transient air pressure increase occurs in said check valved other end of said cylinder which, acting upon said piston to move it toward the first named end of said cylinder, assists said compression spring to recover said pendant cable and its supports from such lowered position to said selective aircraft tail hook-engaging height, and upon sudden release of air pressure out of said one end of said cylinder and sudden introduction of air pressure into said check valved other end, at some or all of said supports, an accelerated erection of a portion or of all of said transverse pendant cable to an aircraft appurtenance-engaging height which may be selectively caused to be beyond the height of the cable holders.

References Cited

UNITED STATES PATENTS

| | | | |
|---|---|---|---|
| 1,821,178 | 9/1931 | Fisher | 188—92 |
| 1,837,446 | 12/1931 | Kauffman | 188—92 |
| 1,891,793 | 12/1932 | Kauffman | 188—92 |
| 1,479,023 | 1/1924 | Bech | 188—92 |
| 2,086,277 | 7/1937 | McCleary | 188—92 |
| 2,634,830 | 4/1953 | Cline | 188—90 |
| 2,672,306 | 3/1954 | Doolittle et al. | 244—63 |
| 2,906,476 | 9/1959 | Doolittle | 244—110 |
| 2,919,871 | 1/1960 | Sorensen | 244—110 |
| 2,933,158 | 4/1960 | Pitts | 188—92 |
| 2,967,683 | 1/1961 | Crater | 244—110 |
| 2,990,919 | 7/1961 | Christenson et al. | 188—90 |
| 3,022,027 | 2/1962 | Keahey | 244—63 |
| 3,139,249 | 6/1964 | Trifillis | 244—110 |
| 3,146,974 | 9/1964 | Petoia | 244—110 |
| 3,148,849 | 9/1964 | Methven et al. | 244—110 |
| 3,181,819 | 5/1965 | Hayes | 244—63 |
| 3,185,261 | 5/1965 | Campbell et al. | 188—90 |

FOREIGN PATENTS

| | | |
|---|---|---|
| 637,662 | 2/1928 | France. |
| 515,648 | 1/1931 | Germany. |

MILTON BUCHLER, Primary Examiner
PAUL E. SAUBERER, Assistant Examiner

U.S. Cl. X.R.

74—730; 188—90, 92; 244—110